United States Patent
Bartholomew et al.

[11] Patent Number: 5,812,639
[45] Date of Patent: Sep. 22, 1998

[54] MESSAGE COMMUNICATION VIA COMMON SIGNALING CHANNEL

[75] Inventors: Dale L. Bartholomew, Vienna; Robert D. Farris, Sterling, both of Va.

[73] Assignee: Bell Atlantic Network Services, Inc., Arlington, Va.

[21] Appl. No.: 557,749

[22] Filed: Nov. 13, 1995

Related U.S. Application Data

[63] Continuation-in-part of Ser. No. 353,281, Dec. 5, 1994, Pat. No. 5,680,442, and a continuation-in-part of Ser. No. 371,906, Jan. 12, 1995, Pat. No. 5,631,948, which is a continuation-in-part of Ser. No. 353,281, Dec. 5, 1994, Pat. No. 5,680,442, which is a continuation-in-part of Ser. No. 539,952, Oct. 6, 1995, Pat. No. 5,661,782.

[51] Int. Cl.$^6$ .............................. H04M 3/50; H04M 7/06
[52] U.S. Cl. ...................... 379/89; 379/100.08; 379/207; 379/230
[58] Field of Search .................. 379/89, 230, 67, 379/88, 207, 100.08, 100.12; 370/356, 354

[56] References Cited

U.S. PATENT DOCUMENTS

| | | | |
|---|---|---|---|
| 4,310,727 | 1/1982 | Lawser | 379/207 |
| 4,313,036 | 1/1982 | Jabara | 379/207 |
| 4,371,752 | 2/1983 | Matthews et al. | 379/89 |
| 4,585,906 | 4/1986 | Matthews et al. | 379/89 |
| 4,602,129 | 7/1986 | Matthews et al. | 379/89 |
| 4,609,778 | 9/1986 | Franklin et al. | 379/246 |
| 4,625,081 | 11/1986 | Lotito et al. | 379/88 |
| 4,652,700 | 3/1987 | Matthews et al. | 379/67 |
| 4,766,604 | 8/1988 | Axberg | 379/67 |
| 4,790,003 | 12/1988 | Kepley et al. | 379/88 |
| 4,932,042 | 6/1990 | Baral et al. | 379/67 |
| 5,008,926 | 4/1991 | Misholi | 379/89 |
| 5,012,511 | 4/1991 | Hanle et al. | 379/21.1 |
| 5,018,191 | 5/1991 | Catron et al. | 379/100 |
| 5,029,199 | 7/1991 | Jones et al. | 379/67 |
| 5,029,200 | 7/1991 | Haas | 379/89 |
| 5,034,975 | 7/1991 | Grimes | 379/67 |
| 5,089,954 | 2/1992 | Rago | 379/229 X |
| 5,095,480 | 3/1992 | Fenner | 379/22 X |
| 5,134,647 | 7/1992 | Pugh et al. | 379/88 |
| 5,163,080 | 11/1992 | Amoroso | 379/89 |
| 5,193,110 | 3/1993 | Jones et al. | 379/89 |
| 5,195,128 | 3/1993 | Knitl | 379/88 |
| 5,199,062 | 3/1993 | VonMeister et al. | 379/89 |
| 5,237,604 | 8/1993 | Ryan | 379/220 |
| 5,260,986 | 11/1993 | Pershan | 379/67 X |
| 5,263,080 | 11/1993 | Jones et al. | 379/88 |
| 5,274,696 | 12/1993 | Perelman | 379/89 |
| 5,278,897 | 1/1994 | Mowery et al. | 379/212 |
| 5,289,468 | 2/1994 | Yoshida | 370/401 |
| 5,309,437 | 5/1994 | Perlman | 370/401 |
| 5,333,266 | 7/1994 | Boaz | 395/200 |
| 5,353,331 | 10/1994 | Emery et al. | 379/58 |
| 5,361,399 | 11/1994 | Linquist et al. | 455/56.1 |
| 5,367,566 | 11/1994 | Moe et al. | 379/243 |
| 5,375,159 | 12/1994 | Williams | 379/23 |
| 5,377,186 | 12/1994 | Wegner et al. | 379/201 X |
| 5,381,465 | 1/1995 | Carter et al. | 379/67 |
| 5,386,467 | 1/1995 | Ahmad | 379/220 |
| 5,400,393 | 3/1995 | Knuth | 379/88 |

(List continued on next page.)

OTHER PUBLICATIONS

Audio Messaging Interchange Specification (AMIS)—Analog Protocol, Version 1, Issue 2, Feb. 1992.

Common Channel Signalling System No. 7 for ISDN & Intelligent Networks. Jabbari, B. 8078 Proceedings IEEE 79 (1991) No. 2.

Primary Examiner—Thomas W. Brown
Attorney, Agent, or Firm—McDermott, Will & Emery

[57] ABSTRACT

A system and method of effecting transfer of message information of varied types from one centralized messaging system to another messaging device in a switched communications network having a plurality of central offices connected to subscriber terminals and connected together by trunks wherein the transfer of the message is effected through a common channel signaling network without using the trunks.

20 Claims, 17 Drawing Sheets

U.S. PATENT DOCUMENTS

| | | | |
|---|---|---|---|
| 5,406,557 | 4/1995 | Baudoin | 379/207 X |
| 5,418,844 | 5/1995 | Morrisey et al. | 379/207 |
| 5,420,916 | 5/1995 | Sekiguchi | 379/230 |
| 5,436,957 | 7/1995 | McConnell | 379/230 |
| 5,442,690 | 8/1995 | Nazif et al. | 379/207 |
| 5,454,030 | 9/1995 | de Oliveira et al. | 379/88 X |
| 5,473,677 | 12/1995 | D'Amato et al. | 379/112 |
| 5,475,732 | 12/1995 | Pester | 379/34 |
| 5,475,737 | 12/1995 | Garner et al. | 379/67 |
| 5,481,601 | 1/1996 | Nazif et al. | 379/207 |
| 5,519,770 | 5/1996 | Stein | 379/201 |
| 5,550,914 | 8/1996 | Clark et al. | 379/230 |
| 5,631,948 | 5/1997 | Bartholomew et al. | 379/67 |

MESSAGE COMMUNICATION VIA COMMON SIGNALING CHANNEL

RELATED APPLICATIONS

This application is a continuation-in-part of application Ser. No. 08/353,281, Voice Mail Communication With Call Blocking, filed Dec. 5, 1994, now U.S. Pat. No. 5,680,442, issued Oct. 21, 1997, and application Ser. No. 08/371,906, Voice Mail Communication With Call Blocking, filed Jan. 12, 1995, U.S. Pat. No. 5,631,948, issued May 20, 1997 and application Ser. No. 08/539,952, Voice Mail Communication With Call Blocking, filed Oct. 6, 1995, now U.S. Pat. No. 5,661,782, issued Aug. 20, 1997, which is a continuation-in-part of application Ser. No. 08/353,281 filed Dec. 5, 1994, now U.S. Pat. No. 5,680,442, issued Oct. 21, 1997.

TECHNICAL FIELD

The present invention relates generally to switched communications networks and providing voice mail services and more particularly relates to a system and method for providing communication between mailboxes in multiple mailbox systems using Common Channel Signaling (CCS) facilities.

BACKGROUND ART

Voice mail has become commonplace not only in business usage but also on an individual telephone service subscriber basis through Centrex service from a central office. A voice mail system is a specialized computer that stores messages in digital form on a fixed disk. The voice is generally digitized, usually at a much slower rate than the 64 Kb/s signal the central office uses in its switching network. The digitized voice is compressed and stored on a hard disk that maintains the voice mail operating system, system prompts, and greetings, and the messages themselves. A processor controls the compressing, storing, retrieving, forwarding and purging of files. A form of early system is described in Matthews et al. U.S. Pat. No. 4,371,752 (hereinafter the Matthews '752 Patent), issued in February, 1983, and several related patents.

U.S. Pat. No. 4,585,906 (hereinafter the Matthews '906 Patent), issued Apr. 29, 1986 to Gordon H. Matthews et al. The Matthews '906 Patent is a continuation-in-part of the Matthews '752 Patent.

U.S. Pat. No. 4,602,129 (hereinafter the Matthews '129 Patent), issued Jul. 22, 1986 to Gordon H. Matthews et al. The Matthews '129 Patent is a continuation-in-part of the '752 Matthews Patent.

The three Matthews Patents each describe a voice mailbox type system using digital storage and programmed control to offer a wide variety of message storage, forwarding and delivery type services. The system architecture is essentially the same in each patent disclosure. With reference to FIG. 3 of the '752 Patent, the voice message system (VMS) 10 includes an administrative subsystem 60, a number of call processor subsystems shown as 62A–62C, and a digital data storage subsystem 64.

The call processor subsystems each include a microprocessor based single board computer 70, a memory 72 having for example 64K of RAM, a communication port interface 74, two disk adapters 76, 78 communicating with the storage subsystem via two storage buses and a block transfer interface 80 which communicates with the administrative subsystem (FIG. 4). The communication port interface 74 provides communication to and from the telephone lines via communication port driver modules 90A–B, each of which includes port drivers 92, CODECS 96 and voice connection arrangements 98 (FIG. 5). As shown in FIG. 6 of the '752 Patent, the administrative subsystem 60 includes a microprocessor based single board computer 100, a memory 110, a non-volatile memory 112, two disk adapters 114, 116 communicating with the storage subsystem via two storage buses and a block transfer interface 118 which communicates with the call processor subsystems.

In the '752 system, a message router program is informed of each occurrence of a new incoming message stored in the system. This program creates a message control block on disc for each message, and the message is thereby queued to each of the addresses selected by the person sending the message (see the '752 Patent, Column 29, lines 5–16). As disclosed in the '752 Patent, to deposit a message (FIG. 11), a user calls the VMS. The VMS answers the call and transmits an initial prompt message to the caller. The caller then inputs a unique authorization code identifying that person as a subscriber to the VMS service. Upon receipt of a valid authorization code, the VMS transmits a short progress tone and accepts a series of dialed digits representing an address input from the subscriber. Typically, an address is a single telephone number. The '752 system also offers the subscriber the option to select a previously established distribution list including a number of such addresses. After entry of all necessary address information identifying one or more destinations, the user inputs a "1" to initiate voice recording and then transmits a voice message. The VMS stores the voice message in one of the digital disc storage units 120 within the data storage subsystem 64 (FIG. 7). The user is then given the option to deposit another message, inquire about messages stored for the subscriber or terminate the session by hanging up.

To retrieve and replay stored messages, a subscriber initiates a routine referred to in the '752 Patent as the INQUIRY feature (see FIG. 21). A user can enter this routine after completion of message deposit as discussed above, or the user can initiate an inquiry by calling the VMS. Again, the VMS initially answers the call and transmits the opening prompt message to the caller. The caller inputs his or her unique authorization code which is verified by the VMS. The caller then enters a special function code (SFC) for an INQUIRY. The VMS determines whether or not any messages have been recorded for this subscriber. If there are no messages, the VMS plays a canned prompt so informing the subscriber. However, if there are messages recorded for the current caller, the VMS provides another canned message, and the person initiates playback by dialing a "2" (Column 26, lines 42–61). The caller can control the replay of the messages using additional dialed digit inputs, for example to repeat all or a segment of a message or to skip all or a segment of a message (table bridging Columns 23 and 24).

The VMS system disclosed in the '752 Patent will also automatically deliver messages to the identified addressees. In the DELIVERY routine (FIG. 15), the VMS calls the addressed recipient by dialing that person's telephone number. If the call is answered, the VMS plays a canned announcement which includes a request for the person answering the call to enter her unique authorization code. If there is no answer, the line is busy or the answering person does not enter the correct authorization code, the VMS will attempt to deliver the message again after a specified time period. When the answering party has responded by entering a valid authorization code, the VMS emits an idle tone, and the person can initiate playback by dialing a "2". The person listening to message playback can control the replay using additional dialed digit inputs, as discussed above (see Column 23, lines 30–65). The user is then given the option to redirect the message to another destination, deposit a reply message, save the message, or file the message for long term storage.

In the reply routine, the user records a message for the sender of the message just replayed. In the redirect routine, the user enters a new address, and if desired, records a new message. The new message is appended to the original message already held in digital storage, and both messages are delivered to the new addressee using the DELIVERY routine discussed above ('752 Patent, Column 25, lines 41–59, and FIG. 18).

The file function disclosed in the '752 Patent transfers a message to a "verbal file folder" for long term storage and later retrieval (Column 26, lines 11–18).

The '906 and '129 Patents include the subject matter of the parent '752 Patent discussed in detail above. The '906 and '129 Patents, however, add a number of message processing features. For example, these Patents add a delivery option. referred to as "TIME-I.D. VALIDITY", which allows the user to specify a recipient and a date and time for delivery of a stored message.

The '906 and '129 Patents also expressly describe storing messages for an identified subscriber in terms of depositing messages "in the user's address". For example, one feature added in these Patents is a "Priority Hold" feature. As described, if the deposited message meets certain priority conditions, the "VMS would automatically dial the user's telephone rather than deposit the message in the user's address, thereby forcing delivery" ('906 Patent, Column 58, lines 4–12). Similarly, these Patents describe depositing messages "in the user owner's RO message address", as will be discussed in more detail below (see, e.g., '906 Patent, Column 70, lines 51–53). Such references to depositing messages in a "user's address" indication that the addressing of messages for each subscriber in the Matthews et al. system defines "message baskets."

The '906 and '129 Patents also disclose several features which permit access by non-subscribers. For example, a subscriber can be assigned a receive only (RO) message address. To receive messages from a subscriber by using this address, a non-subscriber may call the VMS using a direct inward dial line (DID). In the specific example given in the Patents, the subscriber might activate a call forwarding feature in the TELCO network whereby calls to her home telephone number are automatically forwarded to the DID/RO number into the VMS. When such a DID call comes in, whether forwarded or connected directly in response to dialing the DID number, the TELCO network will forward the last three or four digits of the DID number to the VMS system. The VMS uses the received digits to identify the RO address. If the subscriber prestored any messages in the RO address, the VMS will play those messages to the caller, otherwise the VMS will play a canned prompt indicating that the subscriber is not in ('906 Patent, Column 69, lines 27–62).

U.S. Pat. No. 4,625,081, issued Nov. 25, 1986, to Lawrence A. Lotito, et al (hereinafter referred to as the "Lotito Patent"). Referring to FIG. 1, the patent describes an automated telephone voice service system 100 which provides automatic recording and editing of voice messages as well as forwarding of recorded voice messages to other accounts and telephone numbers with or without operator assistance.

The system includes a data store 104 coupled to store and retrieve voice messages at each of a plurality of individually addressable message baskets 1-N and a control system 102 providing a selective coupling between the store and each of a plurality of telephone lines of a telephone network 108.

The data store may be physically implemented as one or more magnetic or electronic storage devices and may be distributed throughout a data processing system. The data store provides storage for a plurality of addressable message baskets, a plurality of individually addressable voice message prompts and client greetings, and an audit trail for each client accessing the system.

Each message basket provides storage for a plurality of voice messages and is segregated into an inbasket section and an outbasket section. The inbasket functions in a manner analogous to a recording mechanism for a telephone answering machine and stores voice messages and message forwarding notices directed by system users to account owners of the associated message basket. The outbasket portion receives voice messages for forwarding to selected other message baskets or to telephone network 108 users at indicated telephone numbers.

In a fully automatic mode, the control system 102 can operate to call the indicated telephone number and upon its being answered, communicate an appropriate recorded voice message prompt, communicate the voice message being sent, and then terminate the call. As an example, the voice message prompt might inform the person answering the telephone at the indicated number that the person is about to receive a prerecorded message from the account owner. The account owner, when setting up his account, establishes predetermined distribution lists and sets of delivery instructions. The delivery instructions can cover such features as days of the week and time intervals during which delivery may be made, number of retries, and whether the forwarding of the message is to be accomplished automatically or semiautomatically with operator assistance.

In a semiautomatic mode, the control system 102 waits for delivery conditions to be met, and then obtains ownership of an active operator console 106 including a terminal having a keyboard and a video display unit and an operator headset. The control unit informs an operator through the console 106 that a semiautomated message forwarding operation is to be undertaken and displays a prompting message for the operator to read. Upon command, the control system generates the Touch Tone signals corresponding to the recipient's telephone number and connects the operator console 106 to the line when it is answered. The operator informs the answering party of the call, asks to talk to a particular person at the called telephone number if appropriate, and secures the permission of the called party to forward the voice message. The operator then commands the control system to communicate the voice message stored in the outbasket to the called telephone line as indicated by arrow 114.

For voice messages forwarded to another inbasket rather than to a telephone number, the voice message is not actually recorded in duplicate in each of the designated inbaskets. Instead, a notification is stored in the inbasket which indicates that a forwarded message is stored by the system for delivery to the owner of the forwarding message basket. The notification indicates the particular outbasket and the particular message within the outbasket which is being forwarded. This enables the person sending the message to retain ownership of the message in his own outbasket and selectively change or delete the message until it has actually been delivered. Depending upon the delivery instructions of the sender and the preselected instructions of the recipient, a forwarded message might simply wait for delivery until the recipient retrieves the receipt of a message in his inbasket by a paging signal communicated over a paging system (not shown), by the illumination of an indicator light at the recipient's telephone, or by a telephone call to the recipient's telephone number informing the recipient by a prerecorded message that a message has been received in the recipient's inbasket.

The prompts and client greeting section of the data store 104 stores a plurality of individually addressable voice message prompts explaining how to operate the voice service system and a client greeting for each inbasket. The greeting invites the caller to leave a message but does not identify the specific owner of the inbasket which has been accessed by the call. Each client may record and change his own personal greeting at will.

The audit trail portion of the data store 104 stores a record for each caller accessing the system of the commands which have been given to the system by the caller. This record enables the control system to select particular voice message prompts.

The particular functions executed by the control system depend upon by which one of the functionally different types of telephone lines the control system is accessed and upon the keyboard commands which are entered.

The control system responds to an incoming call on a client's normal use telephone line (secretarial line) by waiting for a predetermined number of rings and then answering the telephone. The client greeting is accessed in the data store and communicated to the caller. The caller is invited to leave a message, which remains in the client's inbasket until retrieved by the client. A sophisticated caller who is familiar with the system is free to edit the voice message.

Another type of line upon which a call might come into the system is a direct incall line. This line is dedicated to the particular inbasket of the client and is not available for general use by the client.

A general incall line is similar to a direct incall line except that it is not associated with any particular message basket or inbasket. Upon accessing the system through a general incall line, a caller is prompted to enter a message basket number. The caller then is able to leave a message in a selected basket.

A general access line is intended primarily for clients of the VSS and affords the broadest range of system functions. Upon calling in on a general access line, a client is prompted to enter his personal ID number if he desires to have access to the ownership privileges of his own account. This provides immediate access to message retrieval and the control system informs the caller whether or not there are any messages within his inbasket and, if there are, begins communicating the voice messages over the connected telephone line. Before each message is retrieved, the caller is informed of the age of the message. After reviewing the incoming messages, the caller is informed of the status of any outgoing messages in the caller's outbasket which are awaiting delivery.

The telephone voice service system is implemented with a data processing system. As shown in FIG. 2 a telephone network 108 provides a number of physically different types of telephone lines to which connection must be made by the service system Through a concentrator 202 up to 640 secretarial lines are connected to a telephone room subsystem 206. Telephone room subsystems 214 and 216 are connected to special service telephone lines such as DID or DX tie lines. The concentrator and telephone room subsystems are physically located at one or more telephone company central offices or client PABX centers. The telephone room subsystems operate as interfaces between the digital portion of the service system and the analog telephone lines and trunks. It is possible for each telephone room subsystem to connect to up to 1260 voice grade circuit terminations. The system can accommodate up to 4 telephone room subsystems.

Up to 4 real time subsystems receive the voice and control data from the 4 telephone room subsystems. The real time subsystems provide selected switching connection between channels and communicate with an information processing system 250 for storage and retrieval of voice messages and system control.

An interactive service subsystem 252 provides a communication connection between the information processing system 250 and input/output devices for the service system. The input/output devices may include keyboard display terminals 266, 268 and 270 within operator consoles 106, a printer 262 and a card reader 264.

In addition to the systems described in the foregoing patents networking of voice mail systems has also been implemented to permit users in one location to use voice mail in other locations. The simplest form of networking voice mail is to use guest mailboxes, which are boxes assigned to persons outside the system. Another method of networking voice mail has been to terminate the voice mail on one switch and connect other switches to the central switch with networking software. A third method has been to network the voice mail systems themselves. However, generally speaking, the networked systems must be of the same manufacture because there are no standards for communication between systems. Work is underway to develop a set of standards known as Audio Message Interchange Service (AMIS) in the hope that when AMIS standards are approved, they will form a common language that network voice mail systems can support so voice mail of different manufacture can communicate.

In still further addition to the foregoing it has also been proposed to transmit stored facsimile and other data information using the public switched telephone network.

Duehran et al. U.S. Pat. No. 4,918,722 describes a method for sending a selected message comprising binary encoded character data or facsimile encoded data stored at a first location to any specified remote location accessible from the first location via the public switched telephone network. The method includes the steps of storing the messages at the first location and thereafter receiving at the first location via the public switched telephone network, delivery commands issued by any remote telephone device identifying the selected message and specified remote location. The commands are decoded to identify the selected message and specified remote location and the selected message is recovered from the stored messages. A telephone call is initiated to the specified remote location and sent to a facsimile capable receiving device at the specified remote location via the public switched telephone network in a facsimile compatible form.

Gordon et al. U.S. Pat. No. 4,969,184 is directed to facsimile message transmission between end devices via a public switched telephone network and a "process intermediary unit." The purpose of this arrangement is to eliminate the need for the subscriber at the destination to have a dedicated telephone line while giving the appearance at the originating device of dedicated line transmission.

The intermediary unit includes a block of telephone number addresses (TNA's) which may be leased or purchased. These addresses, which are associated with particular subscribers, do not represent dedicated telephone lines. When used, communication is established with a "local node" by means of a DID trunk line if one is available. For long distance communication, a number of local nodes are interconnected by a digital data transmission network. At least some of the transmitting/receiving devices have unique telephone number addresses which, when used, results in telephone connection with the intermediary unit, the telephone number addresses being recorded and used by the intermediary unit to identify the receiving devices to which data is to be transmitted.

Gillon et al. U.S. Pat. No. 4,922,348 is directed to communication of facsimile data. Facsimile image signals are transmitted from facsimile sources by means of simple standard user interfaces and the telephone lines. A facsimile call is set up by dialing a destination number to automatically route to data storage facilities of a switched network. Facsimile data stored in the network is transmitted to a facsimile destination. The switched network may be a private switched network, a public switched network or a private branch exchange. The network may be arranged to distribute a facsimile document to a plurality of destinations with only one transmission from any source. If the destination is unavailable, the facsimile signals can be stored until the destination becomes available.

Neudorfer U.S. Pat. No. 4,935,955 is directed to a system for interfacing central office facsimile telephone lines and internal office facsimile machines. Roll-over lines from the central office are utilized to automatically sequence up from the main facsimile telephone number as additional facsimile transmissions arrive. Incoming and outgoing facsimile transmission data is placed in memory storage after being received and before being transmitted. The combination of rollover and memory storage makes the system transparent to the outside sender, since all incoming facsimile transmissions dial the same main telephone number. Similarly, outgoing messages are transparent to the internal facsimile machine operators, since their messages are sent to the interface unit, stored in memory and then sent out over the next free facsimile telephone line.

Baran et al. U.S. Pat. No. 4,893,333 describes an interactive facsimile system and method of information retrieval which permits unmodified CCITT (Consultative Committee for International Telephony and Telegraphy) Group III and IV facsimile transceivers to interactively select and retrieve facsimile pages from a shared facsimile database fax serve system. The remote facsimile transceiver user marks a paper selector sheet form using a pencil or pen. The selector sheet is transmitted via the remote facsimile transmitter to the fax server unit. The fax server unit processes the facsimile signal rapidly, interpreting the selector sheet and selecting the pages desired to be retrieved prior to the normal CCITT time out. In this way the requested information may be returned during the same telephone call. Alternatively the fax server initiates an automatic call back with the information desired. The system permits facsimile transceivers to be used as interactive terminals for selective retrieval of text and graphics, without requiring alphanumeric keyboard interaction or the need for manual intervention.

Wheeler et al. U.S. Pat. No. 5,200,993, commonly assigned with the instant application, describes data handling through a switched telecommunications network wherein a backbone digital data network transmits digital data using a first communications protocol. A gateway interface receives command and digital image data signals having a second communications protocol from one of the subscriber stations and converts second communications protocol of the command and digital image data signals into the first communications protocol. The gateway supplies the converted command and digital image data signals to the backbone network. The digital image data signals may include multilevel pixel intensity data to provide a graduated gray scale capability. An image memory stores bit mapped image data as multilevel pixel density information. A processor receives the converted command and digital image data signals from the backbone network and, in response, selectively stores and retrieves the image data into and out from the image memory means over the backbone network.

According to another aspect of that patent, a real time interactive distributed image processing system includes a plurality of remote user terminal stations for inputting and processing image processing commands from a respective user. Each of the remote user terminal stations includes a local processor responsive to the image processing commands for supplying image manipulation commands and data retrieval and storage commands. An input is provided for original image data, i.e., image data prior to further processing, the image data including multilevel pixel intensity information. Each remote terminal station further includes a composite image data output for supplying composite image data, i.e., image data after manipulation, including multilevel pixel intensity information.

A central processor includes data storage connected to the central processor means for storing the original and composite image data and a graphics processor receiving the image manipulation commands from the input/output means and, in response, retrieving and combining the original image data to form the composite image data. Further associated with the central processor is a routing table memory for storing sequences of addresses, and a communications processor responsive to automatic number identification (ANI) data and to the addresses stored in the routing table for supplying the composite image data. Providing connectivity for transmitting the image manipulation commands and the data retrieval and storage commands from the remote user terminal stations to the central processor means and for transmitting the original image data and the composite image data from the central processor means to the remote user terminal station is a public switched telephone system for connecting the remote user terminal stations to the central processor means. Automatic number identification facilities are used for automatically supplying the ANI data identifying ones of the remote user terminal stations on the public switched telephone network.

Jones et al. U.S. Pat. No. 5,193,110 describes an integrated services platform for providing a number of different types of services through a telephone network. The integrated services platform shown in FIG. 1 connects to a central office 20 or some other point in a public switched telephone network. The platform includes a digital switch 26 and a master control unit 24, both of which connect to the central office 20. The connection between the master control unit 24 and the central office 20, typically a Simplified Message Desk Interface (SMDI) link, carries various call related data. The connection between the digital switch 26 and the central office 20 can be T1 or ISDN. The digital switch 26 provides selective connections between channels on the T1 or ISDN link to the central office 20 and a multiplicity of applications processing units $30_1$ to $30_n$.

The Jones et al. Patent disclosure concentrates on modification of the standard voice mail system to permit additional access to other types of services, such as FAX mail. The application processing units 30 therefore are specially adapted to provide a variety of different types of information services which are compatible with telephone network transmission. The illustrated application processing units include a speech recognition processing unit, a speech synthesis processing unit, a FAX processing unit, an E-mail processing unit, a voice processing unit, and a videotex processing unit. Each processing unit may provide a single type of information service as illustrated, or each processing unit may provide a number of different types of information service via different ports on the processing unit.

Assignment of an incoming call by the master control unit 24 to one of the application processing units occurs over an internal bus or network 32 that includes both a data bus and a message or "information" bus. Control data and related messages between master control unit 24 the and application processing units or between the application processing units are routed over the data bus portion of the internal bus network 32, while actual messages (e.g., voice messages or facsimile messages) are routed between the application processing units over the information bus portion of the bus network 32. Although other topologies may be used for the bus network 32, the preferred embodiments utilize either a single Ethernet bus carrying two logical buses or two separate Ethernet buses for the data and the messages (see column 4, lines 30–50).

When a call comes in to the integrated services platform, the master control unit 24 receives information about the call from the central office 20. For example, the central office 20 informs the master control unit 24 of the number called by the calling party. Alternatively, the caller can be provided with a voice menu and instructed to select the desired information service by pressing buttons on a Touch Tone telephone 21 or 23. The master control unit uses the information received from the central office and/or the received Touch Tone inputs from the caller to identify the particular type of service the caller is requesting and the relevant subscriber's mailbox. Based on that information, the master control unit 24 instructs the digital switch 26 to route the call to the appropriate processing unit 30 for that service and/or to an appropriate port on one of the processing units.

DISCLOSED OF THE INVENTION

Architecture of Switched Telephone Networks Using an Advanced Intelligent Network (AIN)

According to the present invention it has been discovered that it is possible to implement mailbox to mailbox data communication to transfer voice messages using the existing advanced intelligent network (AIN) in public switched telecommunications networks in the United States. The AIN conventionally provides services based on feature logic and data located at a centralized node in the network known as a Service Control Point (SCP). Appropriately equipped switches in the network, known as Service Switching Points (SSP's), communicate with the SCP and together they provide various AIN services. The SSP knows which calls require AIN service based on characteristics of the call, such as the line of origin or the digits that were dialed. The process of identifying calls that require AIN processing is known as "triggering", since a particular characteristic of the call "triggers" to switch into providing AIN treatment. Once a trigger occurs, a query message is sent to the SCP asking for instructions. Based on information contained in the query message, the SCP determines which service is being requested and provides appropriate information such as routing and billing instructions that the SSP then executes to complete the call. Only the SCP "knows" which service is being performed on a particular call. The SSP simply knows how to identify calls that require AIN processing and how to execute instructions provided by the SCP. For this reason, two services that are very different from the viewpoint of the subscriber and the SCP may appear identical to the SSP since it performs the same basic functions for both.

Current program controlled switches such as the AT&T 5ESS and 1AESS and comparable switches from other manufacturers are provided with an Advanced Services Platform (ASP) which provides SSP and Network Access Point (NAP) capabilities. ASP provides services independent triggering and call processing capabilities and also supports OA&M (Operations, Administration and Maintenance). These capabilities interwork with many existing switch based features. SSP capabilities enable end offices and access tandem offices to interface with SCP databases using Common Channel Signaling 7 (CCS7) Transaction Capabilities Application Part (TCAP) protocol to implement services. These services include standard equal access multi-frequency (EAMF) and CCS7-ISDN user part (ISUP) interfaces to a network access point (NAP) switch, standard CCS7-TCAP interfaces to an SCP database, call processing triggers, non-call processing triggers such as test queries, customized announcements under the control of an SCP, such as terminating announcement or play announcement and collect digits, connection control under control of the SCP, business and residence custom services (BRCS) interworking, new terminating restrictions, ISDN interworking, notification of call termination (returned to SCP), enhancements for OA&M, and billing under control of the SCP. Further details are provided in AT&T Technical Reference 235-190-125 October, 1990. As there described, voice mail is readily implemented.

According to the present invention, caller to remote mailbox and/or mailbox to remote mailbox communication is provided using TCAP and SS7 messaging in the AIN while blocking or obviating trunking of voice messages. This is advantageously accomplished using existing voice mail equipment because that equipment is currently interfaced to the telephone network and is fully responsive to TCAP and SS7 protocols.

According to the invention, a caller desiring to leave a voice message in the mailbox of a remote person may use a telephone to access his own voice mail system and mailbox and speak the message. The voice processing unit of the mailbox may operate its voice menu to direct the caller to depress a specified key when satisfied with the message. It may then query the caller as to whether he desires to send the message and, if so, to depress another specified key. The voice unit then may instruct the caller as to the procedure for keying in the identity of the destination and to depress a further specified key to send the message. The message is digitized in conventional fashion and stored in the mailbox of the sender. The caller may go on hook after depressing the designated send key. The depression of the send key causes the generation of a tone or other signal which is recognized by the acting SSP as a trigger. This local connection ends usage of the voice network.

The trigger causes the SSP to frame a TCAP inquiry message which is directed to the SCP for instructions. The TCAP message includes information identifying the calling station and mailbox and the called station and the fact that the caller is requesting mailbox to mailbox message transfer. The SCP consults its database to establish whether the caller is authorized to communicate mailbox-to-mailbox and as to the existence and identity of a mailbox for the called number. The SCP then originates a response to the SSP to dispatch one or more SS7 packets to the called directory number and mailbox along with an appropriate routing label and handling instructions and carrying as the included information in the SS7 packet the digitized voice retrieved from the mailbox of the sender. The information may be in T1 protocol which is conventionally the output digital signal of mailbox equipment regardless of manufacture.

Thus any translation which is necessary between the digitized message in the mailbox and the T1 or equivalent protocol used in the SS7 packets inherently occurs in the equipment furnished by the manufacturer.

The number of SS7 packets which may be required will be dependent upon the length of the message as in conventional packet communication. Each packet includes a suitable header which permits reassembly in the original order at the destination. The fact that the packets may not arrive at the destination in the same order as originated is of no consequence in that real time voice communication is not involved in the transfer.

The dispatched SS7 packet communication proceeds through the common channel signaling SS7 network until all of the packets are received at the destination. It is a feature of the invention that the redundancy of the SS7 network and packet switching techniques may entail individual packets traveling different routes to the same destination. This redundancy is utilized as a feature of the invention to enable the existing SS7 network to handle the digital packet communication involved without overload.

When the packets reach the destination SSP and end office (EO) the packet headers contain the necessary information to direct the packets directly into the mailbox without setting up a connection to the associated telephone station and without initiating ringing of the telephone. The packets arrive in their transmitted form containing T1 protocol digitized voice which the recipient mailbox equipment is designed to receive and deposit as a digitized voice signal in the mailbox. Again, any necessary translation is accomplished by the existing mailbox equipment by virtue of the fact that its vendor must assure that it is compatible with the switched telephone network. Deposit of the message in the destination mailbox is followed by the customary notification of the mailbox proprietor that a message is waiting. The proprietor may then access the mailbox in conventional fashion and have the message delivered as an audio voice message in the usual fashion. The recipient then has the option of returning a message in a converse fashion by depressing predetermined keys at his telephone station which utilizes the information in the packet header to reverse the origination and destination identifications.

Because current model SCP's include billing modules they can also effect billing. The data is sent out through the ISCP so that it can either be directed to the revenue accounting office on a direct line or send a TCAP message back into the SSP or end office switch to the originating number responsible for the origination of the call. Billing can be accomplished in any desired fashion, such as in bits per second, call setup, number of packets, or any combination or the same. The billing information may go into the journal on the switch to be forwarded to the revenue accounting office. The system of the invention is particularly suited to delivery of the same mailbox message to multiple mailbox destinations.

According to a feature of the present invention there is provided a unique method and system for implementing message broadcasting using the common channel signaling network. While the preceding embodiments of the invention have enabled the use of the common channel signaling network to deliver user to mailbox or mailbox to mailbox messages the instant embodiment permits a user to deliver the same message to a pre-established list of mailboxes or addressees. This may be accomplished according to one feature of the invention using the existing common channel signaling network or an AIN. According to another feature of the invention this may be accomplished by providing a new dynamism to the Signal Transfer Points (STPs).

This aspect of the present invention involves a method of routing an SS7 message. In conventional usage a transfer point of the SS7 network receives a signaling message from a node of the network. The signaling message relates to control of the associated communication network. In a telephone system, for example, the signaling message rides on the SS7 common channel interoffice signaling network and relates to control of call set-up through the voice channels of the telephone network. In present practice routing data is obtained by the STP querying the SCP or ISCP. According to a feature of the invention this procedure is not followed, instead a database separate from the transfer point is accessed, and the signal transfer point then transmits the signaling message through the signaling network in accord with routing information obtained from the separate database.

The dynamic routing functionality of the transfer point is triggered by occurrence of some predetermined event in the processing of a particular signaling message. Many signaling messages will not produce the predetermined event and will be routed normally utilizing routing control information stored in the transfer point. For those signaling messages producing the event, however, the transfer point will formulate a query message and transmit that message to the separate database. In response to the query, the database accesses stored information and, using that information, translates the query into actual routing control information. The database transmits a response message containing the routing control information back to the transfer point. The transfer point obtains the routing control information from the response message and uses that information to route the actual signaling message.

In an SS7 type signaling network, the predetermined event triggering the query by the transfer point typically relates to a routing parameter contained in a field of the signaling message. In the preferred embodiment, when a global title is present in the SS7 routing label, the transfer point executes a translation. For certain values of the global title, the transfer point uses internally stored data to perform the translation and control subsequent routing. For other values of the global title, the internal translation table holds a 'point in routing' (PIR) code which triggers the query to the remote database. In response to finding the PIR recorded in the internal table against the particular global title value, the transfer point uses routing control information obtained from the separate database to perform the actual translation to control routing at transfer points and/or to specific networks implementing the dynamic signaling message routing functionality. For example, a signal transfer point in accord with the present invention includes interface modules, a data switch and a program controlled processor. The interface modules provide two-way data communications via interoffice signaling links. The switch routes signaling messages between the interface modules. The processor recognizes a predetermined event in the processing of a signaling message, obtains routing information from the separate database and controls routing of the message by the switch in accord with the information from the database.

A conventional communication network includes local communication lines or subscriber lines and at least one trunk circuit. Separately located central office switching systems, interconnected via the trunk circuit, selectively provide switched call connections between at least two of the local communication lines. A signaling transfer point in accord with the present invention routes signaling messages via signaling links coupled to the central office switching systems. The signaling links are separate from the local communication lines and the trunk circuit. The communication network also includes a database separate from the signaling transfer point and the central office switching systems. The database provides routing and control information to the signaling transfer point to control routing and handling of at least some signaling messages by the signaling transfer point.

According to the invention the database may contain a list of addresses of addressees to whom a subscribing user wishes to dispatch an identified message. When this database is accessed by the STP pursuant to appropriate signaling it performs a database dip and instructs the STP to regenerate the digitally stored message and dispatch it via the SS7 network to each of the addressees ascertained from the database using addresses supplied by the STP. The list in the database is subject to updating and change by the subscriber.

According to a still further embodiment of the present invention it is possible to use the public switched telephone network and particularly its common channel signaling system to provide virtually all of the above described features for different types of information. These may include facsimile, E-mail, varied types of imaging and related information exchange.

BEST MODE FOR CARRYING OUT THE INVENTION

One system for providing a Common Channel Signaling Network (CCSN) utilizes Signaling System 7 (SS7) protocol in a Packet Switched Data Network (PSDN) connecting Network Elements (NE) via packet switched 56 Kb digital data circuits. In addition to providing call set signaling functions, the SS7 network also provides access to switching control points (SCP's) used to permit line identification database (LIDB) look-up for 800 services. Class services also use the SS7 network to provide custom call features. The latest services using the SS7 network comprise Advanced Intelligent Network (AIN) services. AIN services use the SS7 network to access an Integrated Switching Control Point (ISCP) where AIN service functions are performed.

Figure 1:
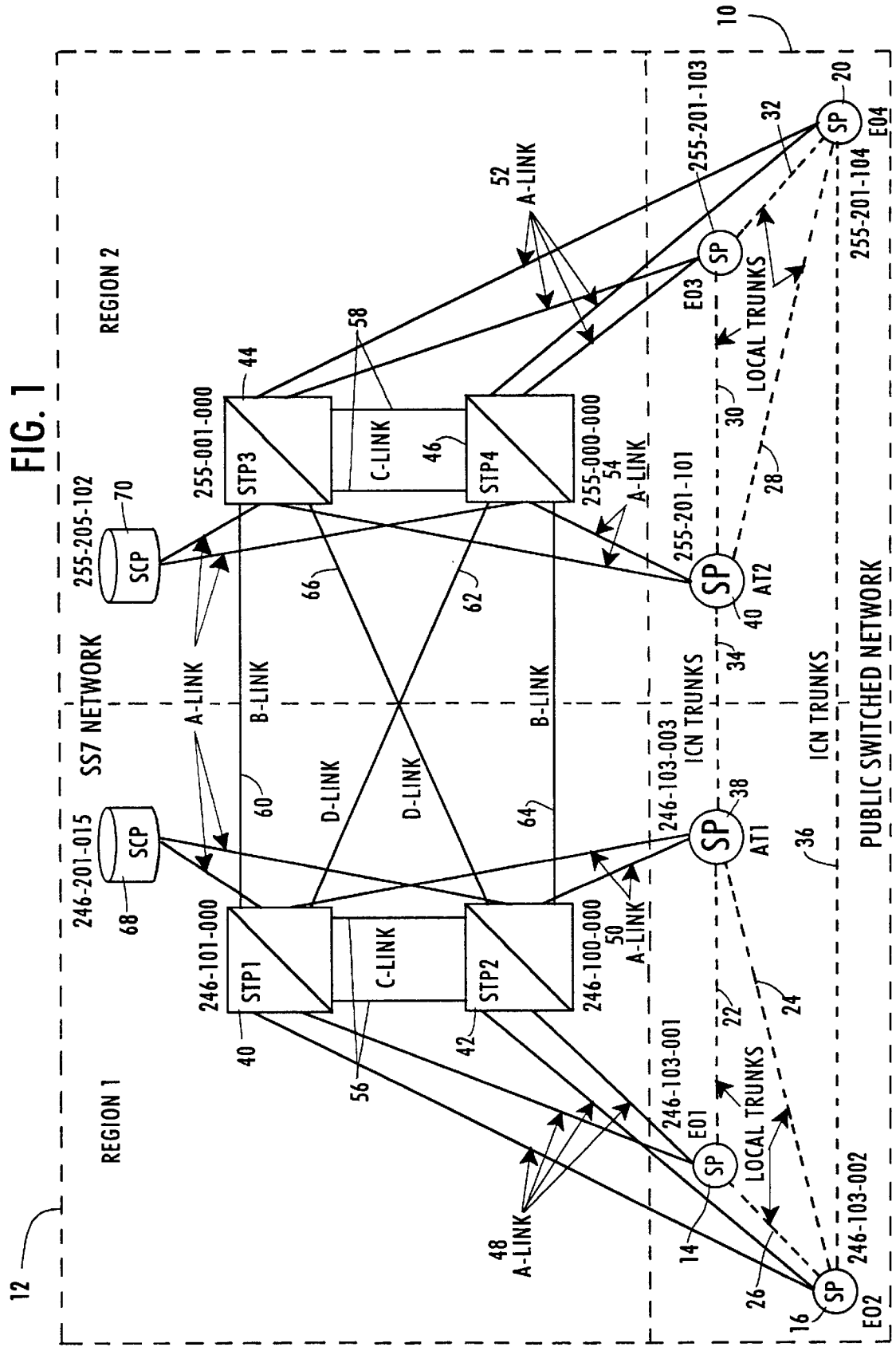
FIG. 1 is a block diagram of a Public Switched Telephone Network and its SS7 signal control network.

Referring to FIG. 1 there is shown a block diagram of a public switched telephone network and the SS7 network that is used to control the signaling for the switched network. Thus an analog switched telephone network is generally indicated at 10 having a common channel signaling network in the form of an SS7 network illustrated generally at 12. The switched telephone network consists of a series of central offices which are conventionally referred to as signaling points (SPs or SSPs) in reference to the SS7 network. Certain of these SPs comprise end offices (EOs) illustrated at 14, 16, 18 and 20 as EOs 1–4 in FIG. 1. Each signaling point has a point code comprising a 9-digit code assigned to every node in the network. In FIG. 1 EO1 has a point code of 246-103-001, EO2 has a point code of 246-103-002, EO3 has a point code of 255-201-103, and EO4 has a point code of 255-201-104.

The end offices EO1 and EO2 represent end offices in the region of one regional operating company, while end offices EO3 and EO4 represent end offices of the region of a different operating company. Each operating company has its own network ID, shown here as 246 for the left region and 255 for the right region in FIG. 1. The number 103 in the designation 246-103-001, is the number of the cluster. A cluster can hold 32 SPs or members, the member being designated by the final 3 numbers. Thus 246 may represent C & P of Virginia Regional Operating Company, cluster 103, member EO2 for EO2 when viewed from an SS7 standpoint. The broken lines connecting the SPs together may be analog trunks or voice or similar circuits. The SPs in a given region are connected together by local trunks 22, 24 and 26 in the left region and 28, 30 and 32 in the right region. The SPs in one region are connected to the SPs in other regions via inter-exchange carrier network trunks or ICN trunks 34 and 36 in FIG. 1 connected to Access Tandems (ATs) 38 and 40 (AT1 and AT2). These SPs or ATs are shown as having point codes 246-103-003 and 255-201-101 respectively.

Referring to FIG. 1, the SS7 network 12 comprises a series of Signal Transfer Points (STPs) shown here at 40, 42, 44 and 46 designated STP1, STP2, STP3 and STP4. Each STP in a network is connected to the SPs in the network by A links indicated at 48, 50, 52 and 54. STP1 and STP2 constitute a mated pair of STPs connected by C links 56 while STP3 and STP4 constitute a mated pair connected by C links 58, each mated pair serving its respective transport area. It will be understood that there may be multiple mated pairs per region, one for each designated transport area. STP1 is connected to STP3 by B link 60 and to STP4 by D link 62. STP2 is connected to STP4 by B link 64 and to STP3 by D link 66.

As will be understood, the A, B, C and D links are physically identical with the designation relating to cost in terms of ease of access. The A links represent the lowest cost. B and D links have the same route cost with respect to SS7 so that the D designation is used only because it extends diagonally in the drawing. The C links are used to communicate between the two paired STPs for network management information and also constitute another route. The STPs in mated pairs have the same translations. Thus the translations in STP1 are the same as the translations in STP2, and the translations in STP3 are the same as the translations in STP4. The C links communicate between the paired STPs for network management information and SS7 message routing. The STP pair cannot function without the C links. Therefore, unnecessary utilization of the C links causes congestion and prevents the paired STPs from performing their intended function.

The STPs are connected to Signal Control Points (SCPs) indicated in FIG. 1 as an SCP 68 and an ISCP 70. The ISCP is an Integrated Signaling Control Point, which is basically the same as an SCP but comprises a larger and more powerful computer. AIN may also be regarded as another ISCP. SCPs are usually used for 800 and credit card services with ISCPs being used for AIN. However, this is optional. The ISCP may hold application information as well as routing information whereas an SCP contains routing information, i.e., routing tables.

The SS7 network constitutes a highly redundant data network, generally a 56K switched data circuit. By way of example, an SS7 message from EO2 to EO4 might travel any one of 8 possible routes. It could go from EO2 to STP1, from STP1 to STP3, STP3 to EO4. One variation on that route would be from STP1 down the D link 62 to STP4 to EO4, and so forth. In the event that a link between STP3 and EO4 was lost, an SS7 route could be established from EO2 to EO4 via STP1 to STP3 and then via C link 58 to STP4 to EO4. However, that would be an undesirable route in unnecessarily using the C link. A links provide direct connectivity while C links provide circuitous routes using extra switches, a situation to be avoided. An alternate route would be from STP1 via D link 62 to STP4 to EO4. Another reason for not using the C link is to avoid tying up the entire STP3-STP4 pair.

The operation of placing a call from EO2 to EO4 may be described as follows: The user at EO2 picks up his phone and dials the number that resides in EO4. The SP generates an Initial Address Message (IAM). This message would have the destination point code of EO4, namely, point code 255-201-104. It would have an originating point code of EO2, namely, 246-103-002, in addition to miscellaneous other information needed for call set-up. That message would then be sent to either STP1 or STP2. Assuming that the message goes to STP1, STP1 would look at the message and determine that the message was not for it as an STP but rather is for EO4. STP1 would then investigate possible routings to get to 255 or EO4. B and D links are available and STP1 would choose one of the two. Assuming that it chooses the B link to STP3, STP3 repeats the same procedure. It determines that the message is for 255 or EO4 and puts that message on the A link to EO4.

EO4 gets the IAM which has the called telephone number in it and determines whether or not the line is busy. If the line is not busy, EO4 generates an Address Complete Message (ACM) to indicate that it received the request for a call and that the number is not busy. That message is sent back by simply reversing the point codes. Now the destination point code is EO2 and the originating point code is EO4. The message goes back to EO2 to indicate that the IAM was received and processed. As soon as the phone is answered at EO4, EO4 sends an Answer Message (ANS) back to EO2 indicating that the phone at EO4 was picked up, and at that time the trunks are connected together. EO2 connects its user to that trunk and EO4 connects its user to that trunk so that communication is established. All such messaging may occur in about 600 milliseconds which would be average but not necessarily fast.

The foregoing constitutes the function of the STPs insofar as routing is concerned. The STPs look at a point code and if it is not for them they just pass it on via a route determined from translations and routing tables. The C link is the last route permitted and is not utilized unless no other route is available.

As opposed to the foregoing, where the point code was for EO4 and not STP1, the point code may be for STP1. One example of such a situation would be the case of an 800 call. The 800 number is a fictitious number which is associated with a POTS number in a database in the SCP. Thus if EO2 makes an 800 call to EO4 it is necessary to determine the real telephone number. EO2 launches a Switching Connection Control Park (SCCP) message, which is a database request. This point code has a destination point code of an alias which is the point code of STP1 and STP2. STP1 and STP2 have various point codes indicated in FIG. 1 as 246-100-000 and 246-101-000. They also have alias point codes that indicate that they have a function to perform. Upon recognizing such a point code the STP does a data search and generates another SCP message to perform a database dip. This returns the real telephone number and the STP now has the destination point code of the real telephone number message. This is sent back to EO2. STP1 determines that this message is not for me but for EO2. The message is sent back down to EO2. EO2 now has a real telephone number and the system performs the IAM and ACM procedure all over again to set up the call. The only difference between a regular direct call and an 800 call is the necessity to perform the dip to obtain the real number first. This procedure takes about 1.3 seconds because of the additional operation. The STPs have various databases, such as the 800 database and the credit card database, and there is still a further database for AIN. It is these databases which are utilized for the purposes of the present invention.

The SS7 protocol describes how the signal messages are built and routed and provides for network management of the SS7 network itself. Thus if a link between EO4 and STP3 were to be lost, STP3 generates a transfer restricted message (TFR) to all nodes, i.e., all SPs connected to STP3, indicating that traffic is not to be sent to STP3 for EO4 because no route from STP3 to EO4 exists. If both A links to EO4 were down, EO4 would essentially be isolated and the STP pair STP3 STP4 would broadcast a transfer prohibited (TFP) message indicating that nothing should be sent to the pair for EO4.

In the transfer restricted situation it would be possible for STP3 to reach EO4 via the C link to STP4. This is a non-favored route but would be used in necessity. Handling such situations is the purpose of network managing messages. Congestion control or TFC accomplishes basically the same thing except that it constitutes a more sophisticated message limiting use of a circuit by stopping messages below a certain priority. Each message has a different priority. IAMs have a priority of 1 where ANS messages have a priority of 2.

Upon congestion occurring in the STP node for EO4 a new call could not be sent to EO4 because it constitutes a priority 1 message which is restricted because the congestion level is 2. Only priority 2 messages and higher would be permitted. If a call is already existing it could be answered or released. Releases have a priority of 2 to permit call completion. New calls could not be initiated until the congestion had been removed or lowered to congestion status 1 or 0.

The SS7 network constitutes a sophisticated network having a high predictability which is spelled out in the predetermined protocol. The SS7 messages traverse the network at all times. The messages themselves comprise digital serial messages of various length that come into the STP. The start of the message is identified by a flag which is a zero followed by 6 ones and another 0. This constitutes a unique bit pattern in the SS7 protocol. The protocol ensures that this particular pattern is not repeated until the next message. This provides a flag at the beginning of a new message. A flag at the end of a message is also provided usually in the form of the flag at the beginning of the next message, i.e., a message usually contains only one flag. The message is arranged in 8 bits or in octets. These octets represent the information carried by the message. The message contains both fixed and variable parameters. The Message Transport Part (MTP) of the SS7 message is always in the same place. The values change but the MTP is always in the same place.

Figures 2, 3:
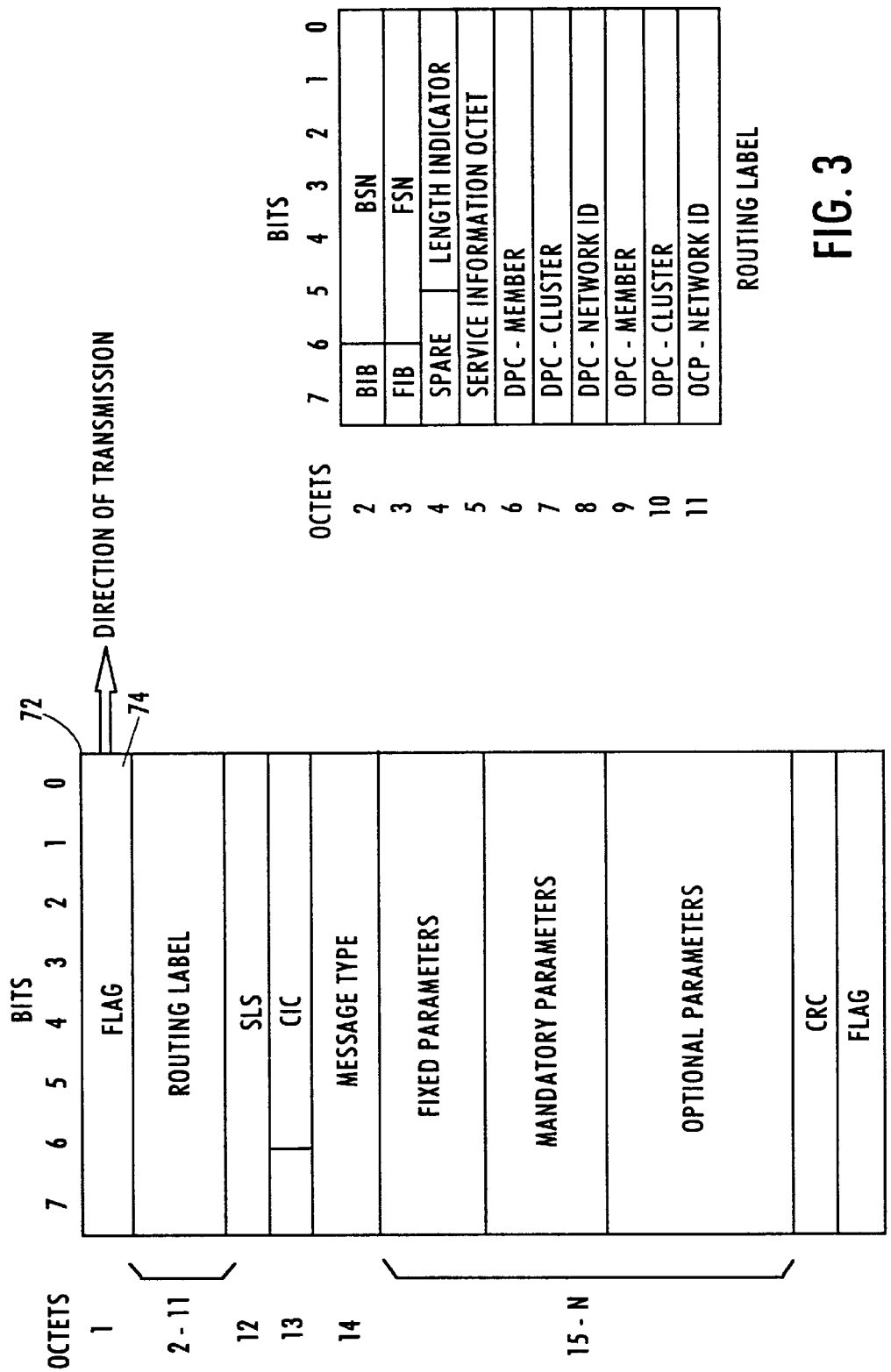
FIGS. 2 and 3 illustrate in graphic and tabular form respectively the protocol of an SS7 data signal.

Referring to FIGS. 2 and 3, the start of a message is indicated at 72 with the commencement of the flag 74. The first 7 bits following the flag constitute the Backward Sequence Number (BSN). The eighth bit is the backward indicator bit which is used to track whether messages have been received correctly. The backward sequence number was the forward sequence of the other node's message when it was sent. Referring to FIG. 1, if EO2 sends a message to EO4, EO2s include a Forward Sequence Number (FSN) in the 3rd octet of its message. Upon receiving this message, EO4 will include a Backward Sequence Number (BSN) equal to the FSN sent in the previous message in its next message to EO2. This indicated to EO2 that EO4 received the first message. This constitutes a positive acknowledgment of receipt of a message. If the eighth bit of the second octet or Backward Indicator Bit (BIB) is inverted, it indicates a failure to receive the identified message. If the 8th bit in the 2nd octet, Backward Indicator Bit (BIB), is inverted, it tells the receiving node that the identified message was not received. The accompanying BSN represents the last message that was received. The receiving node will then invert its Forward Indicating Bit (FIB), 8th bit of the 3rd octet, acknowledging a retransmission remission request, and will begin to send the missing messages until the transmitting end successfully acknowledges all remaining messages, i.e.:

EO2 sends a message with a FSN of 5 to EO4;

EO4 transmits a message back to EO2 with an inverted BIB and a BSN of 2, indicating that was the last message it received;

EO2 then inverts its FIB and retransmits message 3;

If EO4 acknowledges this message correctly (BSN of 3) EO2 will retransmit message 4 and then 5.

Thus between the BIB and FIB and BSN and FSN, the STP keeps track of all of the messages sent between the two nodes at each end of a link. This provides predictability. If a node fails to receive an acknowledgment within a predetermined period of time it will take the link out of service because it is receiving no acknowledgments. This is usually a short period of time such as 1.6 seconds.

Every 8 bits represents another part of the message until the end of the message. At about the fourth octet there is a length indicator to indicate the length of the message. In this case the message is bad in that it indicates six which is not a complete message. Assuming a complete message where the length indicator indicates 23 octets, this provides another means for error detection. Thus if the recipient counts to 28 this indicates that something is wrong and the message is sent again.

Octet 5 is the Service Information Octet (SIO). This indicates whether it is a Fill In Signal Unit (FISU), Link Service Signaling Unit (LSSU) or Message Signaling Unit (MSU). MSUs are used for setting up calls or 800, LSSUs are used for alignment, and FISUs are fill in signals. Thus an LSSU is seen only if the link is out of service and going back into service or going out of service.

Octets 6–11 contain the point codes. Thus the point code 235-81-8198 is the point code which would be read in FIG. 3. This is backwards as it comes from the message which arrives number, cluster, network ID in the order of bits received. That constitutes the routing label telling the STP and the nodes where the message came from and where it is going. Other parameters are involved depending upon the kind of message. If this were a FISU, that would be it. There would be 16 other bits that have Cyclic Redundancy Codes (CRCs) in them and another flag which would constitute the end. CRCs constitute a further error detection code which is a legal 1 function in the protocol. From the foregoing it will be seen that the messages contain various fields. This describes the basic format of an SS7 message which is the same for all messages of the same type.

The SS7 protocol consists of four basic sub-protocols:

Message Transfer Part (MTP), which provides functions for basic routing of signaling messages between signaling points.

Signaling Connection Control Part (SCCP), which provides additional routing and management functions for transfer of messages other than call set-up between signaling points.

Integrated Services Digital Network User Part (ISUP), which provides for transfer of call set-up signaling information between signaling points.

Transaction Capabilities Application Part (TCAP), which provides for transfer of non-circuit related information between signaling points.

Architecture of A Telephone Network with Voice Mail

Figure 5:
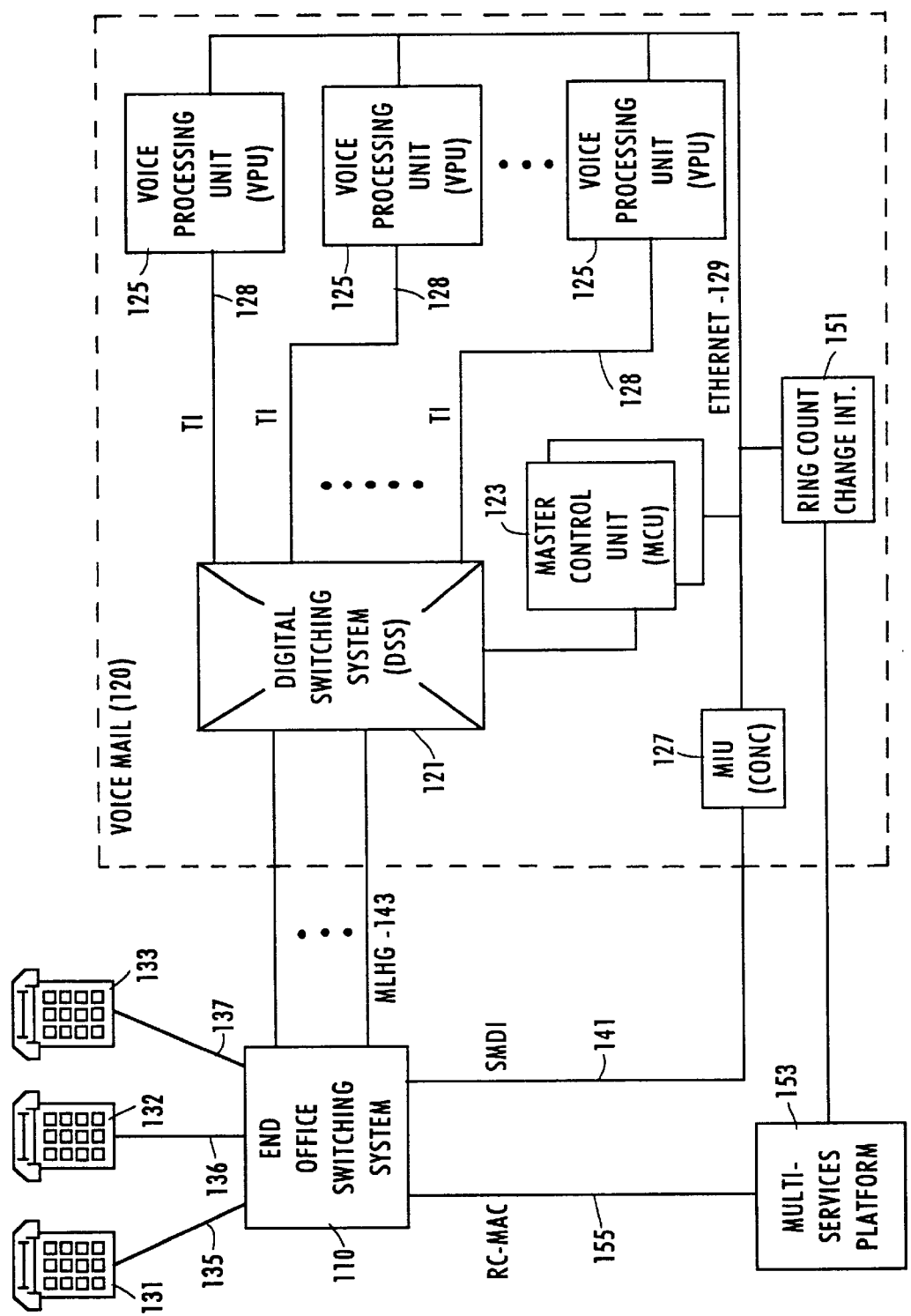
FIG. 5 shows details of a voice mail system usable with the invention and incorporated in one type of telephone network.

In FIG. 5, there is shown a voice mail implementing communication system which includes at least one switching system 110 and at least one centralized message service voice mail system 120. The switching system 110 may be a local or "end office" type telephone central office switch, such as a 1AESS or 5ESS switch sold by American Telephone and Telegraph.

The end office switching system 110 typically includes, among other components, a space or time division switching matrix, a central processing unit, an input/output device and one or more data communication units. A typical switch is described in further detail hereinafter in relation to FIG. 12. Structurally, the switching system 110 is a standard central office telephone switch. Each subscriber has at least one piece of customer premises equipment, illustrated as telephone station sets 131 to 133. Local telephone lines 135 to 137 serve as communication links between each of the telephone station sets 131 to 133 and the end office switching system 110. Although shown as telephones in FIG. 5, the subscriber station equipment can comprise any communication device compatible with the line. Where the line is a standard voice grade telephone line, for example, the subscriber station equipment could include facsimile devices, modems, etc.

The centralized message service or voice mail system in the illustrated example comprises voice messaging equipment such as a voice mail system 120. Although referred to as "voice" messaging equipment, equipment 120 may have the capability of storing messages of a variety of different types as well as voice messages. For example, a single system 120 may receive incoming messages in the form of audible messages, such as voice messages, as well as text format data messages. The voice messaging equipment 120 may also store messages in an image data format, such as facsimile. Message service systems having the capability to store messages in a variety of audible, data and image formats are known, see e.g. U.S. Pat. No. 5,193,110 to Jones et al., U.S. Pat. No. 5,008,926 to Misholi and U.S. Pat. No. 4,652,700 to Matthews et al.

The illustrated voice mail system 120 includes a digital switching system (DSS) 121, a master control unit (MCU) 123, a number of voice processing units (VPUs) 125 and a master interface unit (MIU) or concentrator 127. The master control unit (MCU) 123 of the voice mail system 120 is a personal computer type device programmed to control overall operations of the system 120.

Each of the voice processing units 125 also is a personal computer type device. The voice processing units 125 each include or connect to one or more digital mass storage type memory units (not shown) in which the actual messages are stored. The mass storage units, for example, may comprise magnetic disc type memory devices. Although not specifically illustrated in the drawing, the voice processing units 125 also include appropriate circuitry to transmit and receive audio signals via T1 type digital audio lines. To adapt the system 120 to receive information other than voice and/or offer services other than voice mail, one or more of VPU's 125 might be reprogrammed to run other types of applications and/or process other types of incoming information. For example, one such unit might process facsimile information, one might process E-mail, etc.

An ETHERNET type digital network 129 carries data signals between the MCU 123 and the voice processing units 125. The Ethernet network 129 also carries stored messages, in digital data form, between the various voice processing units 125. The system 120 further includes T1 type digitized audio links 128 between the DSS switch 121 and each of the voice processing units 125.

The voice mail system 120 connects to the switching system 110 via a number of simplified message desk interface (SMDI) type data lines 141. Specifically, these SMDI links 141 connect between one or more data units (not shown) in the end office switching system 110 and the MIU 127 in system 120. Each SMDI line 141 carries 2400 baud RS-232 data signals in both directions between the voice mail system 120 and the switching system 110. The MIU 127 is a data concentrator which effectively provides a single connection of as many as thirty-two SMDI lines into the MCU 123 of the voice mail system.

The voice mail system 120 also connects to the end office switching system 110 via a number of voice lines 143 which form a multi-line hunt group (MLHG) between the switch matrix within the switching system 110 and the DSS switch 121 of the voice mail system 120. Typically, the MLHG lines 143 consist of a number of T1 type trunk circuits which each carry 24 voice channels in digital time division multiplexed format.

The above described voice mail system architecture is similar to existing voice mail type central messaging systems, such as disclosed in U.S. Pat. No. 5,029,199 to Jones et al., although other messaging system architectures such as disclosed in the other patents cited above could be used.

For purposes of the present embodiment, the voice mail system 120, or other centralized messaging system, will further comprise a ring count change interface 151. The interface 151 connects to the Ethernet network 129 and provides two-way data communication between the network 129 in the voice mail system 120 and a multi-services platform (MSP) 153. For example, the unit 151 might provide a 9600 baud data channel over a line to the platform 153.

The interface 153 will receive packets of data over the Ethernet network 129 indicating changes in the status of the various subscribers' mailboxes. These packets of data will identify a particular subscriber and indicate the number a number of rings for future use in processing calls for that subscriber. The interface 153 forwards the ring count change data packets to the platform 153. The interface also receives data signals from the MSP 153, for example acknowledgements of transmitted data and/or signals indicating actual changes of status information by the switching system 110. In enhanced embodiments, the interface might include some data processing capabilities, as well. Also, the interface can provide instructions to change some other parameter of the call forwarding procedure, such as the subscriber's forwarding number.

The multi-services platform 153 connects to the end office switching system 110 via a recent change-memory administration channel (RC-MAC) 155. RC-MAC 155 is a data link to the processor of the switching system 110 for inputting data into the translation tables used by the switching system 110 to control switched communications operations with regard to each subscriber's line. The multi-services platform is a processor for receiving various service change instructions, including those from the interface 151 and from other sources, processing the instructions as necessary to make them compatible with switch programming, and forwarding instructions to the switching system 110 to change specific relevant translation table data stored in the switching system. In response to the change of status data from the ring count interface 151, the multi-services platform 153 provides appropriate data packet signals on the RC-MAC channel 155 to the end office switching system 110 to change a particular subscriber's ring count for forwarding on no answer. The instructions from the MSP 153 will identify a specific subscriber's line and will specify a ring count or ringing interval for use in determining when a call for that subscriber has gone unanswered and should be forwarded to the voice mail system 120. The multi-services platform may also forward instructions to change other parameters of the call forwarding function.

Operation via an RC-MAC channel to change data in a switching system relating to call forwarding is described in U.S. Pat. No. 5,012,511 to Hanle et al., the disclosure of which is incorporated herein in its entirety by reference. The multi-services platform 153 is the same as or substantially similar to a processor used in the patented system to process various translation memory change requests, both from RC-MAC terminals and a voice response unit.

Overview of Operation of Voice Mail Network

In various operations discussed in more detail below, calls can be forwarded to the voice mail system 120 in response to calls to subscriber's lines. The switching system 110 may also route some calls directly to the voice mail system 120 in response to callers dialing a telephone number assigned to the lines 143 going to the voice mail system 120. When the end office switching system 110 directs a call to the voice mail system 120, whether as a forwarded call or as a direct call in response to dialing of a number for accessing the system 120, the switching system places the call on any available channel on the multi-line hunt group lines 143.

When the end office switching system 110 forwards a call to the voice mail system 120, the switching system 110 will also provide various data relating to the call via one of the SMDI links 141 and the MIU 127. In particular, the switching system 110 transmits data to the MCU 123 of the voice mail system 120 indicating which line of the multi-line hunt group 143, i.e., which T1 trunk and which channel on the trunk, that the new call will come in on. The exchange 110 also transmits data via SMDI link 141 identifying the called telephone number and the telephone number of the caller. For a call forwarded to a mailbox, the data from the exchange indicates the reason for the forwarding, and the caller telephone number (typically the directory number assigned to the called subscriber's normal telephone line) identifies which subscriber the forwarded call relates to. The master control unit 123 uses the multi-line hunt group line information and the subscriber's directory number to internally route the forwarded call though DSS switch 121 and one of the internal T1 links 128 to an available voice processing unit 125 and identifies the relevant subscriber to that voice processing unit via the Ethernet 125.

For each party who subscribes to a voice mail service provided by the centralized messaging system 120, the MCU 123 stores information designating one of the voice processing units 125 as the "home" unit for that subscriber. Each voice processing unit 125 stores generic elements of prompt messages in a common area of its memory. Personalized elements of prompt messages, for example recorded representations of each subscriber's name spoken in the subscriber's own voice, are stored in designated memory locations within the subscriber's "home" voice processing unit.

In voice mail systems of the type discussed above, a subscriber's "mailbox" does not actually correspond to a particular area of memory. Instead, the messages are stored in each "mailbox" by storing appropriate identification or tag data to identify the subscriber or subscriber's mailbox which each message corresponds to.

Each time a call comes in to the voice mail system 120, the master control unit 123 controls the digital switching system 121 to provide a multiplexed voice channel connection through to one of the voice processing units 125. Typically, the call connection goes to the "home" voice processing unit for the relevant subscriber. The voice mail subscriber is identified by data transmitted from the switching system 110, as described above, if the call is a forwarded call. If all 24 T1 channels to the "home" voice processing unit are engaged, the central processing unit 123 controls switch 121 to route the call to another voice processing unit 125 which is currently available.

The voice processing unit connected to the call retrieves prompt messages and/or previously stored messages from its memory and transmits them back to the calling party via the internal T1 line 128, the DSS switch 121 one of the MLHG lines 143, end office switching system 110 and the calling party's telephone line, such as line 135 or line 137. The voice processing unit 125 connected to the call receives incoming messages from the caller through a similar route and stores those messages in digital form in its associated mass storage device.

When the incoming call is a forwarded call, the connected voice processing unit 125 provides an answering prompt message to the caller, typically including a personalized message recorded by the called subscriber. After the prompt, the voice processing unit 125 records a message from the caller and identifies that stored message as one for the called subscriber's mailbox.

At times the connected voice processing unit 125 will not have all necessary outgoing messages stored within its own associated memory. For example, a forwarded call normally will be connected to the called subscriber's "home" voice processing unit 125, but if the home unit is not available the forwarded call will be connected to a voice processing unit 125 other than the subscriber's home voice processing unit. In such a case, the connected unit 125 requests and receives from the home unit 125 the personalized components of the answering prompt message via the data network 129. The connected voice processing unit 125 will store the transferred message data in its own memory, and when necessary, will play back the transferred data from its own memory as outgoing messages in the exact same manner as for any prompts or greeting messages originally stored in its own memory.

The connected voice processing unit 125 also will store any incoming message in its own associated memory together with data identifying the message as one stored for the called subscriber's mailbox. As a result, the system 120 actually may store a number of messages for any given subscriber or mailbox in several different voice processing units 125. Subsequently, when the voice mail subscriber calls in to the voice mail system 120 to access the subscriber's mailbox, the call is connected to one voice processing unit 125. Again, this call typically goes to the home unit 125 but would go to a different available one of the units 125 if the home unit is not available at the time. In response to appropriate DTMF control signals received from the subscriber, the connected voice processing unit retrieves the subscriber's messages from its own memory and plays the messages back to the subscriber. If any messages are stored in other voice processing units, the connected unit 125 sends a request the other units 125 to download any messages for the subscriber's mailbox those units have actually stored. The downloaded messages are stored in the memory of the connected voice processing unit 125 which replays them to the subscriber.

Voice Mail Architecture in (AIN) Network

Figure 6:
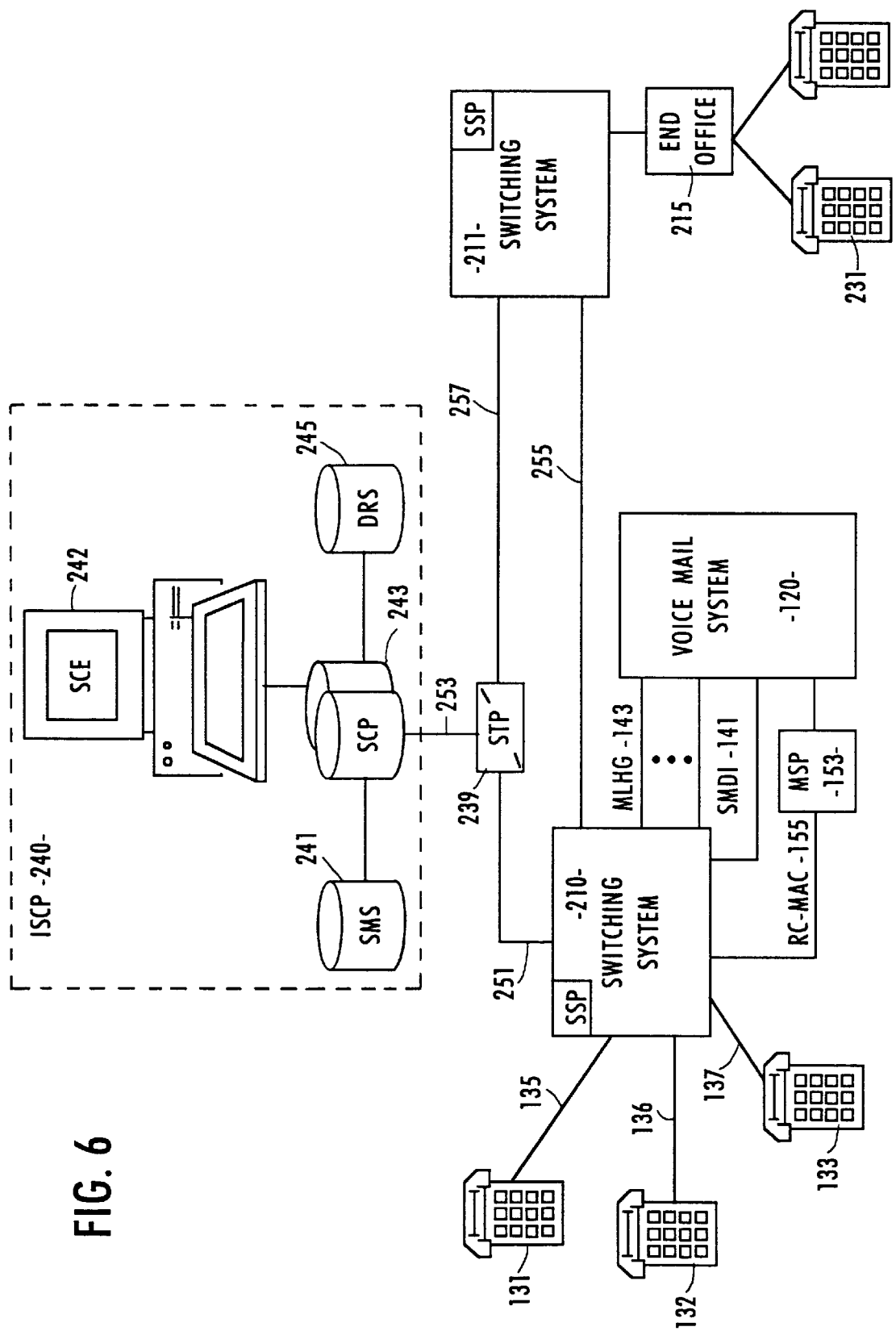
FIG. 6 shows the voice mail system of FIG. 5 incorporated in a common channel signaling network.

FIG. 6 shows an architecture for providing centralized messaging type services, such as voice mail, using AIN for its conventional purpose. In the communication system shown in that drawing, elements corresponding to identical elements in FIG. 5 are identified with identical reference numerals. For example, the voice mail system 120 in FIG. 6 is identical to that shown in FIG. 5 and connects to the switching system via the multi-line hunt group (MLHG) 143, the SMDI links 141, the multi-services platform or MSP 153 and the associated RC-MAC channel 155. The voice mail system 120 operates essentially as described above, with respect to FIG. 5.

In the embodiment of FIG. 6, the end office switching system 210 is a Service Switching Point (SSP) capable switching system. SSP's are appropriately equipped programmable switches (such as a 5ESS) present in the telephone network, which recognize AIN type calls, launch queries to the ISCP and receive commands and data from the ISCP to further process the AIN calls. The SSP functionality may reside in an end office such as shown at 2110, or the SSP functionality may reside in a tandem office such as shown at 211, which in turn provides trunk connections to one or more other end offices 215 which lack SSP capability. End offices without such functionality route AIN calls to one of the SSP type offices.

The SSP's 210 and 211 connect to each other via trunk circuits for carrying large numbers of voice communications, such as the trunk circuit shown as thick dark line 255 in FIG. 6. The SSP's 210 and 211 also connect to an STP 239 via data links 251, 257, for signaling purposes. An STP can connect to a large number of the SSP's. The STP 239 provides data signaling communications between the SSP's 210, 211 and with the ISCP 240. Although shown as a single STP, the AIN may include a number of STP's organized in an appropriate hierarchy to handle the expected level of signaling traffic. The data links 251, 257 between the SSP type switching systems 210, 211 and the STP 239 are typically SS7 (Signaling System 7) type CCIS interoffice data communication channels. The STP 239 in turn connects to other STP's and to the ISCP via a packet switched network 253 which may also be an SS7 network. The above described data signaling network between the SSP type offices and the ISCP is preferred, but other signaling networks could be used.

The messages transmitted between the SSP's 210, 211 and the ISCP 240 are all formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from an SSP includes among other data a "Service Key" which is the calling party's address, and the digits dialed by the caller. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits.

There could be one or more ISCP's per state, to avoid overloading existing CCIS data links. Alternatively, the ISCP could be implemented on a LATA by LATA basis or on a regional operating company basis, i.e., one database for the entire geographic area serviced by one of the Regional Bell Operating Companies. In fact, if federal regulations permit, the database service may be offered nationwide.

The ISCP 240 is an integrated system. Among other system components, the ISCP 240 includes a Service Management System (SMS) 241, a Data and Reporting System (DRS) 245 and the actual database referred to as a Service Control Point (SCP) 243. The ISCP 240 also typically includes a terminal subsystem referred to as a Service Creation Environment or SCE 242, for programming the database in the SCP 243 for the services subscribed to by each individual subscriber to one of the AIN services. The SMS 241 validates service logic and data entered by the TELCO or the subscriber, and manages the process of actually updating the data files in the SCP database 243.

Each central office switching system or SSP normally responds to a service request on a local communication line connected thereto, for example an off-hook followed by dialed digit information, to selectively connect the requesting line to another selected local communication line. The connection may be made locally through only the connected central office switching system. For example, for a call from station 131 to station 132 the end office type SSP 210 provides the call connection without any connection to another central office. When the called line connects to a distant station, for example for a call from station 11 to station 231, the connection is made through the connected end office switching system SSP 210 and at least one other central office switching system, such as tandem SSP 211 and end office 215, by means of the telephone trunks interconnecting the various office switching systems.

In the normal call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in channel signaling, the trunks would be engaged before a determination is made that the called line is available or busy. Particularly if the called line is busy, this would unnecessarily tie up limited trunk capacity. The CCIS system through the STP's originally was developed to alleviate this problem.

In the CCIS type call processing method, the local central office suspends the call and sends a query message through one or more of STP's. The query message goes to the central office to which the called station is connected, referred to as the "terminating" central office. The terminating central office determines whether or not the called station is busy. If the called station is busy, the terminating central office so informs the originating central office which in turn provides a busy signal to the calling station. If the called station is not busy, the terminating central office so informs the originating central office. A telephone connection is then constructed via the trunks and central offices of the network between the calling and called stations. The receiving central office then provides a ringing signal to the called station and sends ringback tone back through the connection to the calling station.

The call processing routines discussed above are similar to those used in existing networks to complete calls between stations. In an AIN type network system, these normal call processing routines would still be executed for completion of calls between customer stations, when call processing does not involve one of the AIN services.

In an Advanced Intelligent Network (AIN) type system, such as shown in FIG. 6, certain calls receive specialized AIN type processing under control of data files stored in the SCP database 243 within the ISCP 240. In such a network, the SSP type offices 210, 211 of the public telephone network detect a call processing event identified as an AIN "trigger". For ordinary telephone service calls, there would be no event to trigger AIN processing; and the local and toll office switches would function normally and process such calls as discussed above, without referring to the SCP database 243 for instructions. An SSP type switching office which detects a trigger, however, will suspend call processing, compile a TCAP formatted call data message or "query" and forward that message via a common channel interoffice signaling (CCIS) link 251 or 257, the STP 239, and link 253 to the ISCP 240 which includes the SCP database 243.

The TCAP query message contains a substantial amount of information, including for example data identifying the off-hook line, the number dialed and the current time. Depending on the particular AIN service, the ISCP uses a piece of data from the query message to identify a subscriber and access the subscriber's files. For example, for some form of terminating type AIN service the dialed number would correspond to the called AIN subscriber, therefore the ISCP 240 uses the dialed number to access the subscriber's data file within the SCP database 243. From the accessed data, the ISCP 240 determines what action to take next. If needed, the ISCP 240 can instruct the central office to obtain and forward additional information, e.g., by playing an announcement and collecting dialed digits.

Once sufficient information about the call has reached the ISCP 240, the ISCP accesses its stored data tables to translate the received message data into a call control message. The call control message may include a substantial variety of information including, for example a destination number and trunk group selection information. The ISCP 240 returns the call control message to the particular SSP 210 or 211 which initiated the query via CCIS links and the STP 239. The SSP then uses the call control message to complete the particular call through the network.

The SSP type switches can recognize a variety of events as triggers for activating a query and response type AIN interaction with the ISCP, and different AIN services use different types of triggers. The present invention involves a call forwarding or call redirect type AIN service and uses a dialed destination number as the triggering event. This type of trigger is sometimes referred to as a terminating trigger. Other types of AIN type services using the dialed number of the terminating station or subscriber as the trigger are disclosed in commonly assigned U.S. Pat. No. 5,353,331 entitled Personal Communication Services Using Wireless/Wireline Integration, and U.S. patent application Ser. No. 07/888,098 filed May 26, 1992, entitled Method for Concurrently Establishing Switch Redirection for Multiple Lines, the disclosures of these two commonly assigned applications being incorporated herein in their entirety by reference.

In the AIN embodiment shown in FIG. 6, the voice mail system 120 operates exactly as in the first embodiment shown in FIG. 5. The SSP type switching system 210 provides a forward on 'no answer' condition of the type used in the embodiment of FIG. 5. The difference is that the switching system 210 will use the forwarding operation only for the high count forwarding when no new message is stored. In such cases, the switching system 110 will use only one relatively high ring count threshold for all calls to any given voice mail subscriber's line. This threshold value may be a high default value. The SSP type switching system 210 will execute this forwarding routine with a high threshold for calls to a subscriber after a signal from the voice mail system indicating that all new messages for that subscriber have been replayed.

In switch based call forwarding of the type discussed above, if a called subscriber's line is available, the switching system terminates calls for a subscriber on the subscriber's line. The switching system forwards the call to the forwarding number, e.g., a number associated with the multi-line hunt group 143 into the voice mail system, only if no one answers the call for a certain ringing interval or a certain ring count. In an AIN, such as shown in FIG. 6, the network can reroute a call without first terminating the call on the called line. The AIN actually redirects the call to the destination during initial call processing, without waiting for a no-answer condition. The illustrated AIN embodiments of the present invention rely on such AIN type call redirection to route calls for subscriber's who have messages waiting directly to the voice mail system 120.

To initiate AIN type call redirection, the switching system sets a destination number trigger in its internal translation information associated with a particular subscriber's line. The trigger is set in response to a signal from the voice mail system 120 indicating that the system 120 has stored new messages for that subscriber.

While the trigger associated with a subscriber's line is active, when the SSP switching system 210 receives a call to that subscriber, the SSP will suspend call processing and query the ISCP 220 for a destination number to actually route the call to. The ISCP 240 will return a number associated with the multi-line hunt group 143, and the SSP type switching system 210 will connect the call to one of the lines of that group 143. To the caller, the first ringback heard will correspond to the first ring at the voice mail system. This results in a forwarding to the voice mail system without a prior ring.

In the system of FIG. 6, the voice mail system 120 will still send some form of signal to the switching system 210 through the interface 151, the MSP 153 and the RC-MAC channel 155 equivalent to the ring count change to high instruction. In response, the switching system 210 will cancel the terminating trigger designation associated with the particular subscriber's line. The next call to the subscriber will therefore be forwarded by the switch after a high number of rings without an answer on the subscriber's line.

The construction and operation of the voice mail systems shown in FIGS. 5 and 6 are described more fully in commonly assigned patent application Ser. No. 08/121,855 filed Sep. 17, 1993, entitled Toll Saver for Centralized Messaging Systems, now U.S. Pat. No. 5,475,737, issued Dec. 12, 1995, the disclosure of which commonly assigned application is incorporated herein in its entirety by reference.

Figure 4:
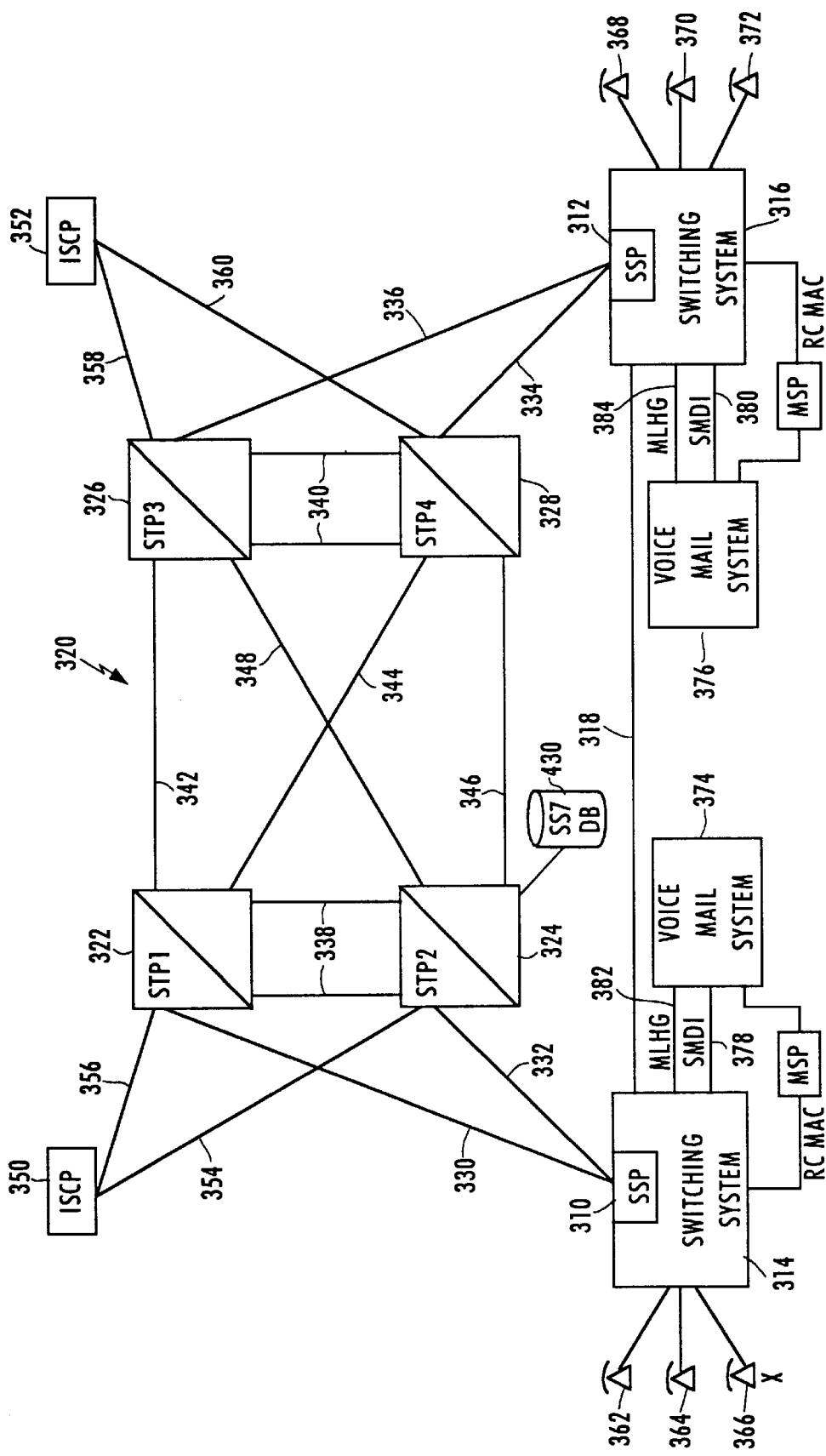
FIG. 4 shows a simplified diagram of a public switched telephone network equipped with central messaging systems for implementing the system and method of the invention.

Referring to FIG. 4 there is shown a simplified diagram of a public switched network such as illustrated and described with more detail in connection with FIG. 1. The network in FIG. 4 includes a voice mail system associated with each of the switching systems. FIG. 4 shows two SSP's 310 and 312 which comprise end office switching systems 314 and 316. The end office 314 represents an end office in the region of one regional operating company, while end office 316 represents an end office in the region of a different operating company. The SSP's in a given region are connected together by local trunks (not shown) and the SSP's 310 and 312 are connected via access tandems (not shown) and interexchange carrier network trunks or ICN trunk 318 in FIG. 4.

The SS7 network, indicated generally at 320, includes a series of STP's 322, 324, 326 and 328 designated STP 1, STP 2, STP 3 and STP 4. Each STP is connected to the other STP's by A links indicated at 330, 332, 334 and 336. STP 1 and STP 2 constitute a mated pair of STP's connected by C links 338, each mated pair serving its respective transport area. STP 1 is connected to STP 3 by B link 342 and to STP 4 by D link 344. STP 2 is connected to STP 4 by B link 346 and by D link 348.

The STP's are connected to ISCP's 350 and 352 by A links 354, 356, 358 and 360. The STP 324 is connected to an SST database 430 which is hereafter described in detail.

Each switching system 314 and 316 in this illustration comprises an end office and is connected to customer premises equipment, illustrated as telephone stations 362, 364, 366, 368, 370 and 372. Local telephone lines or local loops serve as communication links between each of the telephone stations and its end office switching system. It will be understood that the subscriber station equipment may also comprise other communication devices compatible with the line, such as facsimile devices, modems, etc.

Each switching system 314 and 316 is also provided with a centralized message service or voice mail system shown in FIG. 4 as 374 and 376. These systems may be of the type illustrated and described in detail in connection with FIG. 5 and 6. Although referred to as voice messaging equipment, the systems 374 and 376 may have the capability of storing messages of a variety of different types as well as voice messages. For example, a single system may receive incoming messages in the form of audible messages such as voice messages, as well as text format data messages. The equipment may also store messages in an image data format such as facsimile.

The voice mail systems 374 and 376 connect to the switching systems 314 and 316 via SMDI data lines 378 and 380 and by multi-line hunt groups (MLHG's) 382 and 384. Typically, the MLHG lines consist of a number of T1 type trunk circuits which each carry 24 voice channels in digital time division multiplexed format.

The operation of the system shown in FIG. 4 according to the invention may be as follows:

A subscriber associated with telephone station 362 desiring to leave a voice message in the mailbox of a remote subscriber, such as the subscriber associated with telephone station 368, may use a telephone station to access his own voice mailbox in the voice mail system 374. This may be accomplished by dialing a number associated with the voice mail system 374 for this purpose. The voice processing unit of the voice mail system may operate its voice menu to direct the caller to depress a specified key when satisfied with the message in a known fashion. It may then query the caller as to whether he desired to send the message and, if so, to depress another specified key. The voice unit then will instruct the caller as to the procedure for keying in the identify of the destination and to depress a further specified key to send the message. This foregoing procedure is not intended to be exclusive and other procedures for leaving and commanding the dispatch of a message which are described in the background patents discussed above may be utilized. In all cases the message is digitized in conventional fashion and stored in the mailbox of the sender. The caller may go on-hook after depressing the designated send key. The depression of the send key causes the generation of a tone or signal which is recognized by the SSP 310 as a trigger.

Figure 7:
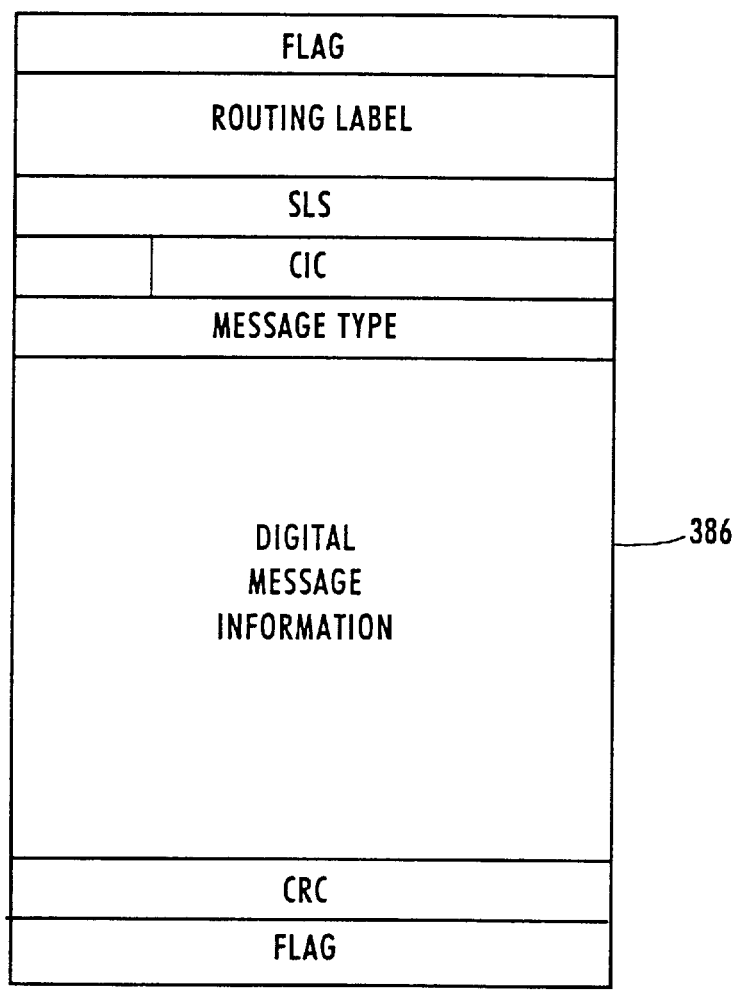
FIG. 7 illustrates a packet carrying digital message information according to the invention.

In response to the trigger, the SSP frames a TCAP inquiry message which is directed via one or more of the STP's 322 and 324 to the ISCP 350 for instructions. The TCAP message includes information identifying the calling station and mailbox and the called station and the fact that the caller is requesting mailbox-to-mailbox message transfer. The ISCP consults its database to establish the existence and identity of a mailbox for the called number. If the identity of such a mailbox is found, the ISCP then originates a response to the SSP to packetize and dispatch one or more SS7 packets to the called directory number and mailbox (if available) with an appropriate routing label and handling instructions and carrying as the included information in the SS7 packets the digitized voice retrieved from the mailbox of the sender. An illustrative packet is shown in FIG. 7 with the digital message information incorporated at 386. The information may be in T1 protocol which is conventionally the output digital signal of mailbox equipment used in the public switched telephone networks regardless of manufacture. Thus any translation which is necessary between the digitized message in the mailbox and the T1 or equivalent protocol used in the SS7 packets inherently occurs in the equipment furnished by the voice mail system manufacturer.

The number of SS7 packets which may be required will be dependent upon the length of the message as in conventional packet communication. Each packet includes suitable header information in the conventional manner. In this case if the identity of the destination mailbox was established from the database of the ISCP 350, that identity will be included in the outgoing packets. However, if the existence and/or identity of a mailbox associated with the destination directory number is not subject to determination in the database of the ISCP 350, the SSP 310 is instructed by the ISCP 350 to include in the packet header appropriate directions to the remote SSP 312 to cause triggering and the formation and dispatch of a TCAP inquiry message to the associated ISCP 352. In such a case the ISCP 352 conducts a dip of its database and provides the requested information to the SSP 312. The packet is thereupon processed through the SSP 312 and voice mail system 376 to digitally record the contents of the remotely originated information. Again the voice mail system is so designed as to inherently handle any translation necessary to communicate with the switching system in T1 or equivalent protocol. The fact that the packets may not arrive at the destination in the same order as originated is of no consequence in that real-time voice communication is not involved in the transfer.

The dispatched SS7 packet communication proceeds through the common channel signaling SS7 network until all of the packets are received at the destination. It is a feature of the invention that the redundancy of the SS7 network and packet switching techniques permits packets traveling different routes to the same destination. This redundancy is utilized as a feature of the invention to enable to existing SS7 network to handle the digital packet communication involved without requiring modification of the SS7 system.

When the packets reach the destination SSP 312 and have been deposited in the mailbox of the addressee, the voice mail system 376 effects customary notification of the mailbox proprietor that a message is waiting. The proprietor may then access the mailbox in conventional fashion and have the message delivered as an audio voice message in the usual fashion. The recipient then has the option of returning a message in a converse fashion by depressing the appropriate keys at his telephone station which utilize the information in the packet header to reverse the origination and destination identifications. If the mailbox-to-mailbox communication feature is furnished by the involved telephone companies as an extra feature, it will be appreciated that either or both ISCP's 350 and 352 may ascertain from their appropriate databases the authorization of the user to access the service.

Because currently available ISCP's include billing modules they may also effect billing. The data may be sent out through the ISCP so that it can either be directed to the revenue accounting office on a direct line or it may send a TCAP message back into the SSP or end office switch to the originating number responsible for the origination of the call. Billing can be accomplished in any desired fashion, such as an bits per second, call set-up, number of packets, or any combination of the same. The billing information may go into the journal on the switch to be forwarded to the revenue accounting office.

According to another embodiment, the invention provides a system and method for transferring voice mail or messages to called parties who are not voice mail subscribers and thus do not possess individual or personal mailboxes. Pursuant to this embodiment of the invention, Voice Mail Systems 374 and 376 in the simplified network illustrated in FIG. 4 are provided with multiple unsubscribed mailboxes, which are here described as public mailboxes or mailboxes for temporary hire. It will be understood that such mailboxes may constitute mere addresses or addressable storage or memory in the voice mail system storage. Such mailboxes may be utilized according to a first embodiment of the invention in the following fashion.

A caller at telephone station 362 connected to central office 314 makes a call to a remote called party at station 370 at central office 316. In this case the common channel signaling system 320 determines that the call cannot be completed because of a busy or a no answer situation. The attempt to establish a voice connection between the two telephone stations is terminated and the caller is directed, as by voice prompt, to the voice mail system 374 associated with the originating central office 314. The voice processing unit associated with the voice mail system 374 informs the caller that the line is busy or that there is no answer and inquires as to whether or not the caller would like to leave a message. It also indicates that if the caller chooses to leave a message the charge will be, for example, twenty-five cents, which will be charged to his telephone bill. The Voice Processing Unit requests a yes or no response, either by voice or DTMF key or the equivalent. Where the response is affirmative, the caller is invited to leave the message in the conventional voice mail fashion and the message is stored in a public mailbox in the voice mail system 374. Appropriate messaging then occurs via the SMDI link 378 to effect billing to the caller.

Subsequent to termination of the deposit of the message as digitally stored data, the message is transferred in digital form from the public mailbox in voice mail system 374 to a temporarily mating or corresponding public mailbox in voice mail system 376. Such transfer is via the common channel signaling link pursuant to the invention as previously described. Following deposit or storage of the message in the destination voice mail system 376, that voice mail system initiates attempts to reach the called party or addressee at telephone station 370 to announce to that party that a message has been deposited for retrieval. The same announcement may include the instruction that the message may be retrieved by depression of a stated DTMF key. The actuation of the key may create a record constituting a receipt for the originating party. The digitally stored voice message is then delivered from the voice mail system 376 to the caller at station 370 as an audio voice message in the usual fashion. The notification of the receipt may be transferred to the billing record of the originating caller via the common channel signaling system and receipt noted with the billing for the delivery of the message.

As a still further feature of the invention, the original invitation to leave a message to the caller can include a further inquiry as to whether or not the caller requests a reply. The announcement may indicate that the delivery of the request and delivery of any reply would entail an additional charge of, for example, twenty-five cents. In the event that the caller requests a reply, the information which is transferred via the common channel signaling system pursuant to the invention includes an appropriate bit to indicate that a reply is requested. When the destination voice mail system delivers the message it responds to that bit by voicing a message that informs the recipient that a reply is requested. Instructions as to delivering a reply are provided to the called party or addressee by the destination voice mail system. The called party may then record the reply as digitized data in the local voice mail system 376.

Subsequent to termination of the connection between the destination voice mail system and the called party, the reply is transferred via the common channel signaling system back to the originating voice mail system 374 as previously described. The digitally stored reply is then delivered to the original calling party by a call from the voice mail system to the originating telephone station 364. The reply is also delivered as an audio voice message.

In the embodiment of the invention just described, the situation involved a busy or no answer condition. It is still another feature of the invention to offer the service of audio voice message delivery without an attempt to establish two-way telephone connection with the called party. Such a service may be set up using a real or virtual directory number to trigger the service. Dialing such number establishes a connection to a voice mail system local to the calling party having public or for hire mailboxes as previously described. This may be a public mailbox in the local voice mail system 374 in FIG. 4. The caller is invited to speak the message and the voice processing unit of the voice mail system may then operate its voice menu to direct the caller to depress a specified key when satisfied with the message in a known fashion. It may then query the caller as to the destination directory number. This may be followed by an inquiry to establish whether the caller requests a reply. Billing information is provided to the caller and suitable billing signaling is effected, as by use of the SMDI link 378 to the local voice mail system 374.

Following storage of the digitized voice message and digitized signaling regarding delivery and response, the digitized message is transferred via the common channel signaling system to a destination public mailbox in a voice messaging system designated by the ISCP on the basis of the directory number of the called party. This mailbox may be in the remote voice mail system 376 where the digitized message and instructions are stored. Delivery of the message is then effected in the same manner as previously described. Any reply is first stored in the public mailbox in voice mail system 376 and subsequently transferred through the common channel signaling system to the originating voice mailbox. The reply is then delivered to the original calling party by a telephone call to the originating telephone station.

As a still further additional feature of this embodiment of the invention, the methodology may be utilized to provide a 900 directory number type service. For example, an arrangement may be made for a well known celebrity to provide specified short duration responses to questions from fans. According to this embodiment of the invention, one or more pre-designated mailboxes is provided at each voice mail system offering the service. In-calling fans, such as using the telephone stations 352–356 in FIG. 4, are connected to the local voice mail system 374 via the multi-line hunt group (MLHG) 382. Such callers record their queries in pre-designated mailboxes or in one mailbox using multiple addresses. The callers are billed in a conventional fashion using appropriate SMDI signaling and billing procedures.

The digitized stored questions are transferred in due course as digitized messages over the common channeling signaling system as previously described. The messages are received and stored in the remote voice mail system 376, preserving the address of the query originator. The destination voice mail system 376 may be located anywhere in the system but is preferably local to the responding celebrity. A contractual arrangement is made with the celebrity whereby the celebrity periodically establishes a connection with the remote voice mail system and seriatim retrieves and responds to the questions.

Appropriate records for payment to the celebrity are created at the remote voice mail system and central office and associated platforms to effect the creation of an invoice and payment based upon the number of inquiries to which a response is made. Each response is digitally stored in the voice mail system local to the celebrity and subsequently delivered via the common channel signaling network to the enquiring callers or fans. Such delivery may be carried out in any convenient manner. Thus a call may be made from the local voice mail system 374 to the telephone station which initiated the question and the response may be delivered. Alternatively, the callers may merely be notified that their responses are ready for retrieval.

The present embodiment of the invention provides a system and method to permit a user or subscriber to establish a personal distribution list or a number of distribution lists and to then select a list and forward a message to the entire selected list. In its preferred mode this is accomplished by providing an off-board database dip for controlling processing and routing of out-of-band signaling messages. The concepts of the invention may apply to a variety of out-of-band signaling networks. The preferred embodiment, however, relates to improvements in an SS7 compliant common channel interoffice signaling system used in a public switched telephone network. In such an implementation, all signaling packets are routed through one or more Signaling Transfer Points (STPs). At least one STP is programmed to recognize certain aspects of a signaling message as a 'point in routing' (PIR) which triggers a database query or 'dip' to an off-board database separate from the STP.

The database provides an instruction to the STP as to how to route the particular signaling message. The signaling message routing information in the database may be extremely dynamic, for example varying with time of day, point-of-origin, traffic congestion, etc. For messages processed in this manner, modification of the STP routing functionality requires only a modification of the routing information in the database. Also, one database typically serves a number of STPs, permitting modification of the functionality of all of the STPs by modifying the data in a single database.

To facilitate understanding of this embodiment of the invention, it will be helpful to review the architecture and operation of a telephone network having CCIS capabilities.

Figure 8:
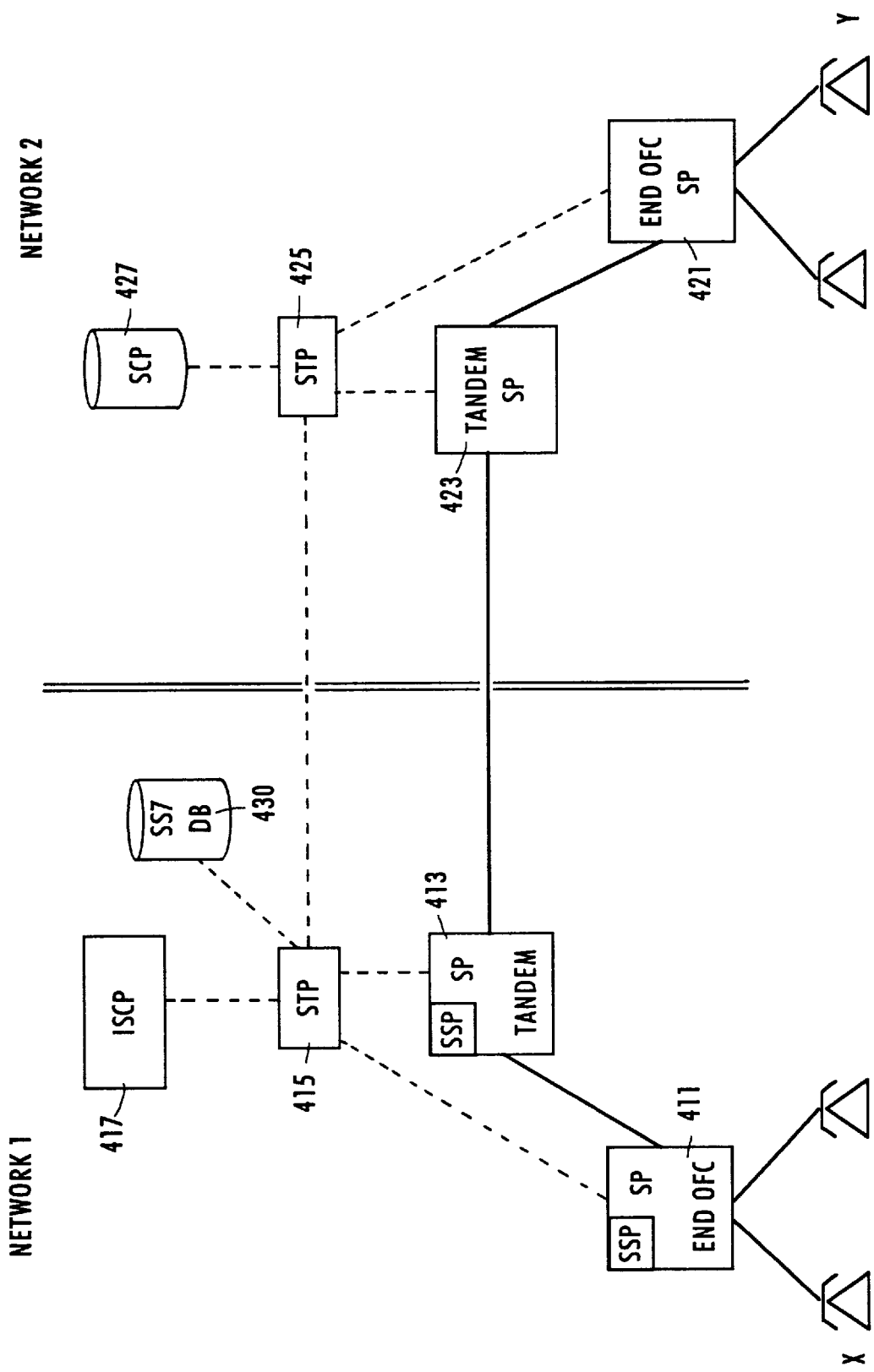
FIG. 8 is a simplified block diagram of a Public Switched Telephone Network and its SS7 signal control network, in accord with the present invention.

Referring to FIG. 8 there is shown a simplified block diagram of a switched traffic network and the common channel signaling network used to control the signaling for the switched traffic network. In the illustrated example, the overall network actually comprises two separate networks 1 and 2. As shown, these networks serve different regions of the country and are operated by different local exchange carriers. Alternatively, one network may be a local exchange carrier network, and the other network may comprise an interexchange carrier network. Although the signaling message routing of the present invention will apply to other types of networks, in the illustrated example, both networks are telephone networks.

In FIG. 8, a first local exchange carrier network 1 includes a number of end office switching systems providing connections local communication lines coupled to end users telephone station sets. For convenience, only one end office 411 is shown. The first local exchange carrier network 1 also includes one or more tandem switching systems providing connections between offices. For convenience, only one tandem office 413 is shown. As such, the first telephone network consists of a series of switching offices interconnected by voice grade trunks, shown as solid lines. One or more trunks also connect the tandem 413 to one or more switches, typically another tandem office, in the second network 2.

Each switching office has SS7 signaling capability and is conventionally referred to as a signaling point (SP) in reference to the SS7 network. In the first network 1, each switching office 411, 413 also is programmed to recognize identified events or points in call (PICs). In response to a PIC, either office 411 or 413 triggers a query through the signaling network to an Integrated Service Control Point (ISCP) for instructions relating to AIN type services. Switching offices having AIN trigger and query capability are referred to as Service Switching Points (SSPs). The ISCP 417 is an integrated system shown in more detail in FIG. 14 and discussed more fully below.

The end office and tandem switching systems typically consist of programmable digital switches with CCIS communications capabilities. One example of such a switch is a 5ESS type switch manufactured by AT&T; but other vendors, such as Northern Telecom and Seimens, manufacture comparable digital switches which could serve as the SPs.

Within the first network 1, the common channel interoffice signaling (CCIS) network includes one or more Signaling Transfer Points (STPs) and data links shown as dotted lines between the STP(s) and the switching offices. A data link also connects the STP 415 to the ISCP 417. One or more data links also connect the STP(s) 115 in the network 1 to those in networks of other carriers, for example to the STP 425 in the network 2. The structure of an exemplary STP will be discussed in more detail below, with regard to FIG. 13.

Although shown as telephones in FIG. 8, the terminal devices can comprise any communication device compatible with the local communication line. Where the line is a standard voice grade telephone line, for example, the terminals could include facsimile devices, modems, etc.

The network 2 is generally similar in structure to the network 1. The network 2 includes a number of end office SP type switching systems 421 (only one shown) as well as one or more tandem switching systems 423 (only one shown). The network 2 includes a CCIS network comprising one or more STPs 425 and data links to the respective SP type switching offices and to the CCIS system of other carriers networks.

In the illustrated example, the second network 2 is not a full AIN type network. The switching systems do not have full AIN trigger and query capabilities. The network 2 includes a Service Control Point (SCP) 427, but the routing tables utilized in that database are more limited than those in the ISCP 417. The switching systems 421, 423 can query the SCP 427 for routing information, but the range of trigger events are more limited, e.g., to 800 number call processing.

An end office switching system 411 or 421 shown in FIG. 8 normally responds to a service request on a local communication line connected thereto, for example an off-hook followed by dialed digit information, to selectively connect the requesting line to another selected local communication line. The connection can be made locally through only the connected end office switching system but typically will go through a number of switching systems. For example, when a subscriber at station X calls station Y, the connection is made through the end office switching system 411, the tandem offices 413 and 423 and the end office switching system 421 through the telephone trunks interconnecting the various switching offices.

In the normal call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in-band signaling, the trunks would be engaged before a determination is made that the called line is available or busy. Particularly if the called line is busy, this would unnecessarily tie up limited voice trunk circuit capacity. The CCIS system through the STP's was developed to alleviate this problem.

In the CCIS type call processing method, the originating end office switching system, switching system 111 in the present example, suspends the call and sends a message through the CCIS network to the end office switching system serving the destination telephone line, i.e., to a terminating end office 421. The terminating end office determines whether or not the called station Y is busy. If the called station is busy, the terminating end office 421 so informs the originating end office 411 via CCIS message, and the originating end office provides a busy signal to the calling station. If the called station Y is not busy, the terminating end office 121 so informs the originating end central office 11. A telephone connection is then constructed via the trunks and end offices (and/or tandem offices) of the network between the calling and called stations.

For an AIN type service, such as call redirection based on data stored in the ISCP 417, the end offices and/or tandems are SSP capable and detect one of a number of call processing events, each identified as a 'point in call' (PIC), to trigger AIN type processing. Specifically, in response to such a PIC, a tandem 413 or end office switching system 411 suspends call processing, compiles a call data message and forwards that message via common channel interoffice signaling (CCIS) links and one or more STPs 415 to an ISCP 417. If needed, the ISCP 417 can instruct the particular switching office to obtain and forward additional information. Once sufficient information has reached the ISCP 417, the ISCP 417 accesses its stored data tables to translate the received data into a call control message and returns the call control message to the switching office via the STP 115 and the appropriate CCIS links. The office uses the call control message to complete the particular call through the public switched network in the manner specified by the subscriber's data file in the ISCP 417.

The SCP 427 offers a similar capability in the network 2, but the range of service features offered by that database are more limited. Typically, the SCP 427 offers only 800 number calling services with a limited number of related call routing options. The triggering capability of the tandem 432 and end office 421 is limited to 800 number recognition. If the end office 421 is capable of 800 number recognition and CCIS communication with the SCP 427, as shown, then the office 421 launches a CCIS query to the SCP 427 in response to dialing of an 800 number at a station set Y. The SCP 427 translates the dialed 800 number into an actual destination number, for example the telephone number of station X, and transmits a CCIS response message back to end office 421. End office 421 then routes the call through the public network to the station X identified by the number sent back by the SCP 427, using CCIS call routing procedures of the type discussed above.

In accord with this embodiment of the present invention, the routing of at least some of the various CCIS messages discussed above is controlled by data stored in an SS7 routing database 430, separate and apart from the STPs 415, 425. During CCIS message processing, one of the STPs recognizes a specified characteristic about the message as a 'Point in Routing' (PIR) event and queries the database 430 as to how to translate and/or route the message. To understand the message routing and query triggering of the present invention, particularly in the preferred embodiment, it will be helpful to review the SS7 protocol.

Figure 9:
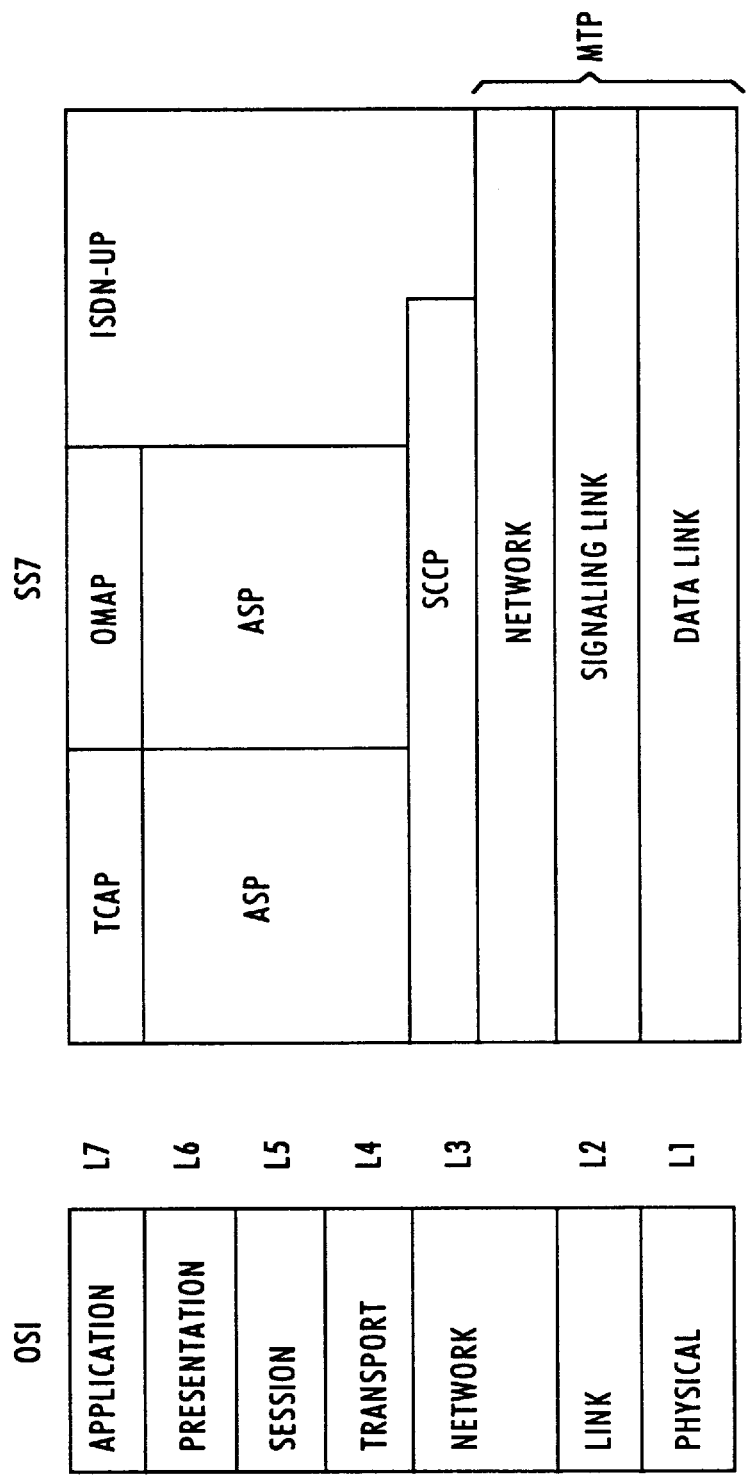
FIG. 9 depicts the protocol stack for SS7 and comparison thereof to the OSI model.

The International Standards Organization (ISO) Open Systems Interconnection (OSI) reference model specifies a hierarchy of protocol layers and defines the function of each layer in the network. FIG. 9 shows the OSI model and the relationship thereof to the protocol stack for SS7. The lowest layer defined by the OSI model is the physical layer (L1). This layer provides transmission of raw data bits over the physical communication channel through the particular network. The layer next to the physical layer is the data link layer (L2). The data link layer transforms the physical layer, which interfaces directly with the channel medium, into a communication link that appears error-free to the next layer above, known as the network layer (L3). The data link layer performs such functions as structuring data into packets or frames, and attaching control information to the packets or frames, such as checksums for error detection, and packet numbers. The network layer provides capabilities required to control connections between end systems through the network, e.g., set-up and tear-down of connections.

In the OSI model, a transport layer protocol (L4) runs above the network layer. The transport layer provides control of data transfer between end systems. Above the transport layer, a session layer (L5) is responsible for establishing and managing communication between presentation entities. For example, the session layer determines which entity communicates at a given time and establishes any necessary synchronization between the entities.

Above the session layer, a presentation layer (L6) serves to represent information transferred between applications in a manner that preserves its meaning (semantics) while resolving differences in the actual representation (syntax). A protocol (L7) that is specific to the actual application that utilizes the information communicated runs at the top of the protocol stack.

A detailed explanation of the SS7 protocol may be found in Bell Communications Research, "Specification of Signaling System Number 7," Generic Requirements, GR-246-CORE, Issue 1, December 1994, the disclosure of which is incorporated herein in its entirety by reference. A summary description of the most relevant aspects of SS7 appears below.

For SS7, typical applications layer protocols include Transaction Capability Application Part (TCAP); Operations, Maintenance, Application Part (OMAP); and ISDN User Part (ISDN-UP). TCAP provides the signaling protocols for exchange of non-circuit related, transaction-based information, typically for accessing databases such as SCPs. For example, TCAP specifies the format and content of an initial query message from an SSP to an SCP and various response messages from the SCP back to the SSP. ISDN-UP is the actual call control application protocol of SS7. ISDN-UP specifies the procedures for setting up and tearing down trunk connections utilizing CCIS signaling. ISDN-UP messages, for example, include an Initial Address Message (IAM), an Address Complete Message (ACM) and an Answer Message (ANM).

SS7 specifies an Application Service Part (ASP) for performing the functions of the presentation, session and transport layers for the TCAP and OMAP protocols. The lower four layers of the SS7 protocol correspond to the lower three layers (network, link and physical) of the OSI model. The lower three layers of the SS7 protocol, the network layer, the signaling link layer and the data link layer, form the Message Transfer Part (MTP) of SS7. The MTP is common to messages for all applications and provides reliable transfer of signaling messages between network nodes. The MTP relays messages between applications running at different nodes of the network, effectively like a datagram type service.

The SS7 network layer (lower portion of L3) routes messages from source to destination. Routing tables for the signaling network layer facilitate routing based on logical addresses. The routing functionality at this layer is independent of the characteristics of particular links.

The signaling link layer (L2) performs flow control, error correction and packet sequence control. The signaling data link layer (L1) is the actual physical connection between nodes of the CCIS network. The signaling data link layer in CCIS provides full duplex packet switched data communications. The signaling data link layer element provides a bearer for the actual signaling message transmissions. In a digital environment, 56 or 64 Kbits/s digital paths carry the signaling messages between nodes, although higher speeds may be used.

At the equivalent of the OSI network layer (L3), the SS7 protocol stack includes a Signaling Connection Control Part (SCCP) as well as the network layer portion of the MTP. SCCP provides communication between signaling nodes by adding circuit and routing information to SS7 messages. The SCCP routing information serves to route messages to and from specific applications. Each node of the signaling network, including the various switching offices and databases in each network, is assigned a 9-digit point-code for purposes of addressing signaling messages through the CCIS network. Both the SCCP protocol and the MTP processing utilize these point codes. In accord with the preferred embodiment, the present invention relies on SCCP processing of point code fields in the SS7 messages to detect 'Point in Routing' (PIR) events to query the database and subsequently translate point code related information to control actual routing of messages by the MTP processing layers.

For example, if the end office switching system 421 failed, a point in routing (PIR) code might be set against the destination point code value for that end office in one of the STPs, for example STP 425. When the party at station X calls station Y and the end office 411 sends a query message with the destination point code (DPC) for end office 421, the STP 425 would recognize the PIC and query the database 430 for routing instructions. The database 430 might return an instruction to transmit the query to the SCP 427. In the failed switching office example, the SCP 427 might return a network facility busy type message to the end office switching system 411 through the CCIS signaling network. In response, the end office 411 would supply a fast busy tone to station X.

The database 430 is separate from the STPs and switching offices. The database 430 connects to one or more of the STPs via an SS7 link similar to a link to an SCP or ISCP. The program running on the database 430 will be similar to that in an SCP, except that the routing translation information in the database 430 relates to CCIS routing rather than telephone traffic routing. In practice, the SS7 database may run as an application in a computer which also serves as an SCP or an ISCP of one of the carriers networks. Also, there may be a plurality of such databases 430. For example, the STPs 415 in network 1 may access one database 430, whereas the STPs 425 in the other network 2 may access a second SS7 database (not shown).

The preferred embodiment discussed below actually relies on processing of global title information carried in the fields used for the destination point code and the attendant translation thereof into an actual destination point code, as the PIC for triggering queries to the database 430. To facilitate understanding of such processing, it will be helpful to consider the format of SS7 messages and particularly the routing information contained in each message.

The SS7 messages traverse the network at all times. The messages themselves comprise digital serial messages that come into the STP. FIG. 2 provides a graphic illustration of an SS7 message packet. The first byte or octet of the message is a flag, which is a zero followed by 6 ones and another 0. This constitutes a unique bit pattern in the SS7 protocol. The protocol ensures that this particular pattern is not repeated until the next message. This provides a flag at the beginning of a new message. A flag at the end of a message is also provided usually in the form of the flag at the beginning of the next message, i.e., a message usually contains only one flag. The message is arranged in 8 bit bytes or octets. These octets represent the information carried by the message. The message contains both fixed and variable parameters. The Message Transport Part (MTP) of the SS7 message is always in the same place. The values change but the MTP is always in the same place.

Octets 2–11 form a routing label as discussed later with regard to FIG. 3. Octet 12 contains a signaling link selection (SLS) byte used to select specific links and/or determine the extent to which the network can select specific links to achieve load sharing. Octet 13 contains a Customer Identification Code (CIC) which typically is used to select an interexchange carrier. Octet 14 contains a message type indicator, and octets 15-N contain the actual message, in the form of fixed parameters, mandatory parameters and optional parameters. The length of the mandatory parameters field and the optional parameters field are variable. There would be 16 other bits that have Cyclic Redundancy Codes (CRCs) in them and another flag which would constitute the end of the SS7 message (and typically the start of the next message). CRCs constitute a further error detection code which is a level 1 function in the protocol.

FIG. 3 is a graphic illustration of the routing label of the SS7 message packet. The first 7 bits of octet 2 constitute the Backward Sequence Number (BSN). The eighth bit is the Backward Indicator Bit (BIB) which is used to track whether messages have been received correctly. The length of an SS7 message is variable, therefore octet 4 contains a message length indicator.

Octet 5 is the Service Information Octet (SIO). This indicates whether it is a Fill In Signal Unit (FISU), Link Service Signaling Unit (LSSU) or Message Signaling Unit (MSU). MSUs are the only ones used for setting up calls, LSSUs are used for alignment, and FISUs are fill in signals. The MSU indicator type SIO octet is formatted and encoded to serve as an address indicator, as discussed below.

The routing label includes fields for both destination related addressing and point of origin addressing. The destination or 'called party' address includes octets 6, 7 and 8. Octets 9–11 carry origination point code information, for example member, cluster and network ID information.

In the example shown in FIG. 3, the three octets of the called party address contain an actual destination point code (DPC) identified as DPC-member, DPC-cluster and DPC-network ID information. In operation, the translation tables stored in the STP cause the STP to actually route based on the DPC without translating any of the DPC octets into new values. The called party address octets (6–8), however, may carry other types of called party addressing information and receive different treatment by the STP. For example, these octets may carry a global title (GTT) and subsystem number (SSN) information.

To distinguish the types of information carried in octets 6–8, the MSU type service information octet (5) contains an address indicator. For example, a '1' value in the first bit position in this octet signifies that the called party address octets contain a subsystem number, a '1' value in the second bit position in this octet signifies that the called party address octets contain a signaling point code. The third, fourth, fifth and sixth bits of the address indicator serve as the global title indicator and are encoded to identify the presence and type of global title value in octets 6–8.

The MTP processing of the STP routes SS7 packets based on point codes. When an STP receives a packet, the SCCP protocol processing in the STP examines the address indicator octet (5). If the indicator shows that the called party address octets (6–8) contain DPC bytes only, then there is no translation of the DPC bytes, and the MTP processing by the STP will route the packet based on the DPC value. If the address indicator (octet 5) shows that the called part address octets (6–8) includes global title information, then the SCCP protocol layer processing in the STP translates the global title (GTT) into a destination point code (DPC) and inserts the destination point code into the SS7 packet. The subsequent MTP processing will route the packet using the translated DPC value. Although other PIR/triggering and translation by accessing the remote database could be used, the preferred embodiment of the present invention utilizes triggering and dips to the remote SS7 database 130 as part of the global title translation processing.

Figure 10:
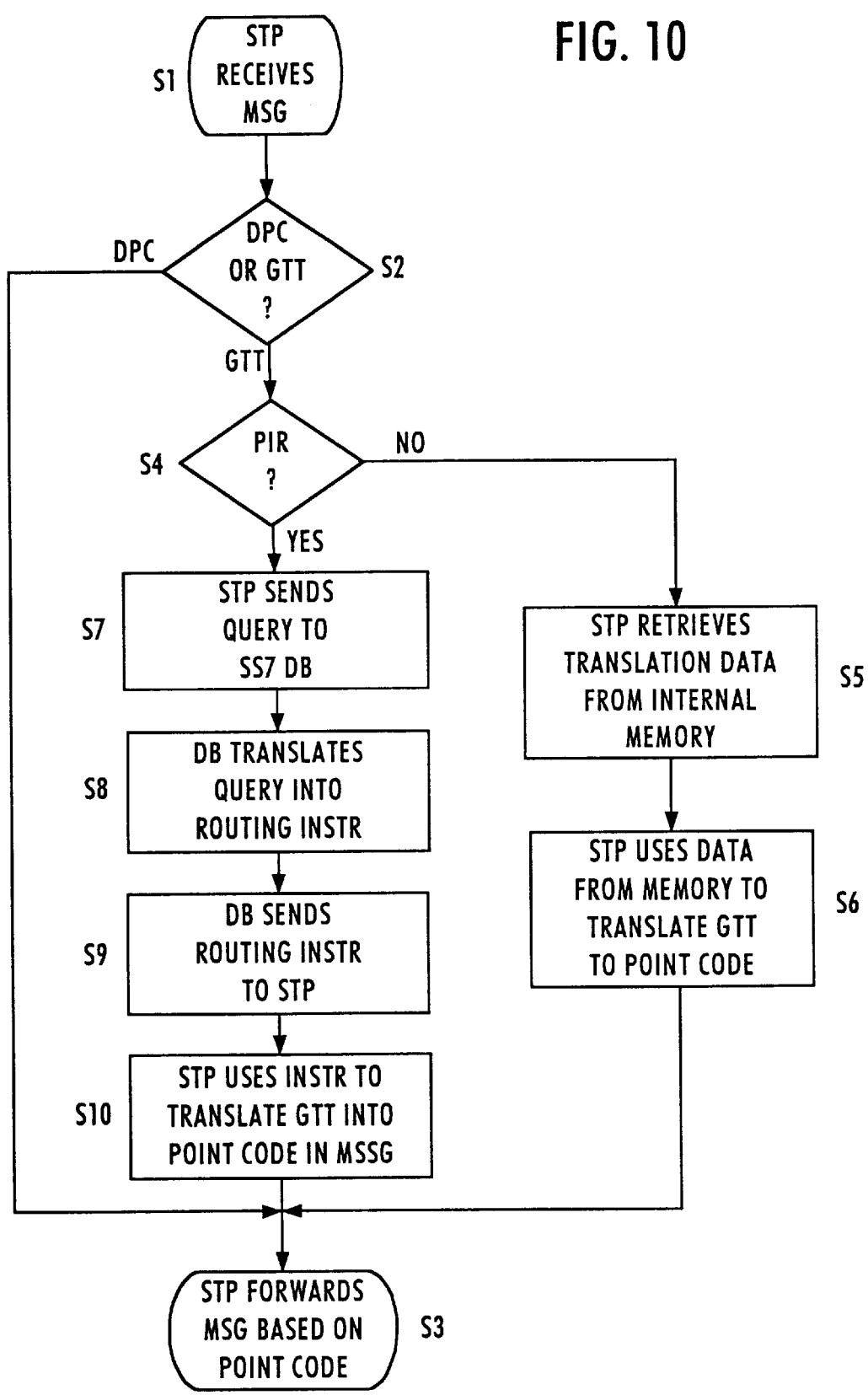
FIG. 10 is a simplified flow chart for use in explaining signaling message processing by an STP in accord with the present invention.

FIG. 10 is a high level process flow diagram of the SS7 type CCIS message processing by an STP, in accord with the preferred embodiment of the present invention.

This preferred embodiment relies on PIR recognition as part of global title (GTT) translation processing at the SCCP protocol level.

In step S1, the STP receives an SS7 message, such as shown in FIGS. 2 and 3. As the STP processes the message at the SCCP level, the STP will determine whether the called party address field contains an actual destination point code (DPC) or a global title (GTT) value (step S2). If the called party address field contains a complete DPC value, no translation is needed. Processing branches to step S3, where the MTP processing of the STP forwards the message over an appropriate CCIS link based on the destination point code.

At step S2, if the SCCP layer processing in the STP determines from the address indicator that the called party address field contains a GTT value, a translation is necessary, therefore processing branches to step S4.

At step S4 processing branches again based on whether or not there is a point in routing (PIR). In operation, the STP stores a translation for each possible GTT value.

For some GTT values, the translation may be static, therefore the data in the internal memory table contains actual translation information. There is no PIR, therefore at step S5, the STP retrieves the GTT translation information from its internal memory. Using the data from internal memory, the STP translates the GTT value into an actual destination point code (step SG). At the SCCP protocol processing level, the STP replaces the information in the address indicator with a new indicator showing that the called party address contains an actual DPC value, and replaces the called party address octets with the destination point code produced by the translation from internal memory. Processing flows to step S3, and the STP forwards the message using the DPC value.

Returning to step S4, for certain messages, the information stored in the internal memory of the STP will result in detection of a PIR. In the preferred implementation, the STP stores a translation table for all GTT values; and for some GTT values, the internal translation table identifies a destination point code, as noted above. For other GTT values, however, the internal translation table stores a PIR code, therefore the step S4 now results in a suspension of the message translation and routing processing and a branch to step S7. The PIR code instructs the STP to launch a query message and provides a destination point code for the intended destination of that query. In the simplified example of FIG. 8, the destination point code would be an alias code residing on STP 415, and that STP translates the alias code to route the query message to SS7 database 430.

The query message preferably utilizes a standard TCAP application protocol query format. This query includes at least the GTT and the origination point code and may include a substantial amount of information relating to the SS7 message and the underlying call to which the SS7 message relates. For example, the TCAP query message to database 430 may specify the called and calling party numbers, time of day, etc. According to the present embodiment of the present invention the query includes the identification of one or more lists of addresses which have been pre-established in the database 430.

The SS7 database 430 contains call processing records relating to routing through the CCIS network. In the present embodiment, the database comprises a GTT translation table. For those GTT values that will be referred to the database 430, the table translates those GTT values into destination point codes in a manner similar to the translation in the STP. The tables in database 430, however, are more extensive and dynamic. For example, the table in database 430 may provide that one GTT translation varies as a function of time and/or day of the week. As one specific example, a GTT might result in a translation for routing to one specified list of addresses during one time of day and a different list of addresses at another time of day or day of the week. Still further, a GTT might result in a translation for routing to ISCP 437 from 9:00 AM to 5:00 PM Mondays through Fridays and routing to SCP 427 at all other times. It is a feature of the invention that the address lists may also or alternatively be maintained in an ISCP or SCP. According to the invention the query to the database, whether the database 430 or a database associated with an ISCP or an SCP, is identified by the database as calling for the issuance of an instruction to the querying STP to direct regeneration of the message and addressing and routing the plural messages to each of the addresses specified in the effective list. Alternatively, the message may be transmitted but once but with directions to the message storage or voice mail system to deposit copies in each of the provided addresses.

At step S7, the SS7 database translates the GTT information from the query message into one or more destination point codes based on the relevant call processing record from the translation table in database 430. The database 430 formats the message as a TCAP call control type response message in SS7 packet form and transmits the message back to the particular STP that launched the query (step S9).

At step S10, the STP translates the GTT value into an actual destination point code in the SS7 message originally received in step S1, in this case using the destination point code value received from the database 430 in step S9. At the SCCP protocol processing level, the STP replaces the information in the address indicator with a new indicator showing that the called party address contains an actual DPC value, and replaces the called party address octets with the destination point code or codes received from the database 430. This is done by the STP to provide each copy of the originally received message with the destination point code of one of the addresses contained in the list which was accessed in the database 430 (or in the ISCP or STP). Processing flows to step S3, and the STP forwards the original message and each copy of the message using the DPC values. Alternatively the STP forwards the message with the plural addresses and instructions to the message storage or voice mail system.

An illustrative implementation of the communication and signaling networks is described below with regard to FIGS. 11A, 11B and 12–14. Afterwards, several varied call processing services, utilizing the dynamic STP capability in the context of those typical network implementations, are discussed in some detail.

Figure 11A:
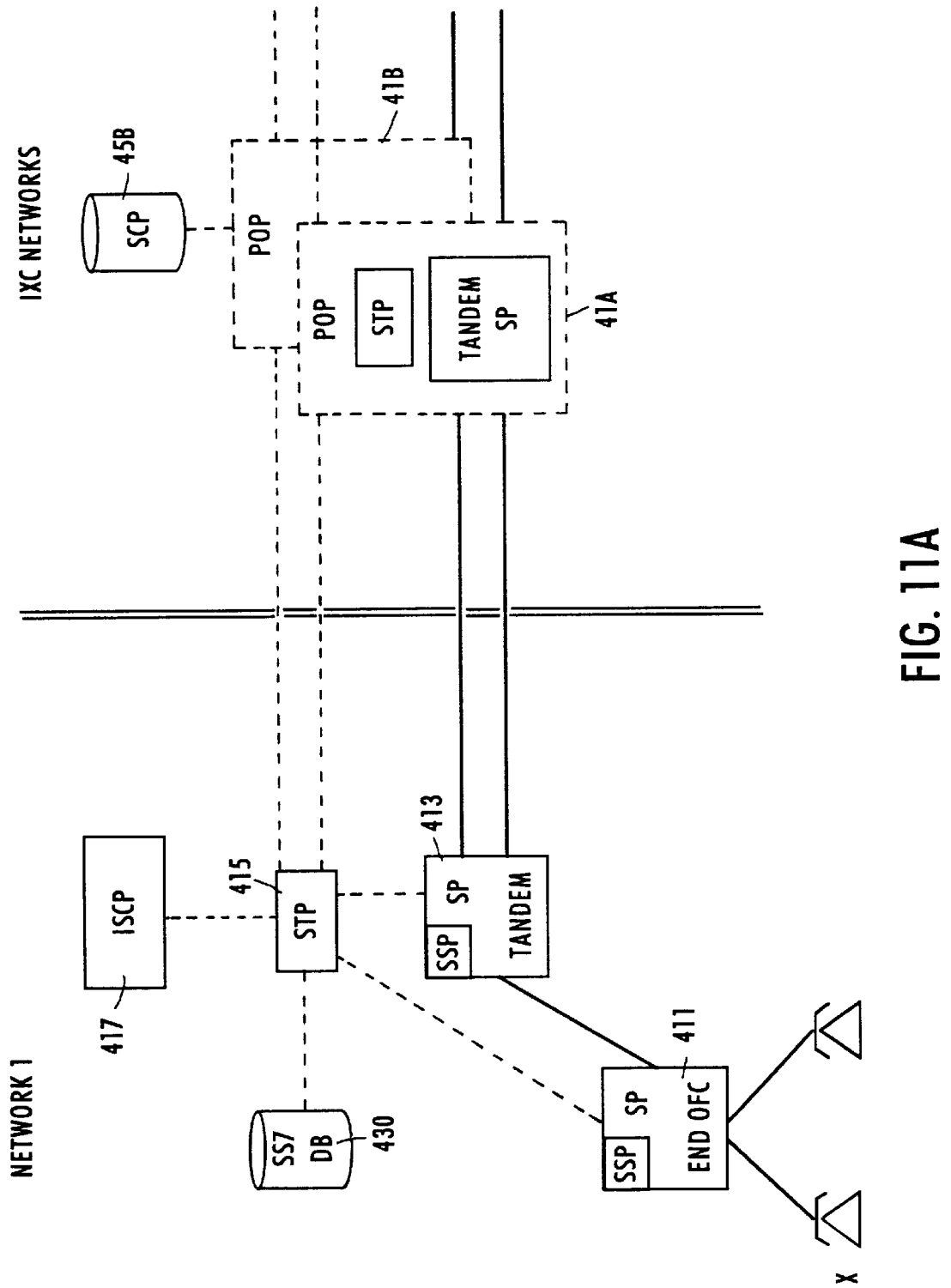
FIGS. 11A and 11B together show a somewhat more detailed block diagram of the network, i.e., including two interexchange carrier networks.
Figure 11B:
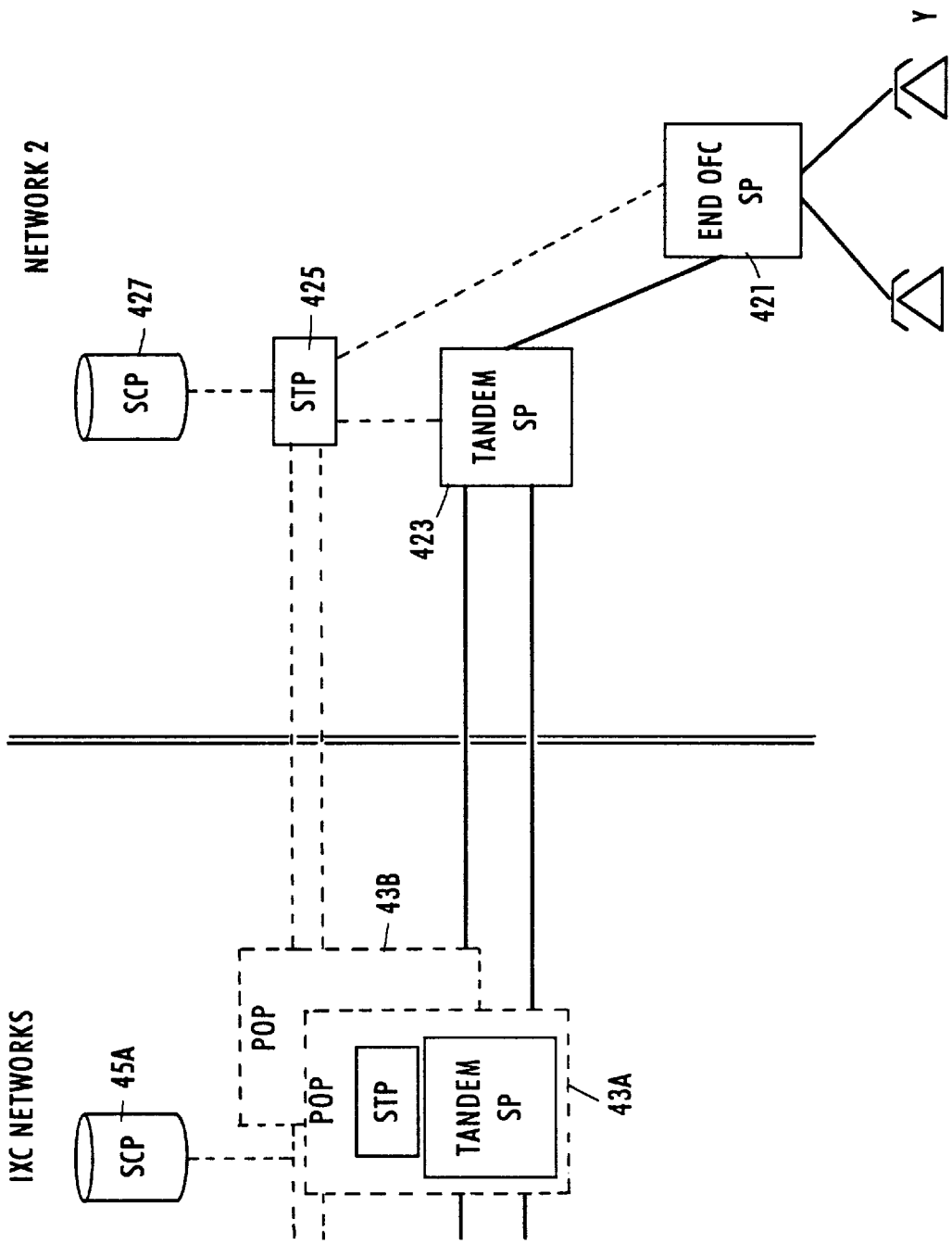

FIGS. 11A and 11B together show a public switched telephone network similar to that of FIG. 8. Again, the network actually includes two local exchange carrier networks, 1 and 2, and the structure and general methods of operation of those networks are identical to those of the networks 1 and 2 shown in FIG. 8. FIGS. 11A and 11B, however, add a high level functional representation of two competing interexchange carrier networks.

Each local exchange carrier network operates within boundaries of a defined Local Access and Transport Area (LATA). Current laws require that interexchange carriers, not local exchange carriers, must transport calls crossing the LATA boundaries, i.e., all interLATA calls. To transport calls from one LATA to another, each interexchange carrier network includes a point of presence (POP) 41A, 41B in the region of the first local exchange carrier network 1 and a point of presence (POP) 43A, 43B in the region of the second local exchange carrier network 2. Although not shown in detail, the interexchange carrier will operate a network of communication links and switching offices to provide transport between the POPs in different LATAs.

The interexchange carrier networks provide two-way transport for both communication traffic (e.g., voice calls) and signaling. For CCIS type processing, the POP in each region will include both a tandem type switch with at least SS7 signaling point (SP) capability as well as an STP In each POP, the tandem connects to a switching office in the respective local exchange carrier network, and the STP connects to an STP of the respective local exchange carrier network. In the illustrated simplified example, the tandem switches in POPs 41A, 41B connect to the tandem 413 in network 1. The STPs in POPs 41A, 41B connect to the STP 415 in network 1, similarly, the tandem switches in POPs 43A, 43B connect to the tandem 423 in network 2, and the STPs in those POPS connect to the STP 425 in network 2.

Typically, each interexchange carrier will operate an SCP database 45A, 45B The SCP 45A, 45B connects to a signal transfer point (STP) at some point in each respective interexchange carrier's network. In the illustrated example, the SCP 45B connects to an STP in POP 41B, and the SCP 45A connects to the STP in POP 43A. The SCPs provide data translations for 800 number calling services and the like offered by the interexchange carriers. If an interexchange carrier chooses, one or more of the carrier's tandems may have full SSP capability, and the SCP could be replaced by an ISCP to offer AIN type services to the interexchange carrier's customers. The precise arrangement of switches, trunks, STPs, signaling links and SCPs or the like vary between interexchange carriers depending on the traffic load each transports, the sophistication of services provided, etc.

Figure 12:
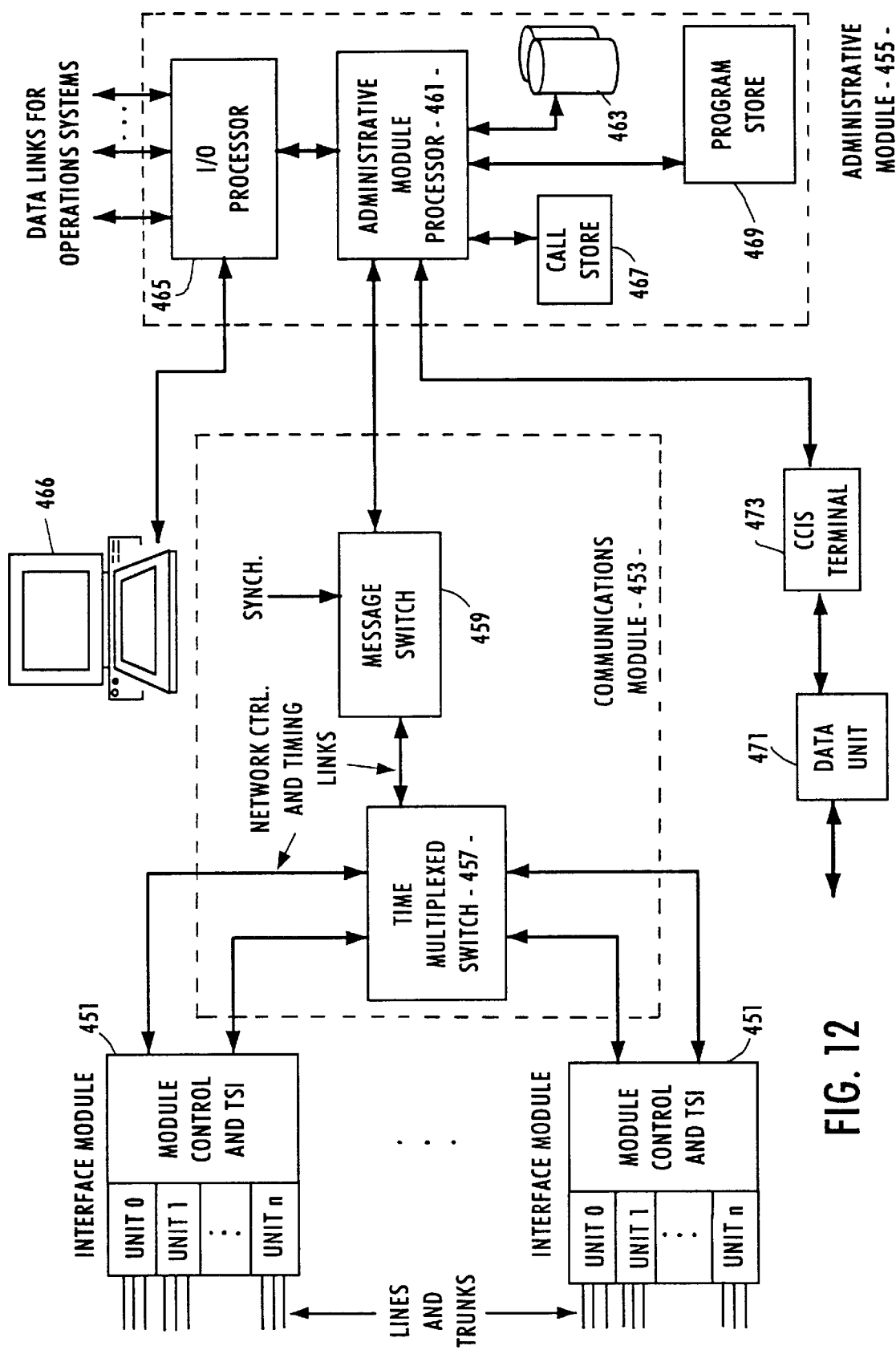
FIG. 12 is a more detailed diagram of one of the switching systems.

FIG. 12 is a simplified block diagram of an electronic program controlled switch which may be used as any one of the SP or SSP type switching offices in the systems of FIG. 8 or FIGS. 11A–11B. As illustrated, the switch includes a number of different types of modules. In particular, the illustrated switch includes interface modules 451 (only two of which are shown), a communications module 453 and an administrative module 455.

The interface modules 451 each include a number of interface units 0 to n. The interface units terminate lines from subscribers' stations, trunks, T1 carrier facilities, etc. Where the interfaced circuit is analog, for example a subscriber loop, the interface unit will provide analog to digital conversion and digital to analog conversion. The interface modules for the analog lines also include dial pulse detectors and dual tone multifrequency (DTMF) detectors. Alternatively, the lines or trunks may use digital protocols such as T1 or ISDN. Each interface module 151 also includes a digital service unit (not shown) which is used to generate call progress tones.

Each interface module 451 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 457 and thence to another interface module (intermodule call connection).

The communication module 453 includes the time multiplexed switch 457 and a message switch 459. The time multiplexed switch 457 provides time division transfer of digital voice data packets between voice channels of the interface modules 451 and transfers data messages between the interface modules. The message switch 459 interfaces the administrative module 455 to the time multiplexed switch 457, so as to provide a route through the time multiplexed switch permitting two-way transfer of control related messages between the interface modules 451 and the administrative module 455. In addition, the message switch 459 terminates special data links, for example a link for receiving a synchronization carrier used to maintain digital synchronism.

The administrative module 455 includes an administrative module processor 461, which is a computer equipped with disc storage 463, for overall control of operations of the switching office. The administrative module processor 461 communicates with the interface modules 451 through the communication module 455. The administrative module 455 also includes one or more input/output (I/O) processors 465 providing interfaces to terminal devices for technicians such as shown at 466 in the drawing and data links to operations systems for traffic, billing, maintenance data, etc. A CCIS terminal 473 and an associated data unit 471 provide a signaling link between the administrative module processor 461 and an STP of the SS7 signaling network, for facilitating call processing signal communications with other central offices (COs) and with one or more of the SCPs and/or the ISCP 417.

As illustrated in FIG. 12, the administrative module 455 also includes a call store 467 and a program store 469. Although shown as separate elements for convenience, these are typically implemented as memory elements within the computer serving as the administrative module processor 461. For each call in progress, the call store 467 stores translation information retrieved from disc storage 463 together with routing information and any temporary information needed for processing the call. For example, for a switch based Centrex type service, the call store 467 would receive and store extension number translation information for the business customer corresponding to an off-hook line initiating a call. The program store 469 stores program instructions which direct operations of the computer serving as the administrative module processor.

Of particular note, the translation data in the disc storage 463 includes translation information needed to address messages for transmission through the signaling network. In particular, when the switch needs to send a message through the SS7 network to a particular node, the data from the disc storage 463 provides the global title and/or point code for the message destination.

Figure 13:
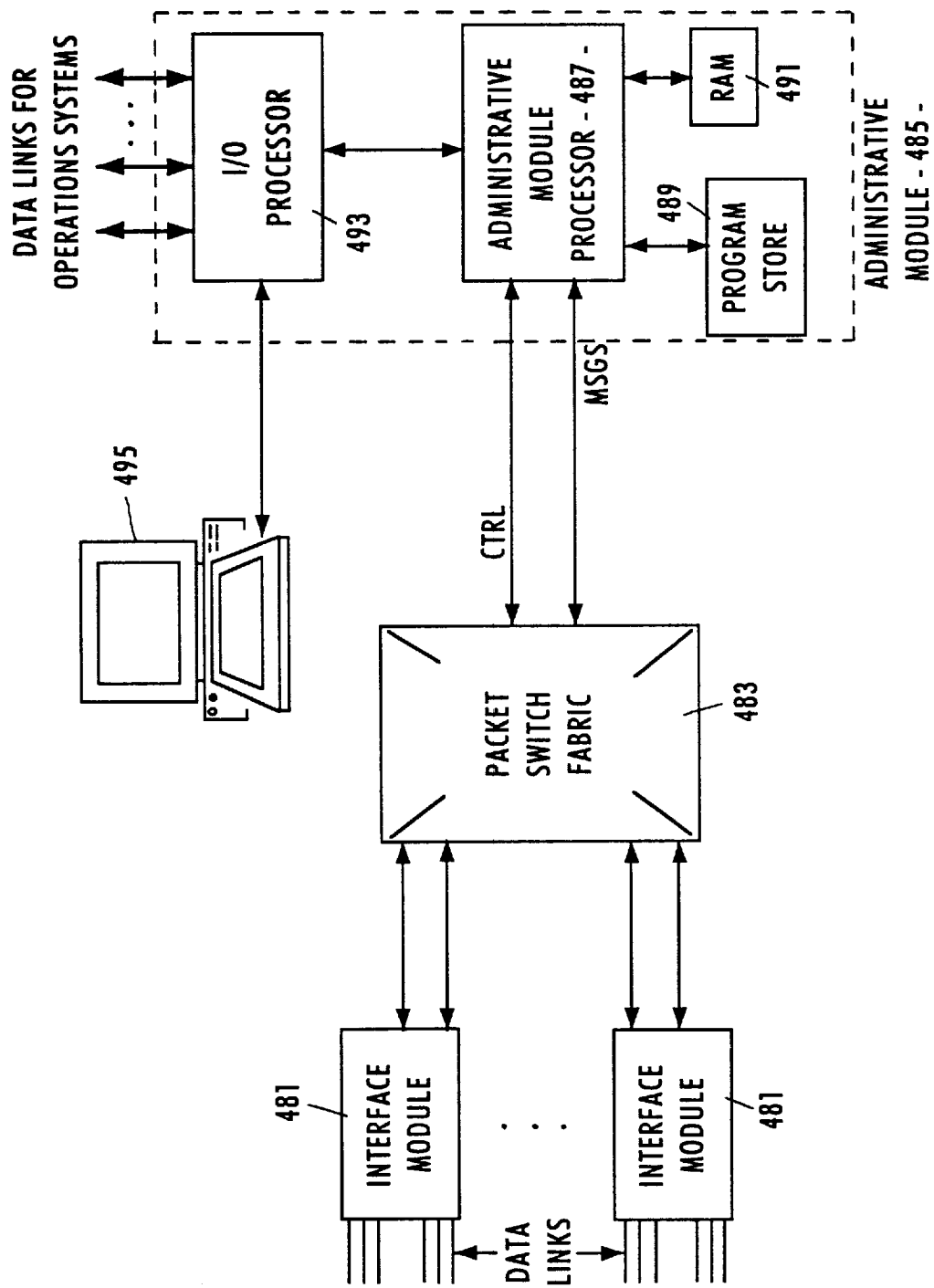
FIG. 13 is a functional block diagram of a Signaling Transfer Point (STP) in accord with the present invention.

FIG. 13 depicts the functional elements of one of the STPs shown in the networks of FIGS. 8, 11A and 11B. As shown, the STP comprises interface modules 481, a packet switch fabric 483 and an administrative module 485. The interface modules 481 provide the physical connections to the two-way data links to the switching systems, SCPs, ISCPs and other STPs. In certain STPs, such as STP 415, one of the interface modules connects to a data link to an SS7 database. Typically, these links provide two-way 56 kbits/s or 64 kbits/s virtual circuits between nodes of the CCIS signaling network. The modules provide a two-way coupling of SS7 data packets, of the type shown in FIG. 2, between the actual data links and the packet switch fabric. The packet switch fabric provides the actual routing of packets coming in from one link, through one of the interface modules 483 back out through one of the interface modules 481 to another data link. The packet switch fabric 483 also switches some incoming messages through to the administrative module 485 and switches some messages from the administrative module 485 out through one of the interface modules 481 to one of the data links, for example to communicate with an SS7 database 430.

The administrative module 465 includes an administrative module processor 487, which is a computer equipped with RAM 491 and a program store 489, for overall control of operations of the switching office. Although shown as a logically separate element, the program store 489 typically is implemented as memory within the computer serving as the administrative module processor 487. The administrative module processor 489 provides control instructions to and receives status information from the operation control element (not shown) within the packet switch fabric 483. The administrative module processor 487 also transmits and receives some messages via the packet switch fabric 483 and the interface modules 481. The administrative module 455 also includes one or more input/output (I/O) processors 465 providing interfaces to terminal devices for technicians such as shown at 466 in the drawing and data links to operations systems for traffic recording, maintenance data, etc.

The program store 469 stores program instructions which direct operations of the computer serving as the administrative module processor 487. The RAM 491 stores the translation tables used to control routing and/or processing of messages through the STP. The RAM may be implemented as a disc storage unit, but preferably the RAM comprises a large quantity of semiconductor random access memory circuits providing extremely fast access to information stored therein.

Figure 14:
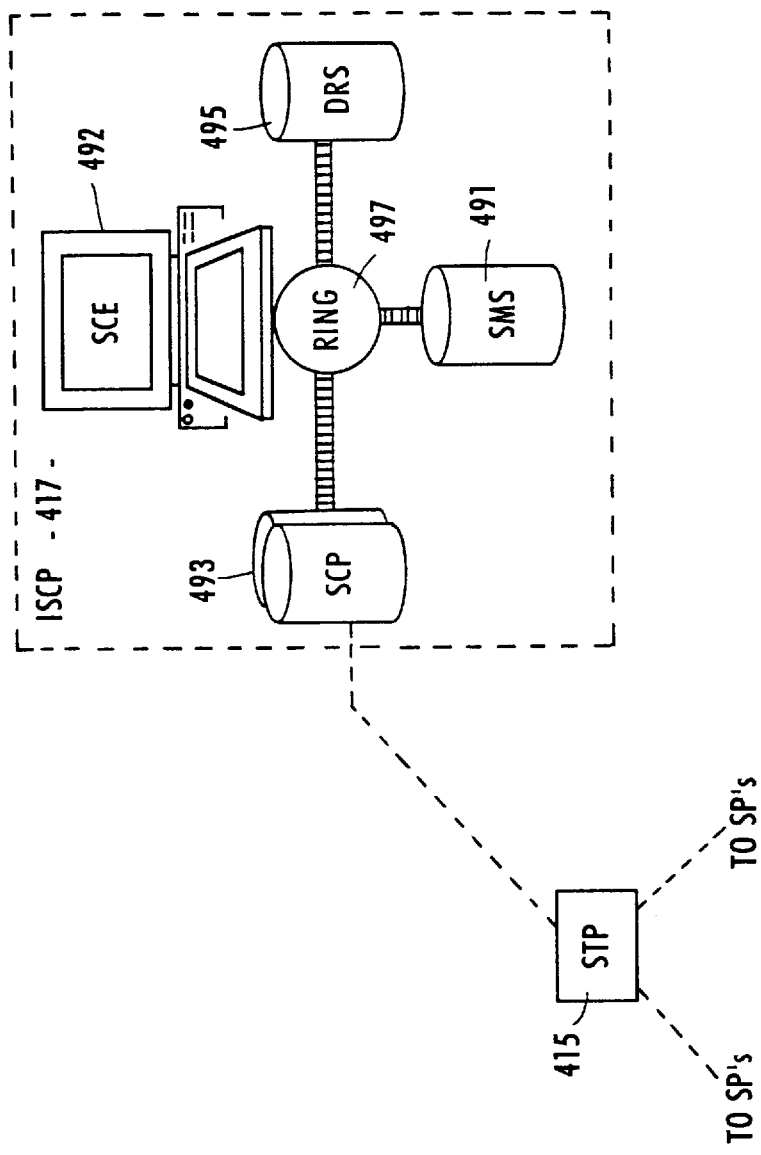
FIG. 14 is a functional block diagram of the Integrated Service Control Point (ISCP).

The ISCP 417 is an integrated system, as shown in FIG. 14. Among other system components, the ISCP 417 includes a Service Management System (SMS) 491, a Data and Reporting System (DRS) 495 and the actual database referred to as the Service Control Point (SCP) 493. The ISCP also typically includes a terminal subsystem referred to as a Service Creation Environment or SCE 492 for programming the database in the SCP 493 for the services subscribed to by each individual customer. The components of the ISCP are connected by an internal, high-speed data network, such as a token ring network 497.

The SS7 database 430 may initially be implemented as an application program running on one of the separate SCPs or the SCP within ISCP 417. In future, as increasing numbers of services rely on the dynamic signaling message routing capability of the present invention, a separate stand-alone SCP or even a full ISCP may be used to implement the SS7 database. In any such implementation, the database program in the SS7 database 430 would emulate a call processing record database similar to those used in the SCPs or ISCP 430. Of particular note here, the SCP functionality of the particular computer implementing the SS7 database 130 stores the call processing records and/or translation tables used for control of the SS7 message routing in response to the detected point in routing (PIR) events.

To facilitate an appreciation of the operation and advantages provided by the dynamic signaling message routing used in the present invention, a few call processing examples are discussed below with regard to the network and component elements shown in FIGS. 11A, 11B and 12–14. In this regard, consider first the simple example of a call from station X to station Y, wherein there will be no PIR event in the SS7 signaling message processing.

Each node of the signaling network, including the various switching offices and databases in each network, is assigned a 9-digit point-code for purposes of addressing signaling messages through the CCIS network. For purposes of discussion, assume that in FIG. 8 end office 411 has a point code of 246-103-001, tandem office 413 has a point code of 246-103-002, tandem office 423 has a point code of 255-201-103, and end office 421 has a point code of 255-201-104.

Consider now the simplest specific example of a call from station X to station Y wherein standard CCIS routing is to apply. The user at station X picks up his phone and dials the number of station Y. The administrative module processor 461 loads the subscriber profile information from disc storage 463 into an available register in call store 467. The number for station Y resides in end office 421. The SP end office 411 generates an Initial Address Message (IAM). The information in the register in call store 467, in this case, does not specify any special processing of the CCIS signaling messages relating to the call. The IAM message therefore would have the destination point code of end office 421, namely, point code 255-201-104. It would have an originating point code of end office 411, namely, 246-103-001, in addition to miscellaneous other information needed for call set-up such as the destination number of station Y. The end office 411 transmits the IAM message over a data link to the STP 415. The STP 415 looks at the message and determines that the message was not for it as an STP but rather is for end office 421.

In the preferred embodiment of the processing by the STPs discussed above relative to FIG. 10, there is no translation of the point codes and no triggering in response to any PIR event. The STP 415 therefore investigates possible routings to get to the correct end office 421 and routes accordingly.

In the simplified example shown in FIG. 8, the CCIS message intended for end office 421 goes through STP 425. The SS7 message includes a CIC code specifying the interexchange carrier selected by the caller, assume here that the CIC code identifies interexchange carrier A. The STP 415 forwards the message to the STP 125 through the STPs of the POPs 41A and 43A. Each of the interexchange carrier STPs and the STP 425 repeats the same procedure. Ultimately, the STP 425 determines that the message is for end office 421 and puts that message on the link to the end office 421.

End office 421 receives the IAM message which includes the called telephone number and determines whether or not the line is busy. If the line is not busy, the end office 421 rings the station Y and generates an Address Complete Message (ACM) to indicate that it received the request for a call and that the number is not busy. The return ACM message includes the CIC code received in the IAM message, in this case the CIC code of interexchange carrier A. The ACM message is sent back by simply reversing the point codes. Now the destination point code is that of end office 411 (246-103-001), and the originating point code is that of end office 421 (255-201-104). The message goes back to the end office 411 through the STPs, to indicate that the IAM was received and processed. In particular, the return message (ACM in this case) includes an actual destination point code (the origination point code from the IAM message) and therefore does not result in translation or PIR triggering. In response to the ACM message, the originating end office 111 applies a ring back tone signal to the line to station X.

As soon as the phone is answered at end office 421, that office sends an Answer Message (ANM) back to end office 411 through the STPs, including those of interexchange carrier A, indicating that the phone Y was picked up; and at that time the actual telephone traffic trunks are connected together through the tandems 413, 423, the tandems in POPs 41A, 43A and the trunks of the interexchange carrier A's network. Again, the return message (ANM in this case) includes an actual destination point code (the origination point code 246-103-001 from the IAM message) and therefore does not result in translation or PIR triggering. End office 411 connects the line to station X to the trunk to tandem 413, and end office 421 connects the line to station Y to the trunk to the tandem 423, so that communication is established. All such messaging may occur in about 600 milliseconds.

Consider again a specific example of a call from station X to station Y, but here assume that the subscriber has chosen a service which includes the PIR routing triggering and attendant database dip to control CCIS message routing. In the present example, the database provides a dynamic interexchange carrier selection, e.g., at different times.

The user at station X again picks up his phone and dials the number of station Y. At end office 411, the administrative module processor 461 loads the subscriber profile information from disc storage 463 into an available register in call store 467. The SP end office 411 generates an Initial Address Message (IAM). In the present example, the data now in the register in call store 467 indicates that the CCIS message for office 421 should use a particular global title (GTT) value. As such, the IAM message now includes a global title (GTT) value assigned for dynamic routing of calls to the particular end office. The IAM message again includes the originating point code of end office 411, namely, 246-103-001. The end office 411 transmits the IAM message over a data link to the STP 415. The administrative module processor 487 in the STP 415 examines the routing label in the signaling message and notes the presence of a global title. The administrative module processor 487 accesses translation data for the global title value stored in RAM 491. In this example, the translation data for the global title includes a PIR code. In response to the PIR code, the administrative module processor 487 formulates a TCAP query and sends that message through the packet switch fabric 483 and the appropriate interface module 481 to the data link to the SS7 database 430.

The database 430 receives the TCAP query from the STP 415 and uses the global title value contained in that query to access the appropriate call processing record in its data tables. In the present example, assume that the caller has elected to use interexchange carrier A from 9:00 AM to 5:00 PM on weekdays and to use interexchange carrier B at other times, to take advantage of the lowest rate possible at different times. If the TCAP query message arrives at the SS7 database 430 within a time allotted to carrier A, then the database 430 translates the global title into the destination point code 255-201-104 for the end office 421 and returns that code together with a CIC code for carrier A to the STP 415. The STP 415 reformulates the IAM message to include the destination point code 255-201-104 and the CIC code for carrier A. The STP then forwards the IAM message, and call processing by the various network elements proceeds exactly as in the preceding example.

However, if the TCAP query message arrives at the SS7 database 430 within a time allotted to carrier B, then the database 430 translates the global title into the destination point code 255-201-104 for the end office 421 and returns that code together with a CIC code for carrier B to the STP 415. The STP 415 reformulates the IAM message to include the destination point code 255-201-104 and the CIC code for carrier B. The STP 415 forwards the reformulated IAM message to the STP 425, but now through the STPs of the POPs 41B and 43B. The interexchange carrier STPs and the STP 425 repeat the message routing procedure, but now the IAM message contains an actual destination point code. The message does not contain a global title (GTT) value, therefore these subsequent STPs do not translate the routing label data and do not detect any PIR event to query the SS7 database 430. The subsequent STPs therefore just pass the message on to the next node through the CCIS signaling network. Ultimately, the STP 425 determines that the message is for end office 421 and puts that message on the link to the end office 421.

End office 421 receives the IAM message which includes the called telephone number and determines whether or not the line is busy. If the line is not busy, the end office 421 rings the station Y and generates an Address Complete Message (ACM) to indicate that it received the request for a call and that the number is not busy. That message is sent back by simply reversing the point codes. The return ACM message, however, includes the CIC code received in the IAM message, and in this case the CIC code is that of interexchange carrier B. Again, the destination point code is that of end office 411 (246-103-001), and the originating point code is that of end office 421 (255-201-104). The message goes back to the end office 111, but now through the STPs in the POPs 43B, 41B, to indicate that the IAM message was received and processed. The return message (ACM in this case) includes an actual destination point code (the origination point code 246-103-001 from the IAM message) and therefore does not result in translation or PIR triggering by any of the STPs.

As soon as the phone is answered at end office 421, that office sends an Answer Message (ANM) back to end office 411 through the STPs, including those of interexchange carrier B, indicating that the phone Y was picked up; and at that time the actual telephone traffic trunks are connected together through the tandems 413, 423, the tandems in POPs 41A, 43A and trunks of the interexchange carrier B's network. Again, the return message (ANM in this case) includes an actual destination point code (the origination point code 246-103-001 from the IAM message) and therefore does not result in translation or PIR triggering by any of the STPs. End office 411 connects the line to station X to the trunk to tandem 413, and end office 421 connects the line to station Y to the trunk to the tandem 423, so that communication is established.

The translation and routing functionalities of the STPs are substantially similar for calls receiving AIN treatment through an ISCP or 800 number call processing and the like through an SCP. A simple example is given below for one such service without PIR type triggering on the CCIS message followed by an example of essentially the same service with PIR type triggering on the CCIS message.

In the present example, assume that a customer at station Y has subscribed to an INWATS type 800 number service offered by interexchange carrier A. The translation data for converting the dialed 800 number into the telephone number for station Y (or alternate destinations) resides on that carrier's SCP 45A. Now when the caller at station X dials the particular 800 number, the end office 111 suspends call processing and launches a query for routing information. More specifically, the end office 411 formulates an appropriate TCAP query message in SS7 format. Of particular note, this SS7 message will include the six dialed digits (800-NXX) as global title (GTT) information. The end office 111 forwards this message to the STP 415 over a CCIS data link.

In the present example, assume that the GTT value does not have a related PIR code defined in the translation tables within the STP 415. The translation table in the STP 415 instead contains a destination point code for routing messages to the SCP 45A. The STP 415 therefore translates the GTT into the point code, replaces the called party address with the resultant point code information and forwards the message to the STP in the POP 41A. That STP in turn routes the message through the CCIS network of carrier A to the SCP 45A.

The SCP 45A translates the dialed 800 number, contained in the TCAP application portion of the message, into the actual telephone number of a destination station, using customer selected routing information stored in the data tables in SCP 45A. In the present simplified example, assume that the translation in SCP 45A provides the telephone number of station Y. The SCP 45A formulates a TCAP call control type response message and formats that message into SS7 protocol. Of particular note, the message received by the SCP 45A included the origination point code of the end office 411 (246-103-001). The SCP 45A now uses that point code as the destination point code in the SS7 response message. The SCP 45A transmits the response message back through the CCIS links and the STPs to the end office 411. Because there is no global title information in the response message, the STPs use the destination point code and simply pass the message through to the next node of the signaling network.

When the end office 411 receives the TCAP response message, that office replaces the dialed digit information (800 number) in the register in call store 467 currently assigned to processing of the call from station X with the number from the TCAP response message, in the example, the number for station Y. Using that number as dialed digit information, the end office 411 initiates call processing to route the call to station Y, in the exact same manner as in the above examples wherein the caller at station X actually dialed the telephone number of station Y.

Essentially similar processing by the STP(s) 415 will result in routing of TCAP messages between the switches 411 and 413 of the network 1 and the ISCP 417 for AIN type services, when there is no PIR established in one of the STPs. For some services utilizing the SCPs and/or the ISCP, the GTT translation in one of the STPs includes a PIR value and triggers query and response interaction with the SS7 database 430 to control routing of the SS7 messages. To facilitate understanding of such processing, another 800 number example is discussed below.

In the present example, assume that a customer at station Y now subscribes to two INWATS type 800 number services, one offered by interexchange carrier A, and the other one offered by interexchange carrier B. However, the customer wants only a single 800 number. This might be the case where the subscriber obtains a particularly sophisticated routing functionality from carrier A during normal business hours, e.g., with routing to any of several of the customer's offices and always to an available operator's position within such an office. The price for the sophisticated service would be correspondingly high. At other times, however, the customer uses the second carrier B's service to route to a single station Y at which she maintains a single twenty-four a day operator presence. In this case, the PIR responsive query and routing functionality provides dynamic routing of the query messages to the SCP of the correct carrier.

More specifically, when the caller at station X dials the particular 800 number, the end office 111 suspends call processing and launches a query for routing information.

The end office 411 again formulates the TCAP message in SS7 format, and this SS7 message includes the six dialed digits (800-NXX) as global title (GTT) information. The end office 411 forwards this message to the STP 415 over a CCIS data link.

In the present example, however, the GTT value corresponds to a PIR code defined in the translation tables within the STP 415 and information for routing a query from the STP 415 to the SS7 database 430. The administrative module processor 487 formulates a second TCAP query and sends that message through the packet switch fabric 483 and the appropriate interface module 181 to the data link to the SS7 database 430. The database 430 receives the second TCAP query from the STP 415 and uses the global title value contained in that query to access the appropriate call processing record in its data tables.

In the present example, assume that the TCAP query message arrives at the SS7 database 430 within a time allotted to carrier A, then the database 130 translates the global title into the destination point code for routing a signaling message to the SCP 45A and returns that code together with a CIC code for carrier A to the STP 415. The STP 415 reformulates the first TCAP query in SS7 message format to include the destination point code and the CIC code for carrier A. The STP 415 therefore translates the GTT into the point code, replaces the called party address with the resultant point code information from database 430 and forwards the message to the STP in the POP 41A. That STP in turn routes the message through the CCIS network of carrier A to the SCP 45A. From this point onward, call processing follows the flow of the above discussed example to route the 800 number call through interexchange carrier A's network to an identified destination station, such as station Y.

However, if the second TCAP query message arrives at the SS7 database 430 within a time allotted to carrier B, then the database 430 translates the global title into a destination point code and CIC code for routing signaling messages to the SCP 45B. The database 430 therefore returns that destination point code and CIC code to the STP 415. The STP 415 reformulates the first TCAP query in SS7 message format to include the destination point code and the CIC code for carrier B. The STP 415 therefore translates the GTT into the point code, replaces the called party address with the resultant point code information from database 430 and forwards the message to the STP in the POP 41B. That STP in turn routes the message through the CCIS network of carrier B to the SCP 45B.

The SCP 45B translates the dialed 800 number, contained in the TCAP application portion of the message, into the actual telephone number of a destination station, using customer selected routing information stored in the data tables in SCP 45A. In the present example, assume that this translation in SCP 45B provides the telephone number of station Y, for simplicity of discussion. The SCP 45B formulates a TCAP call control type response message and formats that message into SS7 protocol. The modified first TCAP query message received by the SCP 45B included the origination point code (246-103-001) of the end office 411. The SCP 45B now uses that point code as the destination point code in the SS7 response message. The SCP 45B transmits the response message back through the CCIS links and the STPs to the end office 411. Because there is no global title information in the response message, the STPs use the destination point code and simply pass the message through to the next node of the signaling network.

When the end office 411 receives the TCAP response message, that office replaces the dialed digit information (800 number) in the register in call store 467 currently assigned to processing of the call from station X with the destination number from the TCAP response message, in the example, the number of station Y. Using that number as dialed digit information, the end office 411 initiates call processing to route the call to station Y, in the exact same manner as in the above examples wherein the caller at station X actually dialed the telephone number of station Y, albeit through the network of interexchange carrier B at the lower billing rate.

Essentially similar processing by the STP(s) 415 will result in dynamic routing of TCAP messages relating to AIN type services between the switches 411 and 413 of the network 1 and alternative routing information sources, including the ISCP 417 and one or more alternate databases, such as SCPs 45A, 45B and 427 when there is a PIR established in one of the STPs. For example, an interexchange carrier A that does not yet offer its own AIN services, such as call screening, could contract with the local exchange carrier operating network 1 to store the relevant call processing records for call screening on the ISCP 417. The dynamic routing of the present invention would allow messages for non-screening customers to go through the STPs in the normal manner, but calls for carrier A's customer's having screening would result in transmission of query messages to the ISCP 417.

The above examples are just a few of the services that can be enhanced by operation of the dynamic CCIS signaling message routing capability of the present invention. Many other such services will be readily apparent to those skilled in the art.

For example, the wide use of the PIR trigger functionality in 800 service will facilitate portability of 800 numbers between different carriers. Whenever an 800 number query reaches the first STP, that STP would query the SS7 database to obtain information to route that query to the SCP/ISCP of the carrier currently serving calls to that 800 number.

As another example, the dynamic signaling message routing capabilities also facilitate redundant implementation of the SCPs and ISCPs. If one fails, then only the data in the SS7 database needs to be modified to reroute query messages to a backup SCP or ISCP.

As another example, when a subscriber moves, rather than move call processing records from the ISCP of the former local exchange carrier to the ISCP of the local exchange carrier serving the customer's new residence, the dynamic signaling message routing of the present invention would route query messages from switching offices and an STP in the new local exchange carrier network to the ISCP of the former local exchange carrier. This could allow moving subscribers to effectively take customized telephone services, such as complex call screening lists, with them. One number follow-me type routing services, such as used for personal communications services, also would be portable from area to area and carrier to carrier.

Further details of dynamic STP translation control is found in commonly owned application Ser. No. 08/508,507, filed Jul. 28, 1995, which is incorporated by reference herein in its entirety.

The operation of this embodiment of the invention using such dynamic STP capabilities is illustrated in the following example described in connection with the system illustrated in FIG. 4.

Subscriber X, desiring to send a voice message to the mailboxes of a preestablished list of addressees, may use his/her telephone terminal to access his own voice mailbox in the voice mail system 374. Subscriber X may desire to send such a message to subscribers to a single voice mail system, such as subscribers to mailboxes associated with voice mail system 376, or may desire to send a message to subscribers to mailboxes in multiple voice mail systems, as will presently be described in further detail.

Upon subscriber X connecting to voice mail system 374, the voice processing unit of the voice mail system may operate its voice menu to direct the caller to depress a specified key when satisfied with the message, in a known fashion. It may then query the caller as to an identification of the addressee or of a list of addressees which the subscriber has previously established using known prompt and response procedures. In this case the list and associated information regarding the subscriber and addressees is stored in the SS7 database 430. The voice processing unit of the voice mail system 374 further ascertains whether or not the subscriber desires a response, and whether or not the subscriber desires delivery of the message by telephone calls to the addressees. The subscriber may also be queried as to whether or not any specific time of dispatch to the destination mailbox or delivery of the message is desired. The voice message system 374 then instructs the caller to depress a further identified key or keys to conclude the session and initiate the procedure.

The voice mail system 374 thereupon transmits the digitized voice message to the SSP 310. The SSP packetizes the message in SS7 format containing the destination information directed by the subscriber, the origination identification, and other routing and control information. This is sent by the SSP to an STP, such as the STP 324. The STP receives the SS7 message and processes the same. The STP determines whether the called party address field contains an actual destination point code (DPC) or a global title (GTT) value. If the called party address field contained a complete DPC value, no translation would be necessary. However, in this instance the address indicator contains a GTT value which indicates that a translation is necessary.

The STP next determines whether or not there is a point in routing (PIR). In this instance there is a PIR and this results in a suspension of the message translation and routing processing. The PIR code instructs the STP to launch a query message and provides a destination point code for the intended destination of that query. In a simplified example, the destination point code would be an alias code residing on the STP 324 and that STP translates the alias code to route the query message to the SS7 database 430. The query message preferably utilizes a standard TCAP application protocol query format. According to the present embodiment of the invention, the query includes the identification of the list designated by the subscriber in depositing the message in the voice mail system. Such a list has been preestablished by the subscriber in the database 430.

The SS7 database contains call processing records relating to routing through the CCIS network. In the present embodiment the database comprises a GTT translation table. That translation in this instance results in a translation for routing to a specific list of addresses to which the message is to be directed.

The SS7 database translates the GTT information from the query message into one or more destination point codes based on the relevant call processing record from the translation table in database 430. The database 430 formats a response message as a TCAP call control type response message in SS7 packet form and transmits the message back to the STP that launched the query.

The STP translates the GTT value into called party address octets with the destination point code or codes received from the SS7 database. The STP also receives control information directing the regeneration of the received message and the addition of the necessary destination point code(s) of the addresses contained in the list which was accessed in the STP database. The STP thereupon forwards the original message and each copy of the message using the DPC values.

According to the invention the DPC values may identify addresses in a single destination voice mail system or may identify addresses in multiple voice mail systems. FIG. 4 shows a single voice mail system 376 for simplicity purposes. In many instances the message is directed to multiple addresses in a single voice mail system as well as to addresses in multiple voice mail systems. When a message is directed to multiple addresses in a single voice mail system the message may be stored at multiple addresses or, alternatively, the message may be stored but once but the other addressee mailboxes in that system may be provided with arrows directing those mailboxes to access the particular mailbox in which the message is stored in a manner previously known and as described, for example, in the Lotito et al. patent discussed hereinabove. In such an instance it is not necessary that the transmitting STP send one copy for each address. A single copy of the message may be directed to addresses in a single mail box system, with suitable handling instructions in the header for processing by the destination voice mail system.

As an alternative to the foregoing reliance upon the SS7 database 430 for the list information and handling or processing instructions, it is also within the comprehension of the invention that this functionality may be performed by the ISCP 350. As a still further alternative, the ISCP may be relied upon for the list information with the SS7 database 430 providing the dynamic translations for the STP.

Once the messages transmitted by the STP are stored in the designated mailboxes in the specified voice mail systems, the voice mail system will provide the conventional signal to the mailbox subscriber to indicate that there is a message waiting. Alternatively, if the processing header of the message packet so indicates, the voice mail system may undertake the actual delivery of calls to all or designated addressees in a conventional manner. Still further, and pursuant to instructions in the packet headers, the voice mail system may store or deliver the message along with a request for a response. If such a response is requested and received it may be delivered back to the originating voice messaging system or subscriber directory number over the SS7 network with a reversed header in the packets.

Figure 15:
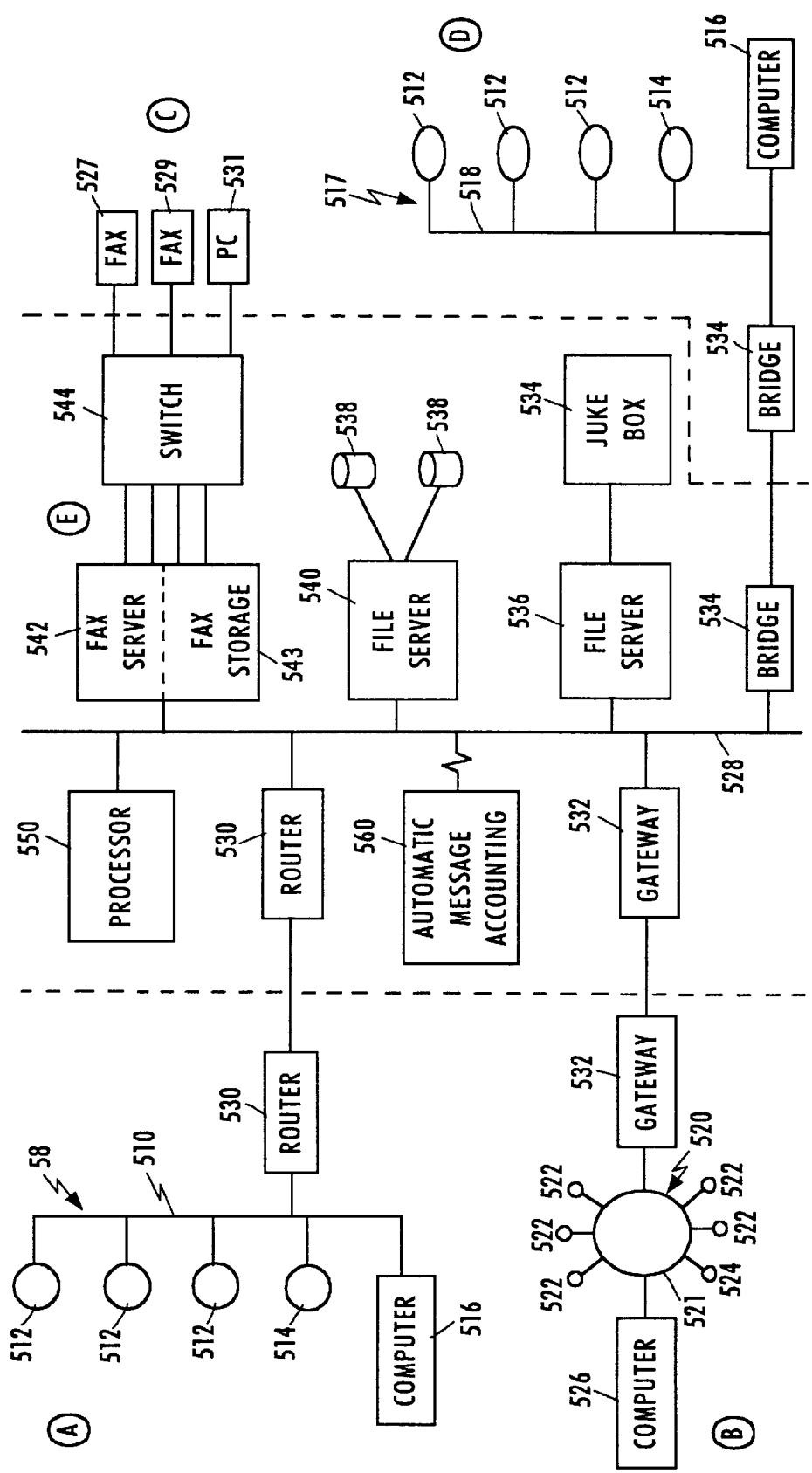
FIG. 15 illustrates a prior art distributed imaging system using a switched telephone network.

Referring to FIG. 15 there is shown a system for using a switched telephone network for the transfer of data information including distributed imaging.

Referring to that diagram multiple customer sites are illustrated at A, B, C and D connected to a telephone network and imaging facility at E. The topmost site A shows a user premise indicated generally at 508, where a first user may have a local area network (LAN) 510 connecting workstations 512, a document scanner 514 and a host computer 516. A similar user premise installation 517 is illustrated at LAN 518 in the lowermost user premise site illustrated at B. The LANs can be one of several commercially available hardware and software configurations for interconnecting workstations or personal computers (PCs) with various peripherals, routers and/or gateways. ETHERNET is an example of a commercial LAN providing sufficient bandwidth for the efficient transfer of high resolution image data. Similarly, commercially available routers 530 interface LAN 510 to the telephone central office backbone network 528 and include circuitry for performing protocol conversion between networks. Routers 530, gateways 532 and bridges 534 perform similar functions, primarily differing in the number of layers converted to interface the respective networks.

Routers 530 support one or more physical links. Upon receipt of digitized data in a packet format, the router examines the data to select the required output link. In some protocols, such as X.25, the routing decision is made at call-establishment. If the protocol does not include this information, then each packet of data is examined by router 530 to correctly route the data. The routing capability of the Public Telephone Network is functionally equivalent to routers 530.

Gateway 532 is another interconnection device which implements all seven layers of two entirely different protocol stacks. The gateway 532 functions as a multilayered protocol converter.

Routers 530 can be connected using a standard two or four wire subscriber loop to a local office at data rates of 4800 to 9600 baud. Connectivity can alternatively be provided by an ISDN or T1 link to support data transfer rates of up to 1.544 megabits per second. Using switched multi-megabit digital service (SMDS), higher data transfer rates are possible. Layered on the physical connectivity, protocols such as TCP/IP (transmission control protocol and internet protocol), ISO, SNA (systems network architecture), and SDLC (system or synchronous data link control) to provide required handshaking between routers and the respective networks.

A different LAN configuration 521 is depicted at 520 at another user premise B. This ring architecture LAN connects workstations 522, a scanner 524 and host computer 526. A still further user premise installation or plural installations are indicated at site C comprising fax machines 527 and 529 and a personal computer (PC) 531. These devices are connected through an analog or digital voice or data switch 544 and provide signals which are carried in the voice channel. The configuration at site D is essentially the same as at site A, differing in that bridges are used to interface the local area network bus 518 to backbone network 528.

The user LANs 510, 518 and 520 are respectively tied to backbone network 528 through routers 530, bridges 534 and gateways 532. The minimum hardware configuration required in order to tie into the system is a PC linked to telecommunications line capable of transmitting data to the bus 528. As discussed above, the line can be a standard class user loop supporting analog signals between approximately 300 and 3400 Hz usable at rates of up to 4800–9600 baud. Alternatively, wider bandwidth connectivity can be provided over digital transmission media to support higher data transmission rates.

The public telephone switching system installation illustrated at E includes long term storage shown as optical storage in the "jukebox" 534 tied to the bus by a file server 536. The jukebox includes a plurality of robotically changeable media such as optical disks which can be WORM (write once, read many) or erasable. The format of the optical disks includes 51/4, 10, 12 or 14 inch type platters. Alternatively, the jukebox can include a mechanism for changing and reading/writing magnetic format media such as of VCR tapes. The jukebox is intended to be for additional data storage. Data stored in the jukebox may have a high degree of data compression to maximize data storage capacity of the device.

Short term magnetic storage is provided at 538 also tied to the bus through a file server 540. The short term storage can include hard disk drives, bubble memories, solid-state disks, and other high speed access mass storage devices. The magnetic storage is used to support system virtual memory requirements and for storage of system data and programs, index information and application programs and data including image data. A fax server 542 including fax storage 543 is connected between the bus and the switch 544 connected to fax or PC terminals 527, 529 and 531.

The main processor is shown at 50 and includes an associated magnetic disk database storage (not shown) for storing system routines and data and applications programs, indices, text and images. With appropriate software, processor 550 performs system security functions as well as image data manipulation such as image cropping, scaling including image reduction and enlargement, windowing, rotation, translation, etc. Other functions supported by processor 550 can include optical character recognition, relational keyword index searching, conceptual searching, image enhancement, colorization, solarization, and combining image data with other image data and/or text data to form composite image data.

Processor 550 can also support security functions such as data encryption/decryption and electronic signature processing using, for example, the National Institute of Standards and Technology Data Encryption Standard (DES). Data encryption increases system security and further restricts unauthorized use of information transmitted to, and stored on, the backbone network. In cooperation with the respective user terminal and/or local computer, data is encrypted using a key known only to the user. The user can supply a key to decrypt data for system use if required for system performed data manipulation routines. Data decryption keys can also be supplied to destination end users to regenerate the original data.

Electronic signatures can also be supported by processor 550. Using a security key such as an electronic Personal Identification Number (PIN), a user can have the system append the user's electronic signature to a document, i.e., provide an electronic signature stamping of the document to indicate approval, authorization, or to authenticate the document. The electronic signature can be the user's PIN encrypted using the DES.

The imaging equipment supporting system functionality resides at a central facility or MOC (Minicomputer Operations Center). The short term storage receives input from the scanners and stores the data for approximately 60 days of short term storage. Beyond that the data will be automatically ported over to the long term optical storage where it remains for about a year or longer. Following that the disks are taken out of the jukebox and shelved for indefinite storage. The fax server constitutes another interface between fax machines 527 and 529 and PC 531 (generating a fax signal) and the fax server storage 543. Fax signal inputs may also come from the workstations 512 provided with fax boards. The facsimile images reconverted by the fax server into bit mapped image data and supplied to backbone network 528. Processor 550 controls bus traffic, routing the converted image data to the appropriate file server or user through the respective bridge, router or gateway equipment.

Billing is provided by automatic message accounting (AMA) equipment 560. The AMA equipment records system usage including processor, memory, and input/output processing usage of the imaging system. Appropriate bills can be generated using ANI data to identify the user.

The user hardware may comprise a range of equipment, ranging from a single PC station with a communications link as shown at site C to a complete local area networking system on the premises as shown at sites A, B and D. Such a network may have multiple PCs, servers, hosts, etc. The LAN has a communications link including protocol conversion to tie into a telecommunications line provided to tie into the centralized platform which provides a central imaging facility The hardware in the illustrated and described architecture is adapted to provide multimedia and high resolution imaging. Within that category, hardware is provided to support many services including imaging mailbox, simple storage, dial-up services such as yellow pages, image bulletin board, etc. Direct Inward Dialing (DID) availability can be provided.

Original images can be anything that has gone through the scanner, i.e., the text of a letter, a picture of a house or an X-ray, etc. The scanner and imaging is faster than fax and of a better quality due to higher resolution and gray scale information. Transmission protocols for imaging are supported by increased data checking and correction of the bit mapped image data.

While specific embodiments of this invention have been previously discussed in terms of voice mail the invention is not limited to that mode of information exchange. The message handling in the telephone network is digital and the method and system of the invention are uniquely adapted to advantageous employment in this context. The multiservices arrangement described in connection with FIG. 15 and described in more detail in U.S. Pat. No. 5,200,993, and the integrated services platform which is shown and described in earlier referenced U.S. Pat. No. 5,193,110, represent prior proposals and systems for utilizing the switched telephone network to implement varied messaging services. Those patents are incorporated herein in their entirety by reference. In both of those systems the message handling and delivery is through the trunking system of the telephone network utilizing the program controlled digital switches that handle that trunked traffic.

According to this embodiment of the invention it has been found that it is advantageously feasible to relieve the trunked network of that traffic and handle the traffic more efficiently via the common channel signaling network which has been described in connection with the previously discussed embodiments of this invention.

Figure 16:
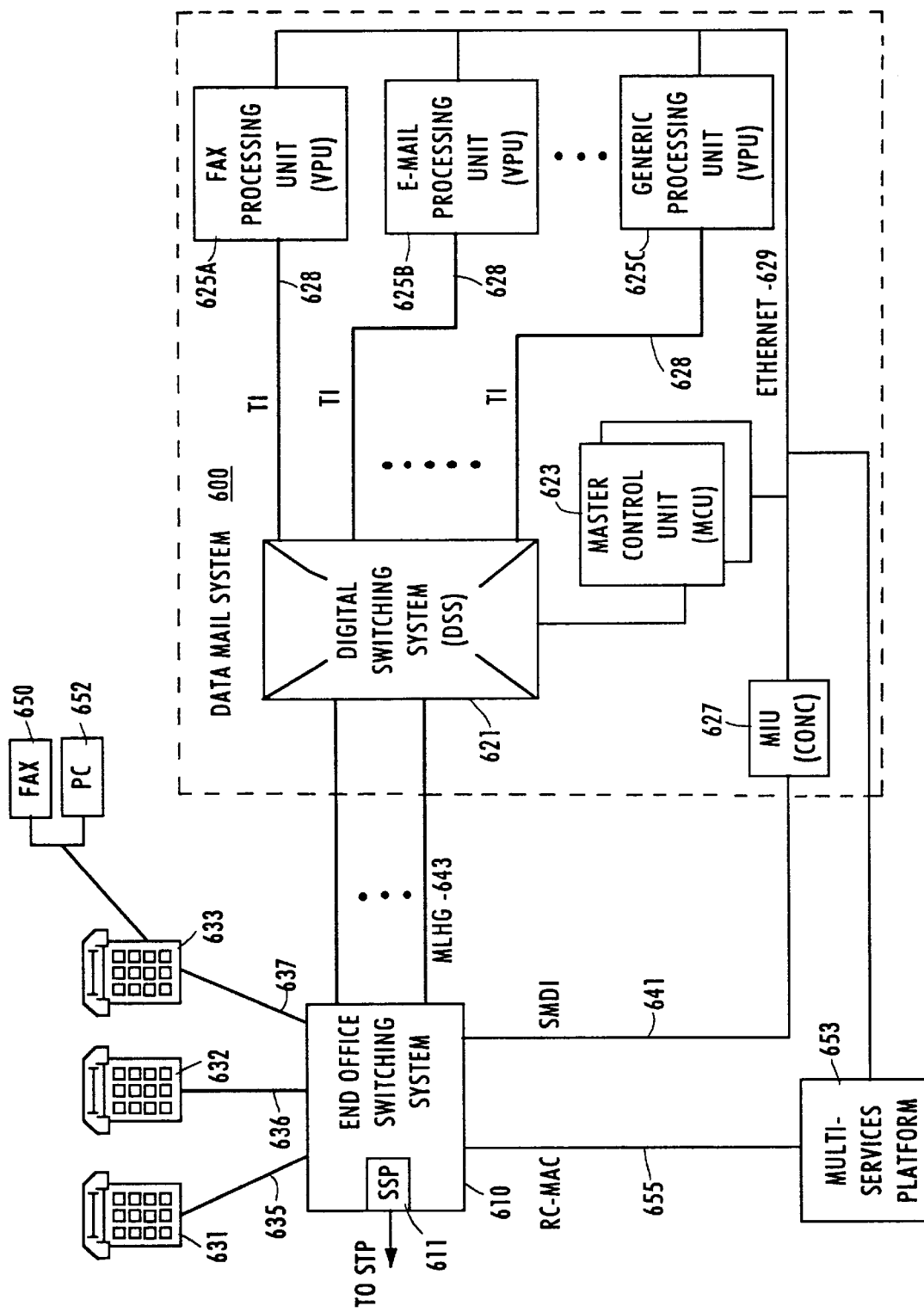
FIG. 16 shows details of a data mail system usable with an embodiment of the invention capable of implementing the transfer of various types of information.

Referring to FIG. 16 there is shown a data mail system indicated generally at 600. It will be recognized that this system is similar to the voice mail system previously described in connection with FIG. 5. The end office switching system 610, having an SSP 611 is connected to route calls to the data mail system 600 in response to the dialing of a telephone number assigned to the lines 643 going to the data mail system. The end office switching system 610 directs an incoming call to the data mail system on any available channel on the multi-line hunt group lines 643. Simultaneously the switching system 610 will also provide various data relating to the call via one of the SMDI links 641 and the MIU 627 as described in connection with FIG. 5.

The master control unit 623 uses the incoming information to route the forwarded call through DSS switch 621 and one of the internal T1 links 628 to an available processing unit 625A, 625B, 625C. These units are shown respectively as a fax processing unit, an E-mail processing unit, and a generic processing unit.

Additional units may be included for processing images, telex, or other data information, or to provide speech recognition capabilities. The master control unit 623 and DSS switch 621 operate as switching and control means for selecting one of the processing units in response to requested message transfer service. It will be recognized that it is not necessary that each of the processing units be devoted to providing a single type of information service and thus the generic processing unit 625C may comprise a general purpose computer capable of handling multiple types of digital data messages or information transfers.

As with the voice mail system of FIG. 5, and the data mail system of FIG. 16, a voice processing unit connected to the call retrieves prompt messages and/or previously stored messages from its memory and transmits them back to the calling party. The incoming calls illustrated in FIG. 16 may be in the form of voice mail, as from any of the terminals 631, 632 and 633, or a facsimile message from a facsimile machine 650 or an image from a computer 652. In the case of a fax machine or computer the voice prompts are replaced with data signals for indicating the type service being requested. Once the connection is made between the selected processing unit and the calling terminal the message information may be stored in the processing unit as in preceding embodiments of the invention.

The SSP 611 in the end office switching system 610 is connected to an STP such as the STP 324 in FIG. 4. In such an arrangement the data mail system 600 of FIG. 16 would either supplant the voice mail system 374 of FIG. 4 or be provided supplemental thereto. In similar fashion a destination data mail system, such as the system 376 in FIG. 4, would be replaced or supplemented by a data mail system such as the system 600 in FIG. 16. Alternatively, the comprehensive information transfer system of this embodiment of the invention may be provided in the manner illustrated in FIG. 17. In that figure multiple customer sites are illustrated at A, B, C and D connected to a telephone network which is indicated as a cloud E. The sites A, B, C and D are similar to those shown and described in connection with FIG. 15 and bear the same reference numerals. These customer sites are connected to the cloud through an end office switching system 610 which is similar to the end office switching system of that same reference numeral shown in FIG. 16. The SSP 611 associated with the switch 610 is connected to an STP in the telephone network as indicated by the broken line. The end office switch itself is shown connected by a solid line trunk. It will be appreciated that in actuality the end office switching system 610 would be included within the cloud E. The switching system 611 has connected thereto a data mail system 600 as just described in connection with FIG. 16. At the right side of FIG. 17 there is shown a destination office switching system which is identical to that at the left side of the cloud and bears like reference numerals.

Figure 17:
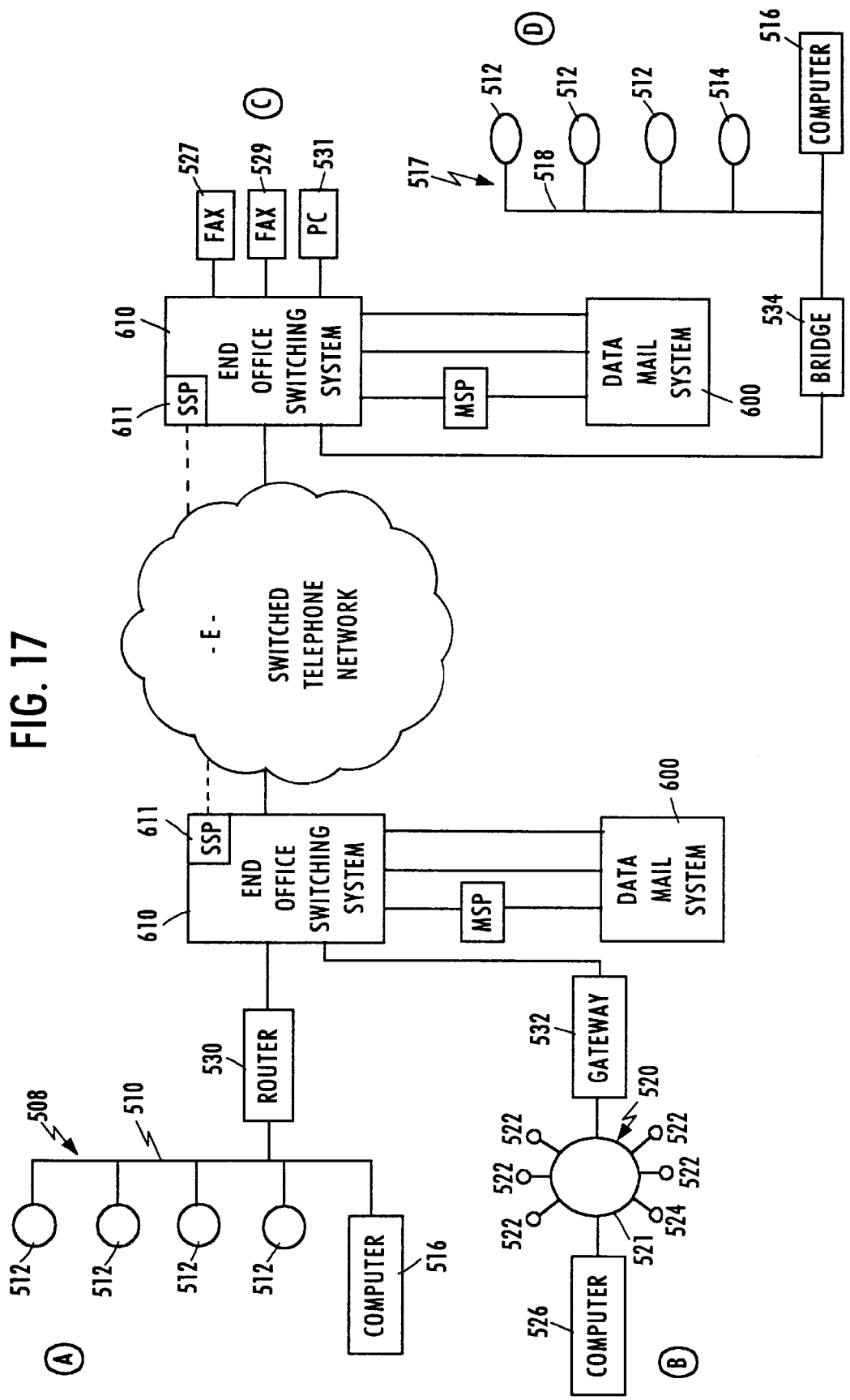
FIG. 17 shows the use of a switched telephone network for transfer of multiple types of voice and data information according to an embodiment of the invention.

The operation of the system shown in FIG. 17 or of the system of FIG. 4 containing data mail systems such as shown in FIG. 16 is the same as previously described in detail in connection with the systems of FIG. 4 and FIG. 16. While the previously described operation of those systems related to digitized voice mail, the system of FIG. 17 or FIG. 16 may comprise digitized information of the various types previously described. The initiation of the call by the sender identifies the type processing which is desired and this is provided through the operation of the master control unit 623 and digital switching system 621 in FIG. 16. The message or information to be transferred is then handled via the STPs, SS7 DB and/or ISCP or SCP of the common channel signaling network as with the preceding embodiments of the invention.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. In a switched communications network comprising:
   a first central office switching system connected to subscriber lines connected to subscriber premises terminals including at least one signal switching point for selectively providing switched communications between subscriber lines;
   a second central office switching system connected to subscriber lines connected to subscriber premises terminals including at least one signal switching point for selectively providing switched communications between subscriber lines;
   a controller arranged separately from the central office switching systems and being connected to at least the signal switching points connected to said central office switching systems through at least one signal transfer point arranged to convey control data to effect communications, said controller storing processing and routing data;
   each said central office switching system providing selective communications between subscriber lines and a centralized message processing and storage system for handling multiple different types of message information, a method comprising:
   forwarding from said first central office switching system to a first of said centralized message processing and storage systems message information of a first type directed to a second of said centralized message processing and storage systems and storing said message information of said first type in said first of said centralized message processing and storage systems;
   sending an inquiry to said controller;
   sending a responsive message from said controller and in response to the message forwarding to said second of said centralized message processing and storage systems via signal switching points and at least one signal transfer point said message information of a first type.

2. A method according to claim 1 wherein said forwarding from said first central office switching system of said message information to the first of said centralized message processing and storage systems includes establishing a connection to said first of said centralized message and processing storage systems from a subscriber premises terminal, and initiating said message information of said first type from said subscriber premises terminal.

3. A method according to claim 1 wherein said inquiry to said controller and responsive message from said controller are in Transactional Capabilities Application Part (TCAP) protocol.

4. A method according to claim 1 wherein the message information is forwarded in Common Channel Signaling 7 (CCS7) format.

5. A method according to claim 1 wherein the message information is forwarded by packet switching via a Common Channel Signaling network.

6. A method according to claim 1 wherein said forwarding of said message information from said first of said centralized message processing and storage systems to said second of said centralized message processing and storage systems is effected between said first and second central office switching systems without the use of trunking connections therebetween.

7. In a switched communications network comprising a plurality of signal switching points associated with subscriber lines connected to subscriber premises terminals, said signal switching points being connected by trunks for selectively providing switched communications between subscriber lines, a controller arranged separately from the trunks and being connected to at least some of the signal switching points through at least one signal transfer point arranged to convey control data to effect communications, said controller storing processing and routing data, at least one of said signal switching points being connected to a centralized message processing and storage system for storing message information of different types directed to subscribers, a method comprising:
   forwarding to said centralized message processing and storage system a message of a first type directed to another message processing and storage system and storing said message information of said first type in storage in said centralized message information processing and storage system for storing message information of different types;
   sending an inquiry to said controller;
   sending a responsive message from said controller and in response to the message forwarding to said other message information processing and storage system via signal switching points and at least one signal transfer point the message information of a first type stored in the first-mentioned centralized message information processing and storage system.

8. A method according to claim 7 wherein said forwarding of said message information from said first-mentioned centralized message processing and storage system to the other message processing and storage system is effected between signal switching points without the use of trunking connections therebetween.

9. A method according to claim 8 wherein said message of a first type is a facsimile message.

10. A method according to claim 8 wherein said message of a first type is a voice message.

11. A method according to claim 8 wherein said message of a first type contains imaging data.

12. A switched communications network comprising:
    a first central office switching system connected to subscriber lines connected to subscriber premises terminals including at least one signal switching point for selectively providing switched communications between subscriber lines;
    a second central office switching system connected to subscriber lines connected to subscriber premises terminals including at least one signal switching point for selectively providing switched communications between subscriber lines;
    a controller arranged separately from the central office switching systems and being connected to at least the signal switching points connected to said central office switching systems through at least one signal transfer point arranged to convey control data to effect communications, said controller storing processing and routing data;
    at least one of said switching systems providing selective communications between subscriber lines and a centralized message information processing and storage system capable of handling message information of different types;

the other of said switching systems providing selective communication with information processing and storage devices connected to subscriber lines;

said controller responding to signals from a signal transfer point to control the transfer of message information of a first type from said centralized message information processing and storage system to another processing and storage system for message information of said first type via at least one signal transfer point.

13. A switched communications network comprising a plurality of signal switching points associated with subscriber lines connected to subscriber premises terminals, said signal switching points being connected by trunks for selectively providing switched communications between subscriber lines, a network controller arranged separately from the trunks and being connected to at least some of the signal switching points through at least one signal transfer point arranged to convey control data to effect communications, said network controller storing call processing data associated with subscribers who are associated with the subscriber lines connected to consumer premises terminals, at least two of said signal switching points being connected to centralized message information processing and storage systems for storing messages directed to subscribers, said centralized message information processing and storage systems having the capability of handling message information of different types, said signal transfer point connected to said centralized switching systems responding to signals intended to transfer message information of a first type from one centralized message processing and storage system to another centralized message processing and storage system to send an inquiry to said network controller, said network controller sending a responsive message causing said signal transfer point to forward the message information from said one centralized message processing and storage system to the other centralized message processing and storage system via signal switching points and at least one signal transfer point.

14. A switched communications network according to claim 13 wherein said inquiry to said network controller and said responsive message from said network controller are in Transactional Capabilities Application Part (TCAP) protocol.

15. A switched communications network according to claim 14 wherein the message information is forwarded in Common Channel Signaling format.

16. A switched communications network according to claim 14 wherein the message information is forwarded by packet switching via a Common Channel Signaling network associated with said network controller.

17. A method of forwarding a first type of digitized message information stored in one centralized message system capable of storing digital message information of multiple types, said centralized message system being connected to a switched telecommunications network having switching systems connected together by trunks to another centralized message system, which switching systems are controlled by a network controller arranged separately from the trunks and constituting part of a common channel signaling system for said switched telecommunications network, comprising the steps of sending an inquiry to said controller and, reactive to a response from said controller, incorporating said message information of a first type into common channel signaling packets, transporting said packets via packet switching through said common channel signaling system, and storing said information in said other centralized message system.

18. A method according to claim 17 wherein said message information of a first type is a facsimile message.

19. A method according to claim 17 wherein said message information of a first type is a voice message.

20. A method according to claim 17 wherein said message information of a first type contains imaging data.

\* \* \* \* \*